US012755562B2

(12) United States Patent
Wang et al.

(10) Patent No.: US 12,755,562 B2
(45) Date of Patent: Oct. 6, 2026

(54) SYSTEM AND METHODS FOR AUTOMATICALLY DETECTING DOUBLE PARKING VIOLATIONS

(71) Applicant: Hayden AI Technologies, Inc., San Francisco, CA (US)

(72) Inventors: Shaocheng Wang, Mountain View, CA (US); Wiktor Muron, Rogi (PL); Michael Gleeson-May, Oakland, CA (US); Bo Shen, Fremont, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 256 days.

(21) Appl. No.: 18/595,978

(22) Filed: Mar. 5, 2024

(65) Prior Publication Data

US 2024/0412535 A1 Dec. 12, 2024

Related U.S. Application Data

(60) Provisional application No. 63/507,183, filed on Jun. 9, 2023.

(51) Int. Cl.
*G06V 20/56* (2022.01)
*G06V 10/26* (2022.01)
(Continued)

(52) U.S. Cl.
CPC ............ *G06V 20/588* (2022.01); *G06V 10/26* (2022.01); *G06V 10/44* (2022.01); *G06V 10/82* (2022.01);
(Continued)

(58) Field of Classification Search
CPC ........ G06V 10/26; G06V 10/44; G06V 10/82; G06V 20/625; G06V 2201/08;
(Continued)

(56) References Cited

U.S. PATENT DOCUMENTS

| | | | |
|---|---|---|---|
| 9,070,289 | B2 | 6/2015 | Saund et al. |
| 10,296,794 | B2 | 5/2019 | Ratti |

(Continued)

FOREIGN PATENT DOCUMENTS

| | | |
|---|---|---|
| CN | 2277104 | 3/1998 |
| CN | 106560861 | 4/2017 |

(Continued)

OTHER PUBLICATIONS

"Consulting services in Computer Vision and AI," accessed on May 8, 2023, online.

(Continued)

*Primary Examiner* — Atiba O Fitzpatrick
(74) *Attorney, Agent, or Firm* — Chang & Hale LLP

(57) ABSTRACT

Disclosed herein are methods, devices, and systems for automatically detecting double parking violations. For example, one aspect of the disclosure concerns a method comprising determining a location of a road edge of a roadway from one or more video frames of a video captured by one or more video image sensors of an edge device; determining a layout of one or more lanes of the roadway, including a no-parking lane, based on the road edge; bounding the no-parking lane using a lane bounding polygon; bounding a vehicle detected from the one or more video frames using a vehicle bounding polygon; and detecting a potential double parking violation based in part on an overlap of at least part of the vehicle bounding polygon with at least part of the lane bounding polygon and a determination of whether the vehicle is static or moving.

24 Claims, 22 Drawing Sheets

(51) Int. Cl.

| | |
|---|---|
| ***G06V 10/44*** | (2022.01) |
| ***G06V 10/82*** | (2022.01) |
| ***G06V 20/58*** | (2022.01) |
| ***G06V 20/62*** | (2022.01) |

(52) U.S. Cl.

CPC .......... *G06V 20/584* (2022.01); *G06V 20/625* (2022.01); *G06V 2201/08* (2022.01)

(58) Field of Classification Search

CPC .................... G06V 10/25; G06V 20/58; G06V 20/56–588; G06V 10/70; G06V 10/774–7796; G06V 10/454; G06T 2210/12; G06T 7/11–13; G06T 2207/30264; G06T 2207/30261; G06T 2207/30256; G06T 2207/20081; G06T 2207/20084; G06T 9/002; G06T 5/60; B60R 2300/8093; B60R 2300/804; G06K 9/6256; G06K 9/6257; G06K 9/6259; G06N 3/02–126; G06N 20/00–20; G06F 18/214–2155; G06F 7/023; G06F 40/16; G01N 29/4481

See application file for complete search history.

(56) References Cited

U.S. PATENT DOCUMENTS

| | | | | |
|---|---|---|---|---|
| 11,003,919 | B1 | 5/2021 | Ghadiok et al. | |
| 11,164,014 | B1 * | 11/2021 | Ghadiok | G06N 3/045 |
| 11,322,017 | B1 * | 5/2022 | Ghadiok | G08G 1/04 |
| 11,361,558 | B2 | 6/2022 | Seo | |
| 11,688,182 | B2 | 6/2023 | Ghadiok et al. | |
| 2002/0072847 | A1 | 6/2002 | Trajkovic et al. | |
| 2010/0081200 | A1 | 4/2010 | Rajala et al. | |
| 2012/0148092 | A1 | 6/2012 | Ni et al. | |
| 2013/0266188 | A1 | 10/2013 | Bulan et al. | |
| 2014/0007762 | A1 | 1/2014 | Gavish et al. | |
| 2014/0036076 | A1 | 2/2014 | Nerayoff et al. | |
| 2014/0311456 | A1 | 10/2014 | Richter et al. | |
| 2018/0129887 | A1 * | 5/2018 | Kang | G06T 7/70 |
| 2018/0172454 | A1 | 6/2018 | Ghadiok et al. | |
| 2018/0240336 | A1 | 8/2018 | Kareev et al. | |
| 2019/0137280 | A1 | 5/2019 | Ghadiok et al. | |
| 2019/0197369 | A1 | 6/2019 | Law et al. | |
| 2019/0250626 | A1 * | 8/2019 | Ghafarianzadeh | G08G 1/0112 |
| 2020/0063866 | A1 | 2/2020 | Reinhart et al. | |
| 2020/0177767 | A1 | 6/2020 | Kelly et al. | |
| 2020/0307562 | A1 * | 10/2020 | Ghafarianzadeh | G06N 5/046 |
| 2020/0307563 | A1 * | 10/2020 | Ghafarianzadeh | B60W 30/18154 |
| 2020/0380270 | A1 | 12/2020 | Cox et al. | |
| 2021/0097148 | A1 * | 4/2021 | Bagschik | G06F 30/15 |
| 2021/0166145 | A1 | 6/2021 | Omari et al. | |
| 2021/0209941 | A1 | 7/2021 | Maheshwari et al. | |
| 2021/0237737 | A1 | 8/2021 | Al-Nuaimi et al. | |
| 2021/0241003 | A1 | 8/2021 | Seo | |
| 2021/0241005 | A1 * | 8/2021 | Abbott | G06V 20/588 |
| 2021/0325190 | A1 * | 10/2021 | Li | G01S 13/89 |
| 2022/0147745 | A1 * | 5/2022 | Ghadiok | G06N 3/09 |
| 2022/0404467 | A1 * | 12/2022 | Chun | G01S 7/4802 |
| 2023/0267750 | A1 * | 8/2023 | Kadavil | G06V 10/7784 348/149 |

FOREIGN PATENT DOCUMENTS

| | | |
|---|---|---|
| CN | 110197589 | 9/2019 |
| CN | 110321823 | 10/2019 |
| CN | 110717433 | 1/2020 |
| CN | 111368687 | 7/2020 |
| CN | 111492416 | 8/2020 |
| CN | 111666853 | 9/2020 |
| JP | 4805763 | 3/2008 |
| KR | 100812397 | 3/2008 |
| WO | WO 2010/081200 | 7/2010 |
| WO | WO 2014/007762 | 1/2014 |
| WO | WO 2020/063866 | 4/2020 |
| WO | WO 2020/177767 | 9/2020 |
| WO | WO 2022/099237 | 5/2022 |

OTHER PUBLICATIONS

"Safety Vision Announces Smart Automated Bus Lane Enforcement (SABLETM) Solution," *Safety Vision*, Oct. 11, 2022, online.

Bo, T. et al., "Common Phase Error Estimation in Coherent Optical OFDM Systems Using Best-fit Bounding Box," *Optics Express*, vol. 24, No. 21, pp. 73707-23718, Oct. 2016.

Bo, T. et al., "Common Phase Estimation in Coherent OFDM System Using Image Processing Technique," *IEEE Photonics Technology Letters*, vol. 27, No. 15, Aug. 2015.

Bo, T. et al., "Image Processing Based Common Phase Estimation for Coherent Optical Orthogonal Frequency Division Multiplexing System," *Optical Fiber Communication Conference*, Mar. 2015.

Canizo, M. et al. "Multi-Head CNN-RNN for multi time series anomaly detection: An industrial case study," *Neurocomputing*, 363(21), pp. 246-260, Oct. 21, 2019.

Chen, S. et al., "A Dense Feature Pyramid Network-Based Deep Learning Model for Road Marking Instance Segmentation Using MLS Point Clouds," *EEE Transactions on GeoScience and Remote Sensing*, vol. 59, No. 1, pp. 784-800, Jan. 2021.

Chhaya, S. et al., "Basic Geometric Shape and Primary Colour Detection Using Image Processing On MATLAB," *IJRET: International Journal of Research in Engineering and Technology*, vol. 04, Issue 05, May 2015.

Clearlane, "Automated Bus Lane Enforcement System", *SafeFleet*, 2021, online.

Clearlane, "The Safe Fleet Automated Bus Lane Enforcement (ABLE)", *SafeFleet*, 2021, online.

Evanko, K. "Siemens Mobility launches first-ever mobile bus lane enforcement solution in New York," *Siemens Mobility*, Dec. 17, 2019, Munich, Germany.

Fan, Y. et al., "A Coarse-to-Fine Framework for Multiple Pedestrian Crossing Detection," *Sensors*, vol. 20, Jul. 2020.

Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.

Github Repository, Our Camera, <https://github.com/Bellspringsteen/OurCamera> (last visited Sep. 25, 2023).

Glenn, J., Adaptive Morphological Feature-Based Object Classifier for a Color Imaging System, *NASA Tech Briefs*, pp. 23-24, Dec. 2009.

Hsu, K., et al. "Augmented Multiple Instance Regression for Inferring Object Contours in Bounding Boxes," *IEEE Transaction on Image Processing*, vol. 23, No. 4, Apr. 2014.

Huval, B. et al. "An Empirical Evaluation of Deep Learning on Highway Driving," *Stanford University*, pp. 1-7 accessed on Apr. 17, 2015, online.

Liu, X. "Vehicle-Related Scene Understanding Using Deep Learning," *School of Engineering, Computer and Mathematical Sciences, Auckland University of Technology*, 2019, online.

Nehemiah, A. et al. "Deep Learning for Automated Driving with MATLAB," *NVIDIA Technical Blog*, <https://developer.nvidia.com/blog/deep-learning-automated-driving-matlab/> accessed on Jun. 4, 2023, online.

Novak, L., "Vehicle Detection and Pose Estimation for Autonomous Driving," Prague, May 2017.

Oh, J. et al., "Context-based Abnormal Object Detection Using the Fully-connected Conditional Random Fields," *Pattern Recognition Letters 98*, pp. 16-25, Aug. 2017.

Paquet, E. et al., "Description of shape information for 2-D and 3-D objects," *Signal Processing: Image Communication 16*, pp. 103-122, Sep. 2000.

Safe Fleet. "Whitepaper: Vendor Interoperability for ABLE," *Safe Fleet*, pp. 1-6, Apr. 2023, online.

(56) References Cited

OTHER PUBLICATIONS

Sengupta, S., “Semantic Mapping of Road Scenes,” Oxford Brookes University, Oct. 2014.
Siemens Mobility Inc., “Ratification of Completed Procurement Actions” New York City Transit and Siemens Mobility Inc., *Finance Committee Meeting*, pp. 80-81, Mar. 2019.
Siemens Mobility Traffic Solutions, “Enforcement Solutions For Safe and Efficient Cities,” *Civil Enforcement*, 2016.
Spencer, B. et al. “NYC extends Brooklyn bus lane enforcement,” *ITS International*, Feb. 27, 2020, online.
Sullivan, T. “Transit Bus Surveillance Solutions,” *New York City Transit/MTA Bus*, Jun. 21, 2019, Charlotte, North Carolina, USA.
Tonge, A. et al., “Traffic Rules Violation Detection using Deep Learning,” *2020 4th International Conference on Electronics, Communication and Aerospace Technology* (*ICECA*), pp. 1250-1257, Nov. 2020, Coimbatore, India.
Viorel, C., “Some Aspects Concerning Geometric Forms Automatically Find Images and Ordering Them Using Robot Studio Simulation,” *Advanced Materials Research*, vol. 1036, pp. 760-763, Oct. 1, 2014.
Wu, C. et al. “Adjacent Lane Detection and Lateral Vehicle Distance Measurement Using Vision-Based Neuro-Fuzzy Approaches,” *Journal of Applied Research and Technology*, vol. 11, pp. 251-258, Apr. 2013.
Zhao Z. et al., “Deep Reinforcement Learning Based Lane Detection and Localization,” *Nerocomputing*, vol. 413, pp. 328-338, Jul. 2020.
Zhou, C. et al., “Predicting the Passenger Demand on Bus Services for Mobile Users,” *Pervasive and Mobile Computing 25*, pp. 48-66, Jan. 2016.

* cited by examiner

Trajectory of moving vehicle

Trajectory of static vehicle

SYSTEM AND METHODS FOR AUTOMATICALLY DETECTING DOUBLE PARKING VIOLATIONS

CROSS-REFERENCE TO RELATED APPLICATION

This application claims the benefit of U.S. Provisional Patent Application No. 63/507,183 filed on Jun. 9, 2023, the content of which is incorporated herein by reference in its entirety.

TECHNICAL FIELD

This disclosure relates generally to the field of computer-based parking violation detection and, more specifically, to systems and methods for automatically detecting double parking violations.

BACKGROUND

Non-public vehicles double parking is a significant transportation problem for municipalities, counties, and other government entities. Double parking is often defined in municipal codes as a vehicle that is illegally parked on a lane of a roadway next to a permitted parking lane or next to a parked vehicle in the permitted parking lane. The permitted parking lane is often a lane or portion of a roadway that is closest to a road edge (e.g., a right road edge in the United States). Double-parked vehicles can cause traffic congestion, accidents, and discourage usage of specialty lanes blocked by such double-parked vehicles.

For example, a vehicle double-parked in a no-parking lane can disrupt schedules of municipal fleet vehicle and frustrate those that depend on such municipal fleet vehicles. Similarly, vehicles double-parked in a bike lane can force bicyclists to ride on the road, making their rides more dangerous and discouraging the use of bicycles as a safe and reliable mode of transportation. Moreover, double-parked vehicles can disrupt crucial municipal services such as street sweeping, waste collection, and firefighting operations.

Traditional photo-based traffic enforcement technology and approaches are often unsuited for today's fast-paced environment. For example, photo-based traffic enforcement systems often rely heavily on human reviewers to review and validate evidence packages containing images or videos captured by one or more stationary cameras. This requires large amounts of human effort and makes the process slow, inefficient, and costly. In particular, traffic enforcement systems that rely on human reviewers are often not scalable, require more time to complete the validation procedure, and do not learn from their past mistakes. Furthermore, these photo-based traffic enforcement systems often fail to take into account certain contextual factors or features that may provide clues as to whether a captured event is or is not a potential parking violation.

Therefore, an improved computer-based parking violation detection system is needed that can undertake certain evidentiary reviews automatically without relying on human reviewers and can take into account certain automatically detected contextual factors or features that may aid the system in determining whether a double parking violation has indeed occurred. Such a solution should be accurate, scalable, and cost-effective to deploy and operate.

SUMMARY

Disclosed herein are methods, apparatus, and systems for automatically detecting double parking violations. For example, one aspect of the disclosure concerns a method for automatically detecting double parking violations comprising determining, using one or more processors of an edge device, a location of a road edge of a roadway from one or more video frames of a video captured by one or more video image sensors of the edge device. The method can further comprise determining a layout of one or more lanes of the roadway, including at least one no-parking lane, based on the road edge determined by the edge device. The method can also comprise bounding the no-parking lane using a lane bounding polygon, bounding a vehicle detected from the one or more video frames using a vehicle bounding polygon, and detecting a potential double parking violation based in part on an overlap of at least part of the vehicle bounding polygon with at least part of the lane bounding polygon.

The method can also comprise determining whether the vehicle is moving or static when captured by the video and detecting the potential double parking violation only in response to the vehicle being determined to be static when captured by the video (i.e., only if the vehicle is determined to be static or not moving when captured by the video).

In some embodiments, the step of determining the road edge can further comprise fitting a line representing the road edge to a plurality of road edge points using a random sample consensus algorithm (RANSAC).

In some embodiments, the line fitted to the plurality of road edge points can be parameterized by a slope and an intercept. Each of the slope and the intercept can be calculated using a sliding window or moving average algorithm such that the slope is an average slope value and the intercept is an average intercept value calculated from one or more video frames captured prior in time.

In some embodiments, the plurality of road edge points can be determined by selecting a subset of points, but not all points, along a mask or heatmap representing the road edge.

In some embodiments, the mask or heatmap can be outputted by a lane segmentation deep learning model running on the edge device.

In some embodiments, the method can also comprise passing the one or more video frames to one or more deep learning models (e.g., an object detection deep learning model, a lane segmentation deep learning model, or a combination thereof) running on the edge device or the server to determine a context surrounding the double parking violation. The context surrounding the double parking violation can be used by the edge device or a server communicatively coupled to the edge device to detect the double parking violation. For example, the context surrounding the double parking violation can be used by the edge device or the server to validate or confirm whether a static vehicle is actually parked or is only temporarily static and is in the process of moving.

In certain embodiments, the one or more deep learning models can comprise an object detection deep learning model, a lane segmentation deep learning model, or a combination thereof. At least one of the deep learning models can be configured to output a multiclass classification concerning a feature associated with the context.

For example, the feature can be brake light status of the vehicle. Also, for example, the feature can be a traffic condition surrounding the vehicle. Moreover, the feature can also be a roadway intersection status.

In some embodiments, the one or more video frames can be captured by an event camera of the edge device. At least one of the video frames can be passed to a license plate recognition deep learning model running on the edge device to automatically recognize a license plate of the vehicle.

In some embodiments, the one or more video frames can be captured by an event camera of the edge device coupled to a carrier vehicle while the carrier vehicle is in motion.

In some embodiments, the method of determining whether the vehicle is moving or static can comprise determining GPS coordinates of vehicle bounding polygons across multiple event video frames, transforming the GPS coordinates into a local Cartesian coordinate system such that the GPS coordinates are transformed coordinates, and determining whether the vehicle is static or moving based on a standard deviation of the transformed coordinates in both a longitudinal direction and a latitudinal direction and a cross correlation of the transformed coordinates along the longitudinal direction and the latitudinal direction.

A longitudinal axis of the local Cartesian coordinate system can be in a direction of travel of a carrier vehicle carrying the edge device. A latitudinal axis of the local Cartesian coordinate system can be in a lateral direction perpendicular and can be perpendicular to the longitudinal axis.

Another aspect of the disclosure concerns a device for automatically detecting a double parking violation. The device can comprise one or more video image sensors configured to capture a video of a vehicle and a roadway including a road edge of the roadway. The device can also comprise one or more processors programmed to determine a location of the road edge of the roadway from one or more video frames of the video captured by the one or more video image sensors, determine a layout of one or more lanes of the roadway, including a no-parking lane, based on the road edge determined by the device, bound the no-parking lane using a lane bounding polygon; bound a vehicle detected from the one or more video frames using a vehicle bounding polygon, and detect a potential double parking violation based in part on an overlap of at least part of the vehicle bounding polygon with at least part of the lane bounding polygon.

Yet another aspect of the disclosure concerns one or more non-transitory computer-readable media comprising instructions stored thereon, that when executed by one or more processors, cause the one or more processors to perform operations comprising determining a location of a road edge of a roadway from one or more video frames of a video captured by one or more video image sensors of an edge device, determining a layout of one or more lanes, including a no-parking lane, of the roadway based on the road edge, bounding the no-parking lane using a lane bounding polygon, bounding a vehicle detected from the one or more video frames using a vehicle bounding polygon, and detecting a potential double parking violation based in part on an overlap of at least part of the vehicle bounding polygon with at least part of the lane bounding polygon.

DETAILED DESCRIPTION

Figure 1A:
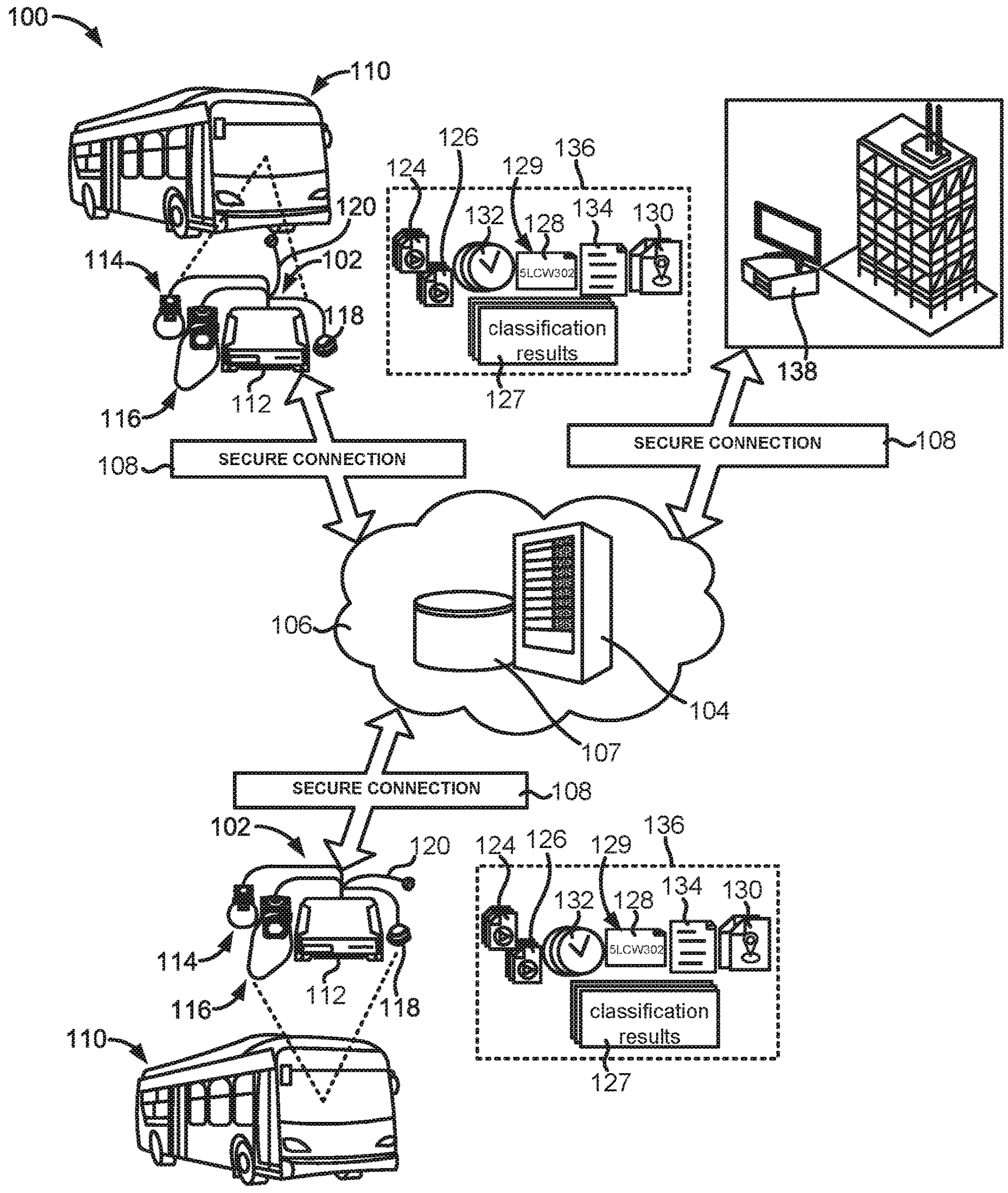
FIG. 1A illustrates one embodiment of a system for automatically detecting double parking violations.

FIG. 1A illustrates one embodiment of a system 100 that can be used to automatically detect double parking violations. The system 100 can comprise a plurality of edge devices 102 communicatively coupled to or in wireless communication with a server 104 in a cloud computing environment 106.

The server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more stand-alone servers such as a rack-mounted server, a blade server, a mainframe, a dedicated desktop or laptop computer, one or more processors or processor cores therein, or a combination thereof.

The edge devices 102 can communicate with the server 104 over one or more networks. In some embodiments, the networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof. The server 104 and the plurality of edge devices 102 can connect to the network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (WiFi) (IEEE 802.11) communication protocol, an ultra-wideband (UWB) (IEEE 802.15.3) communication protocol, a ZigBee™ (IEEE 802.15.4) communication protocol, or a combination thereof.

The edge devices 102 can transmit data and files to the server 104 and receive data and files from the server 104 via secure connections 108. The secure connections 108 can be real-time bidirectional connections secured using one or more encryption protocols such as a secure sockets layer (SSL) protocol, a transport layer security (TLS) protocol, or a combination thereof. Additionally, data or packets transmitted over the secure connection 108 can be encrypted using a Secure Hash Algorithm (SHA) or another suitable encryption algorithm. Data or packets transmitted over the secure connection 108 can also be encrypted using an Advanced Encryption Standard (AES) cipher.

The server 104 can store data and files received from the edge devices 102 in one or more databases 107 in the cloud computing environment 106. In some embodiments, the database 107 can be a relational database. In further embodiments, the database 107 can be a column-oriented or key-value database. In certain embodiments, the database 107 can be stored in a server memory or storage unit of the server 104. In other embodiments, the database 107 can be distributed among multiple storage nodes. In some embodiments, the database 107 can be an events database.

As will be discussed in more detail in the following sections, each of the edge devices 102 can be carried by or installed in a carrier vehicle 110 (see FIG. 1C for examples of different types of carrier vehicles 110).

For example, the edge device 102, or components thereof, can be secured or otherwise coupled to an interior of the carrier vehicle 110 immediately behind the windshield of the carrier vehicle 110.

As shown in FIG. 1A, each of the edge devices 102 can comprise a control unit 112, an event camera 114, a license plate recognition (LPR) camera 116, a communication and positioning unit 118, and a vehicle bus connector 120.

In some embodiments, the event camera 114 and the LPR camera 116 can be coupled to at least one of a ceiling and headliner of the carrier vehicle 110 with the event camera 114 and the LPR camera 116 facing the windshield of the carrier vehicle 110.

In other embodiments, the edge device 102, or components thereof, can be secured or otherwise coupled to at least one of a windshield, window, dashboard, and deck of the carrier vehicle 110. Also, for example, the edge device 102 can be secured or otherwise coupled to at least one of a handlebar and handrail of a micro-mobility vehicle serving as the carrier vehicle 110. Alternatively, the edge device 102 can be secured or otherwise coupled to a mount or body of an unmanned aerial vehicle (UAV) or drone serving as the carrier vehicle 110.

The event camera 114 can capture videos of vehicles (including a potentially offending vehicle 122, see, e.g., FIGS. 1B, 5A, 5B, and 5C) parked near the carrier vehicle 110. The videos captured by the event camera 114 can be referred to as event videos. Each of the event videos can be made up of a plurality of event video frames 124. The event video frames 124 can be processed and analyzed by the control unit 112 in real-time or near real-time to determine whether any of the vehicles have committed a double parking violation.

For example, one or more processors of the control unit 112 can be programmed to apply a plurality of functions from a computer vision library 306 (see, e.g., FIG. 3) to the videos captured by the event camera 114 to read the event video frames 124. The one or more processors of the control unit 112 can then pass at least some of the event video frames 124 to a plurality of deep learning models (see, e.g., FIG. 3) running on the control unit 112 of the edge device 102. The deep learning models can automatically identify objects from the event video frames 124 and classify such objects (e.g., a car, a truck, a bus, etc.). In some embodiments, the deep learning models can also automatically identify a set of vehicle attributes 134 of a potentially offending vehicle 122 (also referred to as a target vehicle) involved in a double parking violation. The set of vehicle attributes 134 can include a color of the potentially offending vehicle 122, a make and model of the potentially offending vehicle 122, and a vehicle type of the potentially offending vehicle 122 (for example, if the potentially offending vehicle 122 is a personal vehicle or a municipal vehicle such as a fire truck, ambulanee, parking enforcement vehicle, police car, etc.). The potentially offending vehicle 122 can be detected along with other vehicles in the event video frame(s) 124.

The LPR camera 116 can capture videos of license plates of the vehicles (including the potentially offending vehicle 122) parked near the carrier vehicle 110. The videos captured by the LPR camera 116 can be referred to as license plate videos. Each of the license plate videos can be made up of a plurality of license plate video frames 126. The license plate video frames 126 can be analyzed by the control unit 112 in real-time or near real-time to extract alphanumeric strings representing license plate numbers 128 of license plates 129 of the potentially offending vehicles 122. The event camera 114 and the LPR camera 116 will be discussed in more detail in later sections.

The communication and positioning unit 118 can comprise at least one of a cellular communication module, a WiFi communication module, a Bluetooth® communication module, and a high-precision automotive-grade positioning unit. The communication and positioning unit 118 can also comprise a multi-band global navigation satellite system (GNSS) receiver configured to concurrently receive signals from a GPS satellite navigation system, a GLONASS satellite navigation system, a Galileo navigation system, and a BeiDou satellite navigation system.

The communication and positioning unit 118 can provide positioning data that can allow the edge device 102 to determine its own location at a centimeter-level accuracy. The communication and positioning unit 118 can also provide positioning data that can be used by the control unit 112 to determine a location 130 of a potentially offending vehicle 122. For example, the control unit 112 can use positioning data concerning its own location to substitute for the location 130 of the potentially offending vehicle 122. The control unit 112 can also use positioning data concerning its own location to estimate or approximate the location 130 of the potentially offending vehicle 122.

The edge device 102 can also comprise a vehicle bus connector 120. The vehicle bus connector 120 can allow the edge device 102 to obtain certain data from the carrier vehicle 110 carrying the edge device 102. For example, the edge device 102 can obtain wheel odometry data from a wheel odometer of the carrier vehicle 110 via the vehicle bus connector 120. Also, for example, the edge device 102 can obtain a current speed of the carrier vehicle 110 via the vehicle bus connector 120. As a more specific example, the vehicle bus connector 120 can be a J1939 connector. The edge device 102 can take into account the wheel odometry data to determine the location 130 of the potentially offending vehicle 122.

The edge device 102 can also record or generate at least a plurality of timestamps 132 marking the time when the potentially offending vehicle 122 was detected at a location 130. For example, the localization and mapping engine 302 of the edge device 102 can mark the time using a global positioning system (GPS) timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

As will be discussed in more detail in later sections, if an edge device 102 detects that a double parking violation has occurred, the edge device 102 can transmit data, information, videos, and other files to the server 104 in the form of an evidence package 136. The evidence package 136 can comprise the event video frames 124 and the license plate video frames 126.

In some embodiments, the evidence package 136 can also comprise one or more classification results 127 obtained by feeding the event video frames 124 into one or more deep learning models running on the edge device 102. The classification results 127 can be associated with a context surrounding the potential double parking violation. The classification results 127 will be discussed in more detail in later sections.

The deep learning models running on the edge device 102 can make predictions or classifications (e.g., multi-class classifications) concerning the context-related features. In some embodiments, such predictions or classifications can be in the form of confidence scores or numerical values. In these and other embodiments, such predictions or classification can ultimately be used to obtain a qualitative or binary classification (e.g., was the potentially offending vehicle 122 static or moving).

The evidence package 136 can also comprise at least one license plate number 128 of a license plate 129 recognized by the edge device 102 using the license plate video frames 126 as inputs, a location 130 of the potentially offending vehicle 122 determined by the edge device 102, the speed of the carrier vehicle 110 when the double parking violation was detected, any timestamps 132 recorded by the control unit 112, and vehicle attributes 134 of the potentially offending vehicle 122 captured by the event video frames 124.

FIG. 1A also illustrates that the server 104 can transmit certain data and files to a third-party computing device/resource or client device 138. For example, the third-party computing device can be a server or computing resource of a third-party double parking violation processor. As a more specific example, the third-party computing device can be a server or computing resource of a government vehicle registration department. In other examples, the third-party computing device can be a server or computing resource of a sub-contractor responsible for processing double parking violations for a municipality or other government entity.

The client device 138 can refer to a portable or non-portable computing device. For example, the client device 138 can refer to a desktop computer or a laptop computer. In other embodiments, the client device 138 can refer to a tablet computer or smartphone.

The server 104 can also generate or render a number of graphical user interfaces (GUIs) 332 (see, e.g., FIG. 3) that can be displayed through a web portal or mobile app run on the client device 138.

The GUIs 332 can also provide data or information concerning times/dates of double parking violations and locations of the double parking violations. The GUIs 332 can also provide a video player configured to play back video evidence of the double parking violation.

In another embodiment, at least one of the GUIs 332 can comprise a live map showing real-time locations of all edge devices 102, double parking violations, and violation hotspots. In yet another embodiment, at least one of the GUIs 332 can provide a live event feed of all flagged events or double parking violations and the validation status of such double parking violations. The GUIs 332 and the web portal or app will be discussed in more detail in later sections.

The server 104 can also determine that a double parking violation has occurred based in part on comparing data and videos received from the edge device 102 and other edge devices 102.

Figure 1B:
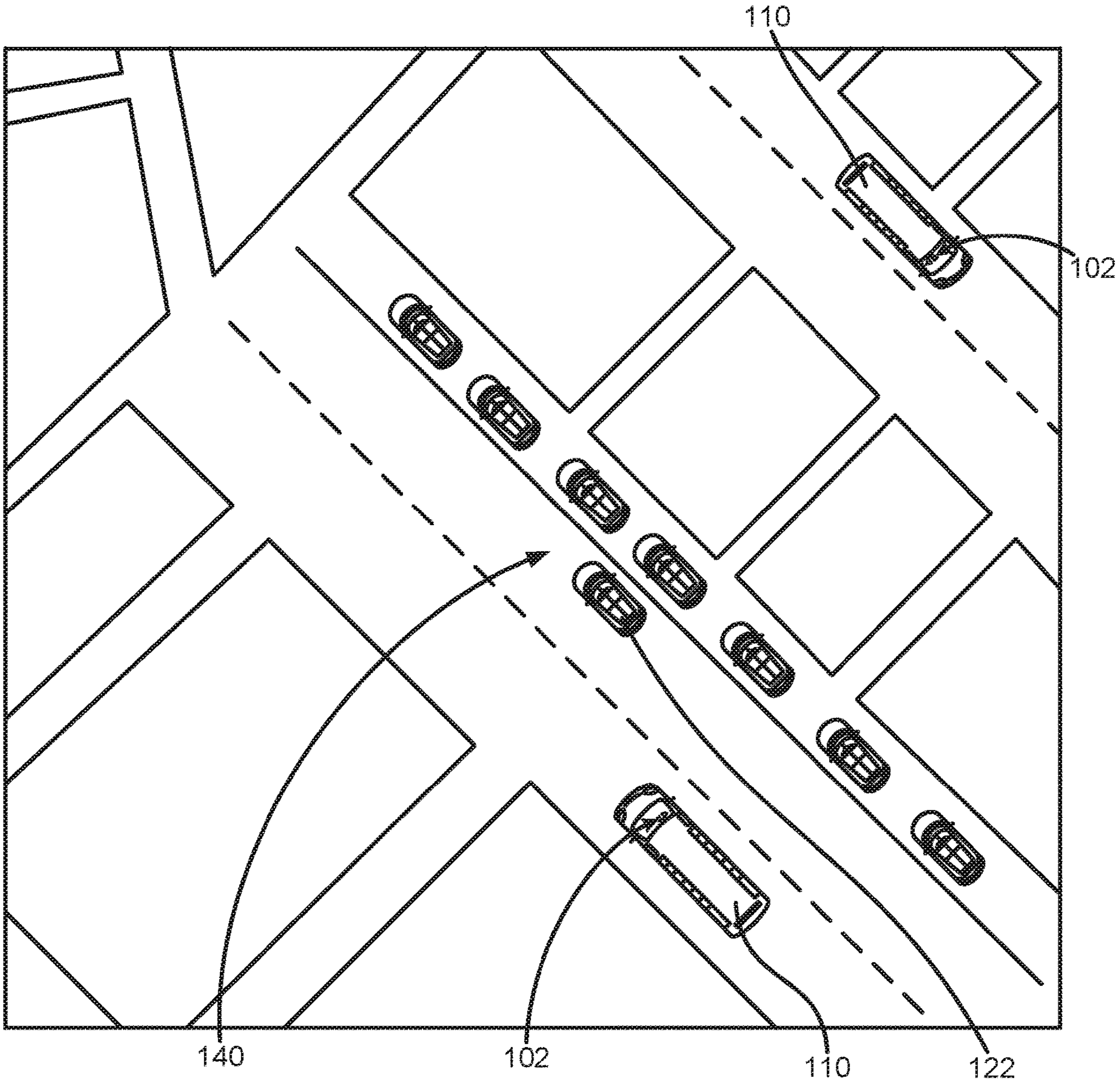
FIG. 1B illustrates one example scenario where the system of FIG. 1A can be utilized.

FIG. 1B illustrates an example scenario where the system 100 of FIG. 1A can be utilized to detect a double parking violation. As shown in FIG. 1B, a potentially offending vehicle 122 can be double parked or otherwise stopped in a no-parking lane 140.

In some embodiments, the no-parking lane 140 can be a lane next to or adjacent to (laterally offset from) a permitted parking lane. The permitted parking lane can be a lane or portion of a roadway that is closest to a road edge (e.g., a right road edge in the United States) or curb.

In other embodiments, the no-parking lane 140 can be a bus lane when the bus lane is outside of a bus lane enforcement period, a bike lane, a no-parking or no-stopping zone, or a combination thereof.

A carrier vehicle 110 (see also, FIG. 1C) having an edge device 102 (see also FIG. 1A) mounted or installed within the carrier vehicle 110 can drive by (i.e., next to or in a lane lateral to) or behind the potentially offending vehicle 122 parked or otherwise stopped in the no-parking lane 140. For example, the carrier vehicle 110 can be driving in a lane blocked by the potentially offending vehicle 122. Alternatively, the carrier vehicle 110 can be driving in a lane adjacent to or at least two lanes lateral to the no-parking lane 140. The carrier vehicle 110 can encounter the potentially offending vehicle 122 while traversing its daily route (e.g., bus route, garbage collection route, etc.).

The edge device 102 can capture videos of the potentially offending vehicle 122, at least part of the no-parking lane 140, and a road edge 701 (see FIGS. 7A and 7C) using the event camera 114 (and, in some instances, the LPR camera 116). The road edge 701 is the edge of a roadway 700 that encompasses the no-parking lane 140. In one embodiment, the videos can be in the MPEG-4 Part 12 or MP4 file format. In some embodiments, the videos can refer to multiple videos captured by the event camera 114, the LPR camera 116, or a combination thereof. In other embodiments, the videos can refer to one compiled video comprising multiple videos captured by the event camera 114, the LPR camera 116, or a combination thereof.

The control unit 112 of the edge device 102 can then determine a location 130 of the potentially offending vehicle 122 using, in part, a positioning data (e.g., GPS data) obtained from the communication and positioning unit 118. The control unit 112 can also determine the location 130 of the potentially offending vehicle 122 using, in part, inertial measurement data obtained from an IMU and wheel odometry data obtained from a wheel odometer of the carrier vehicle 110 via the vehicle bus connector 120.

One or more processors of the control unit 112 can also be programmed to automatically identify objects from the videos by applying a plurality of functions from a computer vision library to the videos to, among other things, read video frames from the videos and pass at least some of the video frames (e.g., the event video frames 124 and the license plate video frames 126) to a plurality of deep learning models (e.g., one or more neural networks) running on the control unit 112. For example, the potentially offending vehicle 122 and the no-parking lane 140 can be identified as part of this detection step.

In some embodiments, the one or more processors of the control unit 112 can also pass at least some of the video frames (e.g., the event video frames 124, the license plate video frames 126, or a combination thereof) to one or more deep learning models running on the control unit 112 to identify a set of vehicle attributes 134 of the potentially offending vehicle 122. The set of vehicle attributes 134 can include a color of the potentially offending vehicle 122, a make and model of the potentially offending vehicle 122 and a vehicle type of the potentially offending vehicle 122 (e.g., whether the potentially offending vehicle 122 is a personal vehicle or a public service vehicle such as a fire truck, ambulanee, parking enforcement vehicle, police car, etc.).

As a more specific example, the control unit 112 can pass the license plate video frames 126 captured by the LPR camera 116 to a license plate recognition engine (e.g., a license plate recognition deep learning model) running on the control unit 112 to recognize an alphanumeric string representing a license plate number 128 of the license plate 129 of the potentially offending vehicle 122.

The control unit 112 of the edge device 102 can also wirelessly transmit an evidence package 136 comprising at least some of the event video frames 126 and the license plate video frames 126, the location 130 of the potentially offending vehicle 122, one or more timestamps 132, the recognized vehicle attributes 134, and the extracted license plate number 128 of the potentially offending vehicle 122 to the server 104.

The evidence package 136 can also comprise one or more classification results 127 obtained by feeding the event video frames 124 (and, in some instances, the license plate video frames 126) into one or more of the deep learning models running on the edge device 102. The classification results 127 can be associated with a context surrounding the potential double parking violation. The classification results 127 will be discussed in more detail in later sections.

Each edge device 102 can be configured to continuously take videos of its surrounding environment (i.e., an environment outside of the carrier vehicle 110) as the carrier vehicle 110 traverses its usual carrier route. In these embodiments, the one or more processors of the control unit 112 of each edge device 102 can periodically transmit evidence packages 136 comprising video frames from such videos and data/information concerning the potentially offending vehicles 122 captured in the videos to the server 104.

The server 104 can confirm or validate that a double parking violation has indeed occurred based in part on the classification results 127. Moreover, the server 104 can confirm or validate that a double parking violation has indeed occurred based in part on comparing data and videos received from multiple edge devices 102 (where each edge device 102 is mounted or otherwise coupled to a different carrier vehicle 110).

Figure 1C:
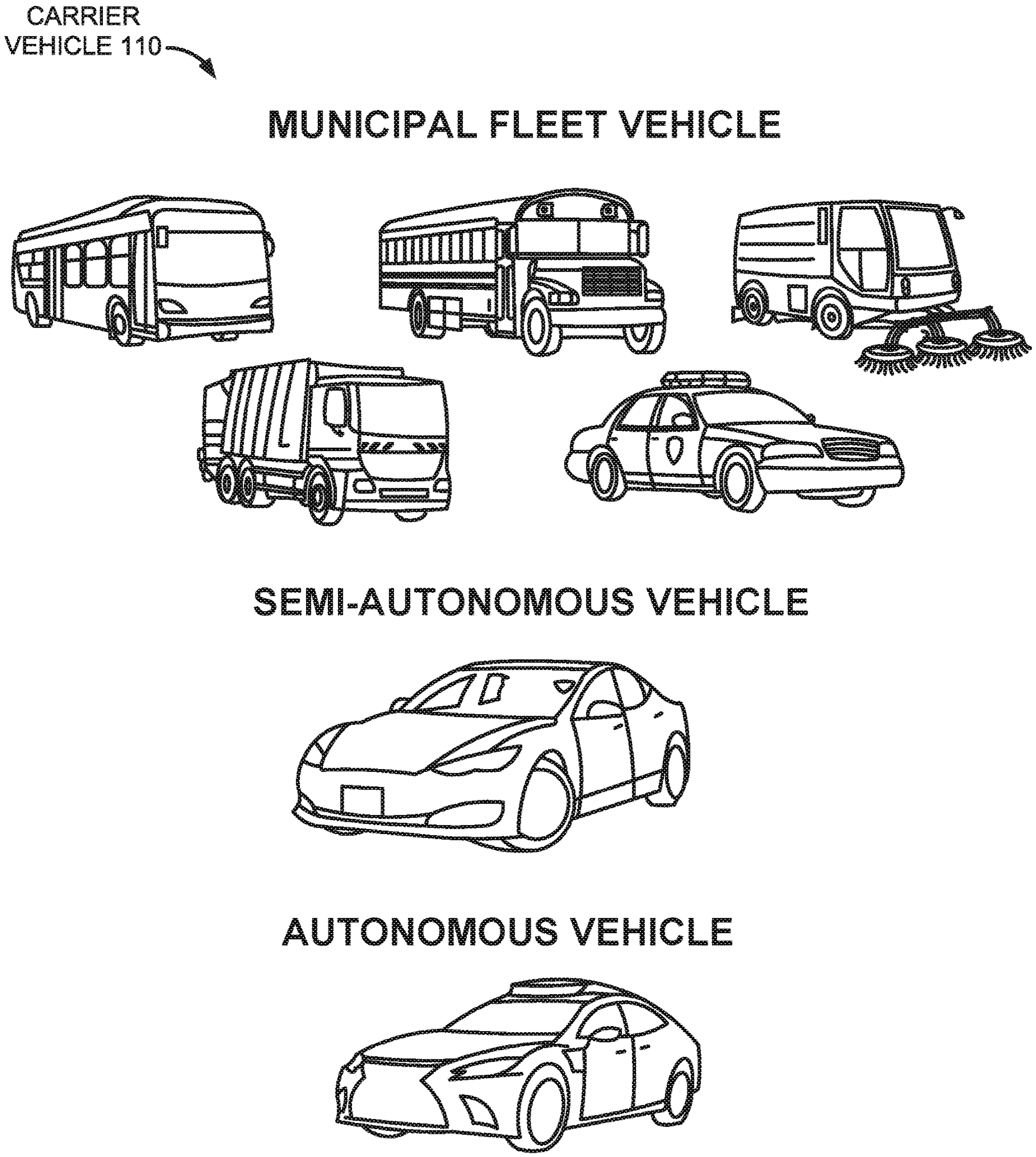
FIG. 1C illustrates different examples of carrier vehicles that can be used to carry the edge device.

FIG. 1C illustrates that, in some embodiments, the carrier vehicle 110 can be a municipal fleet vehicle. For example, the carrier vehicle 110 can be a transit vehicle such as a municipal bus, train, or light-rail vehicle, a school bus, a street sweeper, a sanitation vehicle (e.g., a garbage truck or recycling truck), a traffic or parking enforcement vehicle, or a law enforcement vehicle (e.g., a police car or highway patrol car), a tram or light-rail train.

In other embodiments, the carrier vehicle 110 can be a semi-autonomous vehicle such as a vehicle operating in one or more self-driving modes with a human operator in the vehicle. In further embodiments, the carrier vehicle 110 can be an autonomous vehicle or self-driving vehicle.

In certain embodiments, the carrier vehicle 110 can be a private vehicle or vehicle not associated with a municipality or government entity.

In alternative embodiments, the edge device 102 can be carried by or otherwise coupled to a micro-mobility vehicle (e.g., an electric scooter). In other embodiments contemplated by this disclosure, the edge device 102 can be carried by or otherwise coupled to an unmanned aerial vehicle (UAV) or drone.

Figure 2A:
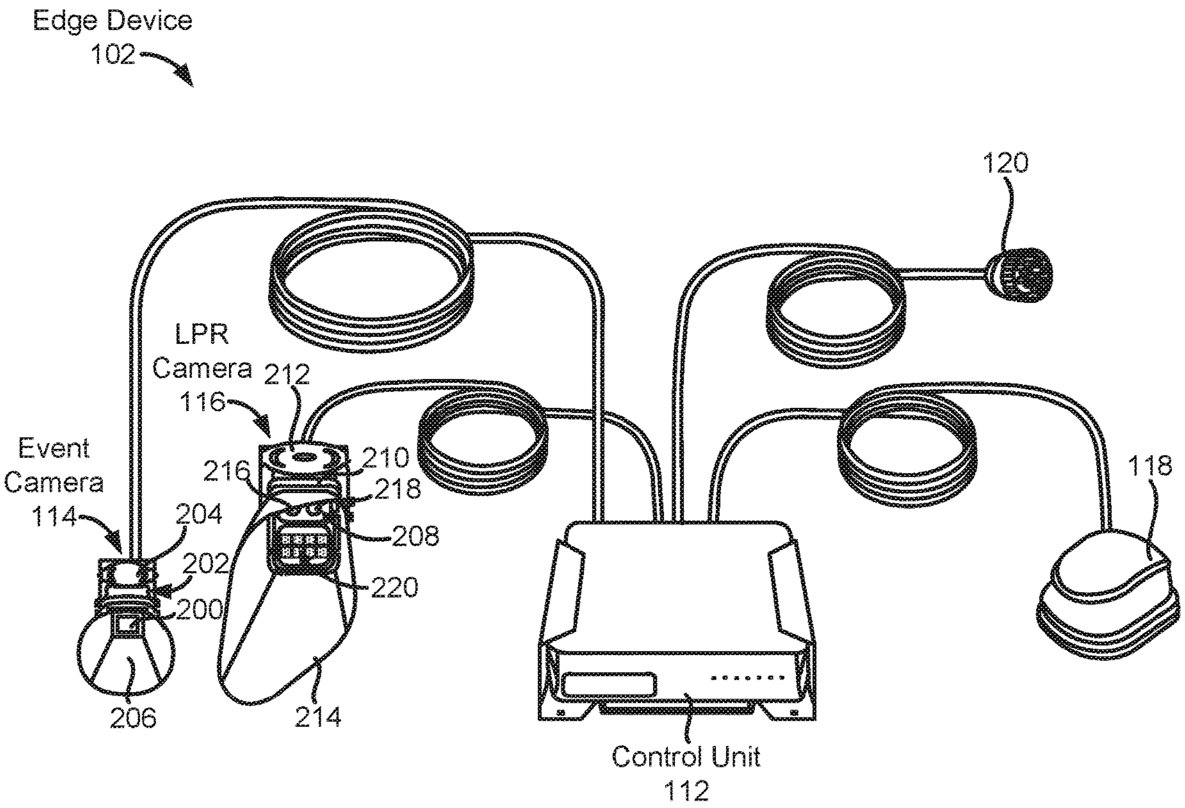
FIG. 2A illustrates one embodiment of an edge device of the system.

FIG. 2A illustrates one embodiment of an edge device 102 of the system 100. The edge device 102 can be any of the edge devices disclosed herein. For purposes of this disclosure, any references to the edge device 102 can also be interpreted as a reference to a specific component, processor, module, chip, or circuitry within the edge device 102. The edge device 102 can be configured for placement behind a windshield of a carrier vehicle 110 (e.g., a fleet vehicle, see FIG. 1C).

As shown in FIG. 2A, the edge device 102 can comprise a control unit 112, an event camera 114 communicatively coupled to the control unit 112, and one or more license plate recognition (LPR) camera cameras 116 communicatively coupled to the control unit 112. The edge device 102 can further comprise a communication and positioning unit 118 and a vehicle bus connector 120. The event camera 114 and the LPR camera 116 can be connected or communicatively coupled to the control unit 112 via high-speed camera interfaces such as a Mobile Industry Processor Interface (MIPI) camera serial interface.

The control unit 112 can comprise a plurality of processors, memory and storage units, and inertial measurement units (IMUs). The event camera 114 and the LPR camera 116 can be coupled to the control unit 112 via high-speed buses, communication cables or wires, and/or other types of wired or wireless interfaces. The components within each of the control unit 112, the event camera 114, or the LPR camera 116 can also be connected to one another via high-speed buses, communication cables or wires, and/or other types of wired or wireless interfaces.

The processors of the control unit 112 can include one or more central processing units (CPUs), graphics processing units (GPUs), Application-Specific Integrated Circuits (ASICs), field-programmable gate arrays (FPGAs), tensor processing units (TPUs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit 112 can be configured to perform operations at 21 teraflops (TFLOPS).

The processors of the control unit 112 can be configured to run multiple deep learning models or neural networks in parallel and process data received from the event camera 114, the LPR camera 116, or a combination thereof. More specifically, the processor module can be a Jetson Xavier NX™ module developed by NVIDIA Corporation. The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms (e.g., an NVDLA™ engine developed by NVIDIA Corporation).

In some embodiments, at least part of the GPU's processing power can be utilized for object detection and license plate recognition. In these embodiments, at least part of the DLA's processing power can be utilized for object detection and lane line detection. Moreover, at least part of the CPU's processing power can be used for lane line detection and simultaneous localization and mapping. The CPU's processing power can also be used to run other functions and maintain the operation of the edge device 102.

The memory and storage units can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units can comprise a 512 gigabyte (GB) SSD, an 8 GB 128-bit LPDDR4x memory, and 16 GB eMMC 5.1 storage device. The memory and storage units can store software, firmware, data (including video and image data), tables, logs, databases, or a combination thereof.

Each of the IMUs can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

For purposes of this disclosure, any references to the edge device 102 can also be interpreted as a reference to a specific component, processor, module, chip, or circuitry within a component of the edge device 102.

The communication and positioning unit 118 can comprise at least one of a cellular communication module, a WiFi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The WiFi communication module can allow the control unit 112 to communicate over a WiFi network such as a WiFi network provided by a carrier vehicle 110, a municipality, a business, or a combination thereof. The WiFi communication module can allow the control unit 112 to communicate over one or more WiFi (IEEE 802.11) communication protocols such as the 802.11n, 802.11ac, or 802.11ax protocol.

The Bluetooth® module can allow the control unit 112 to communicate with other control units on other carrier vehicles over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined WiFi and Bluetooth® module.

The communication and positioning unit 118 can comprise a multi-band global navigation satellite system (GNSS) receiver configured to concurrently receive signals from a GPS satellite navigation system, a GLONASS satellite navigation system, a Galileo navigation system, and a BeiDou satellite navigation system. For example, the communication and positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 118 can be configured to receive signals from all four of the aforementioned satellite navigation systems or three out of the four satellite navigation systems. For example, the communication and positioning unit 118 can comprise a ZED-F9K dead reckoning module provided by u-blox holding AG.

The communication and positioning unit 118 can provide positioning data that can allow the edge device 102 to determine its own location at a centimeter-level accuracy. The communication and positioning unit 118 can also provide positioning data that can be used by the control unit 112 of the edge device 102 to determine the location 130 of the potentially offending vehicle 122 (see FIG. 1B). For example, the control unit 112 can use positioning data concerning its own location to substitute for the location 130 of the potentially offending vehicle 122. The control unit 112 can also use positioning data concerning its own location to estimate or approximate the location 130 of the potentially offending vehicle 122.

FIG. 2A also illustrates that the edge device 102 can comprise a vehicle bus connector 120 coupled to the control unit 112. The vehicle bus connector 120 can allow the control unit 112 to obtain wheel odometry data from a wheel odometer of a carrier vehicle 110 carrying the edge device 102. For example, the vehicle bus connector 120 can be a J1939 connector. The control unit 112 can take into account the wheel odometry data to determine the location of the potentially offending vehicle 122.

The edge device 102 can also comprise a power management integrated circuit (PMIC). The PMIC can be used to manage power from a power source. In some embodiments, the components of the edge device 102 can be powered by a portable power source such as a battery. In other embodiments, one or more components of the edge device 102 can be powered via a physical connection (e.g., a power cord) to a power outlet or direct-current (DC) auxiliary power outlet (e.g., 12V/24V) of a carrier vehicle 110 carrying the edge device 102.

The event camera 114 can comprise an event camera image sensor 200 contained within an event camera housing 202, an event camera mount 204 coupled to the event camera housing 202, and an event camera skirt 206 coupled to and protruding outwardly from a front face or front side of the event camera housing 202.

The event camera housing 202 can be made of a metallic material (e.g., aluminum), a polymeric material, or a combination thereof. The event camera mount 204 can be coupled to the lateral sides of the event camera housing 202. The event camera mount 204 can comprise a mount rack or mount plate positioned vertically above the event camera housing 202. The mount rack or mount plate of the event camera mount 204 can allow the event camera 114 to be mounted or otherwise coupled to a ceiling and/or headliner of the carrier vehicle 110. The event camera mount 204 can allow the event camera housing 202 to be mounted in such a way that a camera lens of the event camera 114 faces the windshield of the carrier vehicle 110 or is positioned substantially parallel with the windshield. This can allow the event camera 114 to take videos of an environment outside of the carrier vehicle 110 including vehicles parked near the carrier vehicle 110. The event camera mount 204 can also allow an installer to adjust a pitch/tilt and/or swivel/yaw of the event camera housing 202 to account for a tilt or curvature of the windshield.

The event camera skirt 206 can block or reduce light emanating from an interior of the carrier vehicle 110 to prevent such light from interfering with the videos captured by the event camera image sensor 200. For example, when the carrier vehicle 110 is a municipal bus, the interior of the municipal bus is often lit by artificial lights (e.g., fluorescent lights, LED lights, etc.) to ensure passenger safety. The event camera skirt 206 can block or reduce the amount of artificial light that reaches the event camera image sensor 200 to prevent this light from degrading the videos captured by the event camera image sensor 200. The event camera skirt 206 can be designed to have a tapered or narrowed end and a wide flared end. The tapered end of the event camera skirt 206 can be coupled to a front portion or front face/side of the event camera housing 202. The event camera skirt 206 can also comprise a skirt distal edge defining the wide flared end. In some embodiments, the event camera 114 can be mounted or otherwise coupled in such a way that the skirt distal edge of the event camera skirt 206 is separated from the windshield of the carrier vehicle 110 by a separation distance. In some embodiments, the separation distance can be between about 1.0 cm and 10.0 cm.

In some embodiments, the event camera skirt 206 can be made of a dark-colored non-transparent polymeric material. In certain embodiments, the event camera skirt 206 can be made of a non-reflective material. As a more specific example, the event camera skirt 206 can be made of a dark-colored thermoplastic elastomer such as thermoplastic polyurethane (TPU).

The event camera image sensor 200 can be configured to capture video at a frame rate of between 15 frame per second and up to 60 frames per second (FPS). For example, the event camera image sensor 200 can be a high-dynamic range (HDR) image sensor. The event camera image sensor 200 can capture video images at a minimum resolution of 1920×1080 (or 2 megapixels). As a more specific example, the event camera image sensor 200 can comprise one or more CMOS image sensors provided by OMNIVISION Technologies, Inc.

As previously discussed, the event camera 114 can capture videos of an environment outside of the carrier vehicle 110, including any vehicles parked near the carrier vehicle 110, as the carrier vehicle 110 traverses its usual carrier route. The control unit 112 can be programmed to apply a plurality of functions from a computer vision library to the videos to read event video frames 124 from the videos and pass the event video frames 124 to a plurality of deep learning models (e.g., neural networks) running on the control unit 112 to automatically identify objects (e.g., cars, trucks, buses, etc.) and roadways (e.g., a roadway encompassing the no-parking lane 140) from the event video frames 124 in order to determine whether a double parking violation has occurred.

As shown in FIG. 2A, the edge device 102 can also comprise an LPR camera 116. The LPR camera 116 can comprise at least two LPR image sensors 208 contained within an LPR camera housing 210, an LPR camera mount 212, coupled to the LPR camera housing 210, and an LPR camera skirt 214 coupled to and protruding outwardly from a front face or front side of the LPR camera housing 210.

The LPR camera housing 210 can be made of a metallic material (e.g., aluminum), a polymeric material, or a combination thereof. The LPR camera mount 212 can be coupled to the lateral sides of the LPR camera housing 210. The LPR camera mount 212 can comprise a mount rack or mount plate positioned vertically above the LPR camera housing 210. The mount rack or mount plate of the LPR camera mount 212 can allow the LPR camera 116 to be mounted or otherwise coupled to a ceiling and/or headliner of the carrier vehicle 110. The LPR camera mount 212 can also allow an installer to adjust a pitch/tilt and/or swivel/yaw of the LPR camera housing 210 to account for a tilt or curvature of the windshield.

The LPR camera mount 212 can allow the LPR camera housing 210 to be mounted in such a way that the LPR camera 116 faces the windshield of the carrier vehicle 110 at an angle. This can allow the LPR camera 116 to capture videos of license plates of vehicles directly in front of or on one side (e.g., a right side or left side) of the carrier vehicle 110.

The LPR camera 116 can comprise a daytime image sensor 216 and a nighttime image sensor 218. The daytime image sensor 216 can be configured to capture images or videos in the daytime or when sunlight is present. Moreover, the daytime image sensor 216 can be an image sensor configured to capture images or videos in the visible spectrum.

The nighttime image sensor 218 can be an infrared (IR) or near-infrared (NIR) image sensor configured to capture images or videos in low-light conditions or at nighttime.

In certain embodiments, the daytime image sensor 216 can comprise a CMOS image sensor manufactured or distributed by OmniVision Technologies, Inc. For example, the daytime image sensor 216 can be the OmniVision OV2311 CMOS image sensor configured to capture videos between 15 FPS and 60 FPS.

The nighttime image sensor 218 can comprise an IR or NIR image sensor manufactured or distributed by OmniVision Technologies, Inc.

In other embodiments not shown in the figures, the LPR camera 116 can comprise one image sensor with both daytime and nighttime capture capabilities. For example, the LPR camera 116 can comprise one RGB-IR image sensor.

The LPR camera can also comprise a plurality of IR or NIR light-emitting diodes (LEDs) 220 configured to emit IR or NIR light to illuminate an event scene in low-light or nighttime conditions. In some embodiments, the IR/NIR LEDs 220 can be arranged as an IR/NIR light array (see FIG. 2A).

The IR LEDs 220 can emit light in the infrared or near-infrared (NIR) range (e.g., about 800 nm to about 1400 nm) and act as an IR or NIR spotlight to illuminate a nighttime environment or low-light environment immediately outside of the carrier vehicle 110. In some embodiments, the IR LEDs 220 can be arranged as a circle or in a pattern surrounding or partially surrounding the nighttime image sensor 218. In other embodiments, the IR LEDs 220 can be arranged in a rectangular pattern, an oval pattern, and/or a triangular pattern around the nighttime image sensor 218.

In additional embodiments, the LPR camera 116 can comprise a nighttime image sensor 218 (e.g., an IR or NIR image sensor) positioned in between two IR LEDs 220. In these embodiments, one IR LED 220 can be positioned on one lateral side of the nighttime image sensor 218 and the other IR LED 220 can be positioned on the other lateral side of the nighttime image sensor 218.

In certain embodiments, the LPR camera 116 can comprise between 3 and 12 IR LEDS 220. In other embodiments, the LPR camera 116 can comprise between 12 and 20 IR LEDs.

In some embodiments, the IR LEDs 220 can be covered by an IR bandpass filter. The IR bandpass filter can allow only radiation in the IR range or NIR range (between about 780 nm to about 1500 nm) to pass while blocking light in the visible spectrum (between about 380 nm to about 700 nm). In some embodiments, the IR bandpass filter can be an optical-grade polymer-based filter or a piece of high-quality polished glass. For example, the IR bandpass filter can be made of an acrylic material (optical-grade acrylic) such as an infrared transmitting acrylic sheet. As a more specific example, the IR bandpass filter can be a piece of poly (methyl methacrylate) (PMMA) (e.g., Plexiglass™) that covers the IR LEDs 220.

In some embodiments, the LPR camera skirt 214 can be made of a dark-colored non-transparent polymeric material. In certain embodiments, the LPR camera skirt 214 can be made of a polymeric material. For example, the LPR camera skirt 214 can be made of a non-reflective material. As a more specific example, the LPR camera skirt 214 can be made of a dark-colored thermoplastic elastomer such as thermoplastic polyurethane (TPU).

Although FIG. 2A illustrates an embodiment of the LPR camera 116 with only one LPR camera skirt 214, it is contemplated by this disclosure that the LPR camera 116 can comprise an outer LPR camera skirt and an inner LPR camera skirt. The inner LPR camera skirt can block IR light reflected by the windshield of the carrier vehicle 110 that can interfere with the videos captured by the nighttime image sensor 218.

The LPR camera skirt 214 can comprise a first skirt lateral side, a second skirt lateral side, a skirt upper side, and a skirt lower side. The first skirt lateral side can have a first skirt lateral side length. The second skirt lateral side can have a second skirt lateral side length. In some embodiments, the first skirt lateral side length can be greater than the second skirt lateral side length such that the first skirt lateral side protrudes out further than the second skirt lateral side. In these and other embodiments, any of the first skirt lateral side length or the second skirt lateral side length can vary along a width of the first skirt lateral side or along a width of the second skirt lateral side, respectively. However, in all such embodiments, a maximum length or height of the first skirt lateral side is greater than a maximum length or height of the second skirt lateral side. In further embodiments, a minimum length or height of the first skirt lateral side is greater than a minimum length or height of the second skirt lateral side. The skirt upper side can have a skirt upper side length or a skirt upper side height. The skirt lower side can have a skirt lower side length or a skirt lower side height. In some embodiments, the skirt lower side length or skirt lower side height can be greater than the skirt upper side length or the skirt upper side height such that the skirt lower side protrudes out further than the skirt upper side. The unique design of the LPR camera skirt 214 can allow the LPR camera 116 to be positioned at an angle with respect to a windshield of the carrier vehicle 110 but still allow the LPR camera skirt 214 to block light emanating from an interior of the carrier vehicle 110 or block light from interfering with the image sensors of the LPR camera 116.

The LPR camera 116 can capture videos of license plates of vehicles parked near the carrier vehicle 110 as the carrier vehicle 110 traverses its usual carrier route. The control unit 112 can be programmed to apply a plurality of functions from a computer vision library to the videos to read license plate video frames 126 from the videos and pass the license plate video frames 126 to a license plate recognition deep learning model running on the control unit 112 to automatically extract license plate numbers 128 from such license plate video frames 126. For example, the control unit 112 can pass the license plate video frames 126 to the license plate recognition deep learning model running on the control unit 112 to extract license plate numbers of all vehicles detected by an object detection deep learning model running on the control unit 112.

Figure 3:
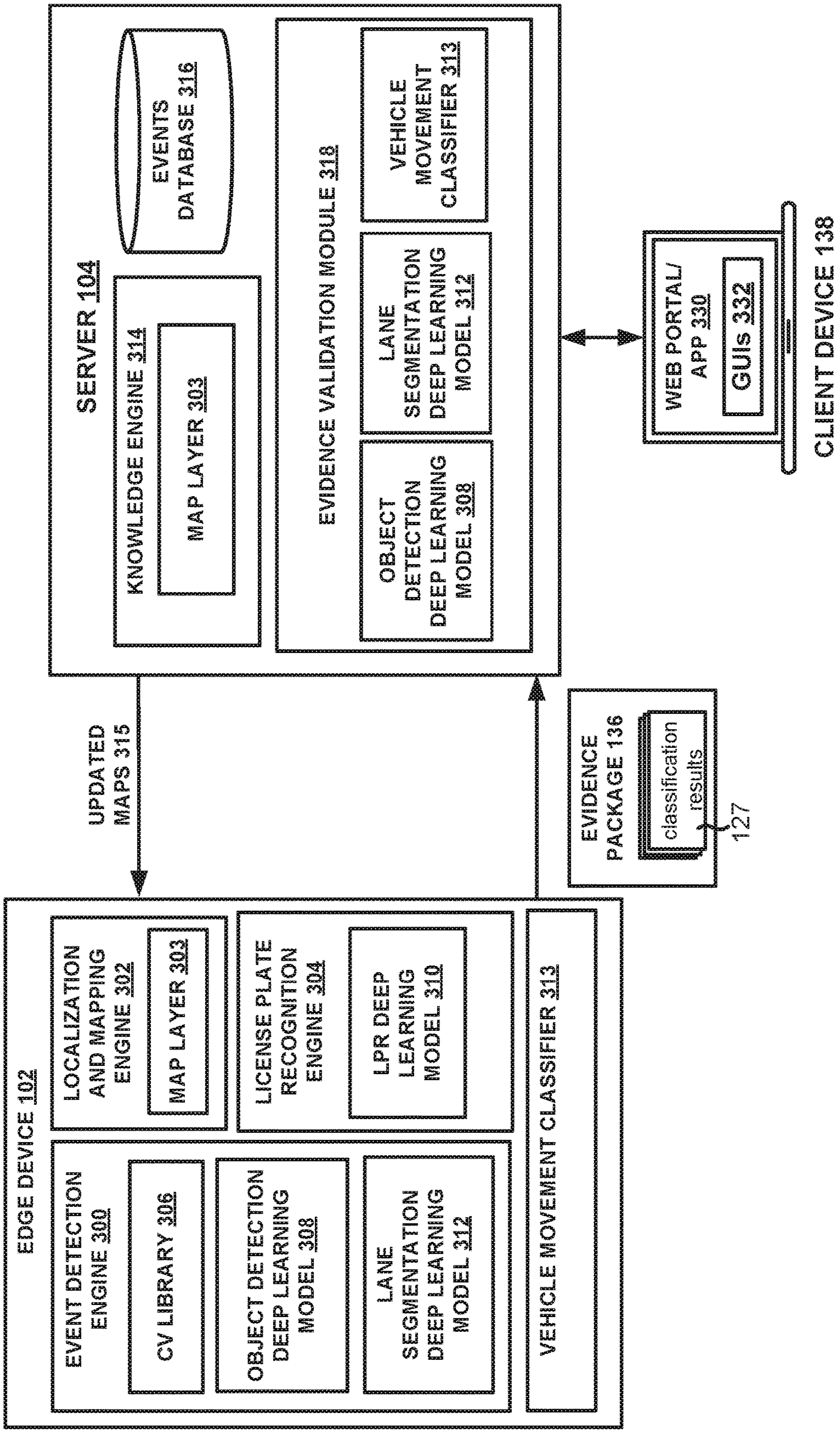
FIG. 3 illustrates various modules and engines of the edge device and server.

The control unit 112 can also pass the event video frames 124 to a plurality of deep learning models running on the edge device 102 (see FIG. 3). The deep learning models can be neural networks running on the edge device 102 that determine a context surrounding the double parking violation.

If the control unit 112 determines that a double parking violation has occurred, the control unit 112 can generate an evidence package 136 comprising at least some of the event video frames 124, the license plate video frames 126, the classification results 127, and data/information concerning the double parking violation for transmission to the server 104 (see FIG. 1A). The control unit 112 can include the automatically recognized license plate number 128 of the license plate 129 of the potentially offending vehicle 122 involved in the double parking violation in the evidence package 136.

As will be discussed in more detail with respect to FIG. 3, once the server 104 has received the evidence package 136, the one or more processors of the server 104 can be programmed to pass the event video frames 124 and the license plate video frames 126 to a plurality of deep learning models running on the server 104. The deep learning models (e.g., neural networks) running on the server 104 can then output its own predictions or classifications to validate the evidence received from the edge device(s) 102.

For example, such predictions or classifications can concern context-related features automatically extracted from the event video frames 124 by the deep learning models running on the server 104. The server 104 can then use these classification results to automatically validate or reject the evidence package 136 received from the edge device 102. Moreover, the server 104 can also use these classification results to determine whether the evidence package 136 should be recommended for further review by a human reviewer or another round of automated review by the server 104 or another computing device.

Figure 2B:
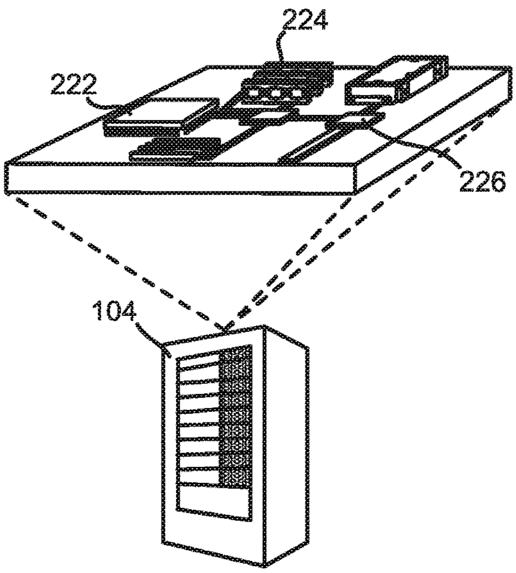
FIG. 2B illustrates one embodiment of a server of the system.

FIG. 2B illustrates one embodiment of the server 104 of the system 100. As previously discussed, the server 104 can comprise or refer to one or more virtual servers or virtualized computing resources. For example, the server 104 can refer to a virtual server or cloud server hosted and delivered by a cloud computing platform (e.g., Amazon Web Services®, Microsoft Azure®, or Google Cloud®). In other embodiments, the server 104 can refer to one or more physical servers or dedicated computing resources or nodes such as a rack-mounted server, a blade server, a mainframe, a dedicated desktop or laptop computer, one or more processors or processors cores therein, or a combination thereof.

For purposes of the present disclosure, any references to the server 104 can also be interpreted as a reference to a specific component, processor, module, chip, or circuitry within the server 104.

For example, the server 104 can comprise one or more server processors 222, server memory and storage units 224, and a server communication interface 226. The server processors 222 can be coupled to the server memory and storage units 224 and the server communication interface 226 through high-speed buses or interfaces.

The one or more server processors 222 can comprise one or more CPUs, GPUs, ASICS, FPGAs, TPUs, or a combination thereof. The one or more server processors 222 can execute software stored in the server memory and storage units 224 to execute the methods or instructions described herein. The one or more server processors 222 can be embedded processors, processor cores, microprocessors, logic circuits, hardware FSMs, DSPs, or a combination thereof. As a more specific example, at least one of the server processors 222 can be a 64-bit processor.

The server memory and storage units 224 can store software, data (including video or image data), tables, logs, databases, or a combination thereof. The server memory and storage units 224 can comprise an internal memory and/or an external memory, such as a memory residing on a storage node or a storage server. The server memory and storage units 224 can be a volatile memory or a non-volatile memory. For example, the server memory and storage units 224 can comprise nonvolatile storage such as NVRAM, Flash memory, solid-state drives, hard disk drives, and volatile storage such as SRAM, DRAM, or SDRAM.

The server communication interface 226 can refer to one or more wired and/or wireless communication interfaces or modules. For example, the server communication interface 226 can be a network interface card. The server communication interface 226 can comprise or refer to at least one of a WiFi communication module, a cellular communication module (e.g., a 4G or 5G cellular communication module), and a Bluetooth®/BLE or other type of short-range communication module. The server 104 can connect to or communicatively couple with each of the edge devices 102 via the server communication interface 226. The server 104 can transmit or receive packets of data using the server communication interface 226.

Figure 2C:
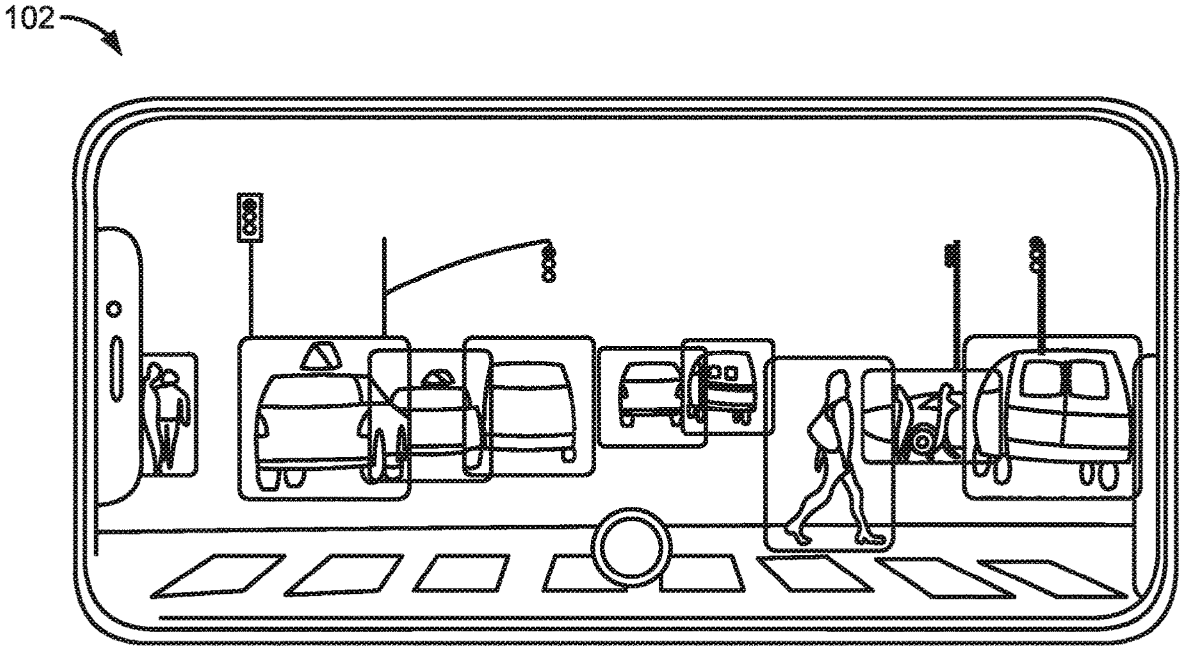
FIG. 2C illustrates another embodiment of the edge device as a personal communication device.

FIG. 2C illustrates an alternative embodiment of the edge device 102 where the edge device 102 is a personal communication device such as a smartphone or tablet computer. In this embodiment, the event camera 114 and the LPR camera 116 of the edge device 102 can be the built-in cameras or image sensors of the smartphone or tablet computer. Moreover, references to the one or more processors, the memory and storage units, the communication and positioning unit 118, and the IMUs of the edge device 102 can refer to the same or similar components within the smartphone or tablet computer.

Also, in this embodiment, the smartphone or tablet computer serving as the edge device 102 can also wirelessly communicate or be communicatively coupled to the server 104 via the secure connection 108. The smartphone or tablet computer can also be positioned near a windshield or window of a carrier vehicle 110 via a phone or tablet holder coupled to the ceiling/headliner, windshield, window, console, and/or dashboard of the carrier vehicle 110.

FIG. 3 illustrates certain modules and engines of one embodiment of an edge device 102 and the server 104. In some embodiments, the edge device 102 can comprise at least an event detection engine 300, a localization and mapping engine 302, and a license plate recognition engine 304, and a vehicle movement classifier 313.

Software instructions run on the edge device 102, including any of the engines and modules disclosed herein, can be written in the Java® programming language, C++ programming language, the Python® programming language, the Golang™ programming language, or a combination thereof.

As previously discussed, the edge device 102 can continuously capture videos of an external environment surrounding the edge device 102. For example, the event camera 114 (see FIG. 2A) and the LPR camera 116 (see FIG. 2A) of the edge device 102 can capture everything that is within a field of view of the cameras.

In some embodiments, the event camera 114 can capture videos comprising a plurality of event video frames 124 and the LPR camera 116 can capture videos comprising a plurality of license plate video frames 126.

In alternative embodiments, the event camera 114 can also capture videos of license plates that can be used as license plate video frames 126. Moreover, the LPR camera 116 can capture videos of a double parking violation event that can be used as event video frames 124.

The edge device 102 can retrieve or grab the event video frames 124, the license plate video frames 126, or a combination thereof from a shared camera memory. The shared camera memory can be an onboard memory (e.g., nonvolatile memory) of the edge device 102 for storing video frames captured by the event camera 114, the LPR camera 116, or a combination thereof. Since the event camera 114 and the LPR camera 116 are capturing videos at approximately 15 to 60 video frames per second (fps), the video frames are stored in the shared camera memory prior to being analyzed by the event detection engine 300. In some embodiments, the video frames can be grabbed using a video frame grab function such as the GStreamer tool.

The event detection engine 300 can call a plurality of functions from a computer vision library 306 to enhance one or more video frames by resizing, cropping, or rotating the one or more video frames. For example, the event detection engine 300 can crop and resize the one or more video frames to optimize the one or more video frames for analysis by one or more deep learning models or neural networks running on the edge device 102.

For example, the event detection engine 300 can crop and resize at least one of the video frames to produce a cropped and resized video frame that meets certain size parameters associated with the deep learning models running on the edge device 102. Also, for example, the event detection engine 300 can crop and resize the one or more video frames such that the aspect ratio of the one or more video frames meets parameters associated with the deep learning models running on the edge device 102.

In some embodiments, the computer vision library 306 can be the OpenCV® library maintained and operated by the Open Source Vision Foundation. In other embodiments, the computer vision library 306 can be or comprise functions from the TensorFlow® software library, the SimpleCV® library, or a combination thereof.

The event detection engine 300 can pass or feed at least some of the event video frames 124 to an object detection deep learning model 308 (e.g., a neural network trained for object detection) running on the edge device 102. By passing and feeding the event video frames 124 to the object detection deep learning model 308, the event detection engine 300 can obtain as outputs from the object detection deep learning model 308 predictions, scores, or probabilities concerning the objects detected from the event video frames 124. For example, the event detection engine 300 can obtain as outputs a confidence score for each of the object classes detected.

In some embodiments, the object detection deep learning model 308 can be configured or trained such that only certain vehicle-related objects are supported by the object detection deep learning model 308. For example, the object detection deep learning model 308 can be configured or trained such that the object classes supported only include cars, trucks, buses, etc. Also, for example, the object detection deep learning model 308 can be configured or trained such that the object classes supported also include bicycles, scooters, and other types of wheeled mobility vehicles. In some embodiments, the object detection deep learning model 308 can be configured or trained such that the object classes supported also comprise non-vehicle classes such as pedestrians, landmarks, street signs, fire hydrants, bus stops, and building façades.

In some embodiments, the object detection deep learning model 308 can be configured to detect more than 100 (e.g., between 100 and 200) objects per video frame. Although the object detection deep learning model 308 can be configured to accommodate numerous object classes, one advantage of limiting the number of object classes is to reduce the computational load on the processors of the edge device 102, shorten the training time of the neural network, and make the neural network more efficient.

The object detection deep learning model 308 can comprise a plurality of convolutional layers and connected layers trained for object detection (and, in particular, vehicle detection). In one embodiment, the object detection deep learning model 308 can be a convolutional neural network trained for object detection. For example, the object detection deep learning model 308 can be a variation of the Single Shot Detection (SSD) model with a MobileNet backbone as the feature extractor.

In other embodiments, the object detection deep learning model 308 can be the You Only Look Once Lite (YOLO Lite) object detection model.

In some embodiments, the object detection deep learning model 308 can also identify or predict certain attributes of the detected objects. For example, the object detection deep learning model 308 can identify or predict a set of attributes of an object identified as a vehicle (also referred to as vehicle attributes 134) such as the color of the vehicle, the make and model of the vehicle, and the vehicle type (e.g., whether the vehicle is a personal vehicle or a public service vehicle). The vehicle attributes 134 can be used by the event detection engine 300 to make an initial determination as to whether the vehicle shown in the video frames is subject to a municipality's double parking violation rules or policies.

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

As shown in FIG. 3, the edge device 102 can also comprise a license plate recognition engine 304. The license plate recognition engine 304 can be configured to recognize license plate numbers 128 of potentially offending vehicles 122 (see, also, FIG. 5C) in the video frames. For example, the license plate recognition engine 304 can pass license plate video frames 126 captured by the dedicated LPR camera 116 of the edge device 102 to a license plate recognition (LPR) deep learning model 310 running on the edge device 102. The LPR deep learning model 310 can be specifically trained to recognize license plate numbers 128 of vehicles (e.g., the potentially offending vehicle 122) from video frames or images containing license plates 129 of such vehicles. Alternatively, or additionally, the license plate recognition engine 304 can also pass event video frames 124 to the LPR deep learning model 310 to recognize license plate numbers 128 of vehicles (e.g., the potentially offending vehicle 122) from such event video frames 124.

In some embodiments, the LPR deep learning model 310 can be a neural network trained for license plate recognition. In certain embodiments, the LPR deep learning model 310 can be a modified version of the OpenALPR™ license plate recognition model.

In other embodiments, the license plate recognition engine 304 can also undertake automated license plate recognition using a text-adapted vision transformer.

By feeding video frames or images into the LPR deep learning model 310 or the text-adapted vision transformer, the edge device 102 can obtain as an output from the license plate recognition engine 304, a prediction in the form of an alphanumeric string representing the license plate number 128 of the license plate 129.

In some embodiments, the license plate recognition engine 304 or the LPR deep learning model 310 running on the edge device 102 can generate or output a confidence score associated with a prediction confidence representing the confidence or certainty of its own recognition result (i.e., indicative of or represent the confidence or certainty in the license plate recognized by the LPR deep learning model 310 from the license plate video frames 126).

The plate recognition confidence score (see, e.g., confidence score 512 in FIG. 5C) can be a number between 0 and 1.00. As previously discussed, the plate recognition confidence score can be included as part of an evidence package 136 transmitted to the server 104. The evidence package 136 can comprise the plate recognition confidence score along with the license plate number 128 predicted by the LPR deep learning model 310.

As previously discussed, the edge device 102 can also comprise a localization and mapping engine 302 comprising a map layer 303. The localization and mapping engine 302 can calculate or otherwise estimate the location 130 of the potentially offending vehicle 122 based in part on the present location of the edge device 102 obtained from at least one of the communication and positioning unit 118 (see, e.g., FIG. 2A) of the edge device 102, inertial measurement data obtained from the IMUs of the edge device 102, and wheel odometry data obtained from the wheel odometer of the carrier vehicle 110 carrying the edge device 102. For example, the localization and mapping engine 302 can use the present location of the edge device 102 to represent the location 130 of the potentially offending vehicle 122.

In other embodiments, the localization and mapping engine 302 can estimate the location 130 of the potentially offending vehicle 122 by calculating a distance separating the potentially offending vehicle 122 from the edge device 102 and adding such a separation distance to its own present location. As a more specific example, the localization and mapping engine 302 can calculate the distance separating the potentially offending vehicle 122 from the edge device 102 using video frames containing the license plate of the potentially offending vehicle 122 and a computer vision algorithm (e.g., an image depth analysis algorithm) designed for distance calculation. In additional embodiments, the localization and mapping engine 302 can determine the location 130 of the potentially offending vehicle 122 by recognizing an object or landmark (e.g., a bus stop sign) with a known geolocation associated with the object or landmark near the potentially offending vehicle 122.

The map layer 303 can comprise one or more semantic maps or semantic annotated maps. The edge device 102 can receive updates to the map layer 303 from the server 104 or receive new semantic maps or semantic annotated maps from the server 104. The map layer 303 can also comprise data and information concerning the widths of all lanes of roadways in a municipality. For example, the known or predetermined width of each of the lanes can be encoded or embedded in the map layer 303. The known or predetermined width of each of the lanes can be obtained by performing surveys or measurements of such lanes in the field or obtained from one or more publicly-available map databases or municipal/governmental databases. Such lane width data can then be associated with the relevant streets/roadways, areas/regions, or coordinates in the map layer 303.

The map layer 303 can further comprise data or information concerning a total number of lanes of certain municipal roadways and the direction-of-travel of such lanes. Such data or information can also be obtained by performing surveys or measurements of such lanes in the field or obtained from one or more publicly-available map databases or municipal/governmental databases. Such data or information can be encoded or embedded in the map layer 303 and then associated with the relevant streets/roadways, areas/regions, or coordinates in the map layer 303.

The edge device 102 can also record or generate at least a plurality of timestamps 132 marking the time when the potentially offending vehicle 122 was detected at the location 130. For example, the localization and mapping engine 302 can mark the time using a global positioning system (GPS) timestamp, a Network Time Protocol (NTP) timestamp, a local timestamp based on a local clock running on the edge device 102, or a combination thereof. The edge device 102 can record the timestamps 132 from multiple sources to ensure that such timestamps 132 are synchronized with one another in order to maintain the accuracy of such timestamps 132.

In some embodiments, the event detection engine 300 can also pass the event video frames 124 to a lane segmentation deep learning model 312 running on the edge device 102. As will be discussed in more detail in relation to FIGS. 7A-7C, one prediction head of the lane segmentation deep learning model 312 can generate or output a mask 706 or heatmap (see. e.g., FIG. 7B) representing an edge or boundary of a roadway 700 shown in the event video frames 124. The mask 706 or heatmap can be considered an initial rough approximation of a road edge 701 (see FIGS. 7A and 7C). The pixels of the mask 706 or heatmap can be reduced through various culling procedures until only a few road edge points 705 remain. These road edge points 705 can be further culled using an iterative non-deterministic outlier detection algorithm to yield a line 703 representing the road edge 701.

In some embodiments, the iterative non-deterministic outlier detection algorithm can be a random sample consensus (RANSAC) algorithm that randomly selects a subset of points to be inliers, attempts to fit a line (e.g., a linear regression model) to the subset of points, discards outlier points, and repeats the process until additional outlier points are identified and discarded.

Figure 7A:
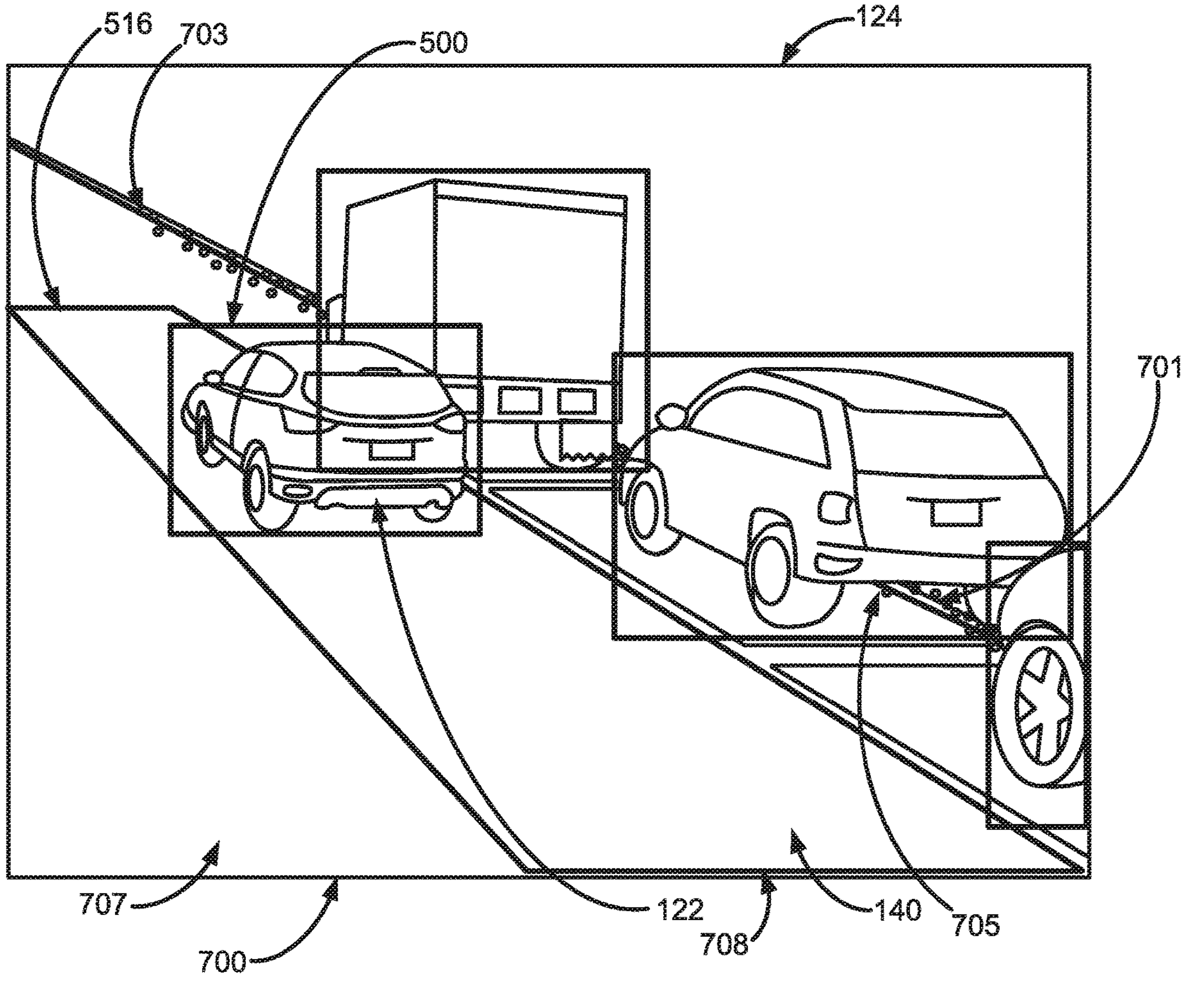
FIG. 7A illustrates an event video frame showing a no-parking lane determined based on a road edge automatically detected using a road edge detection algorithm.
Figure 7B:
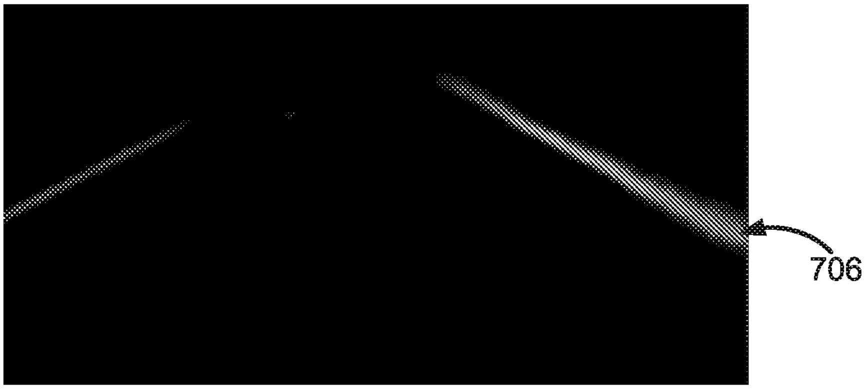
FIG. 7B is a black-and-white image showing a visualization of a mask used to detect the road edge.
Figure 7C:
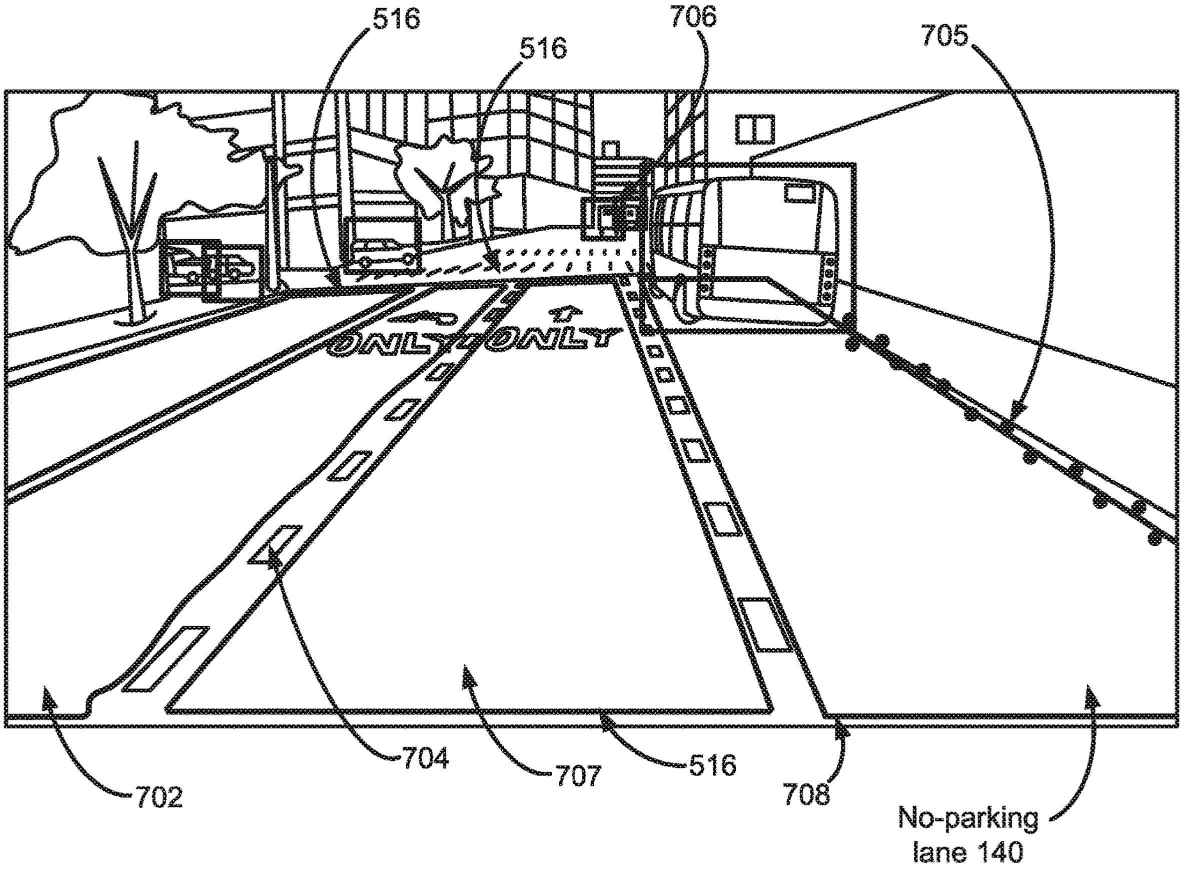
FIG. 7C illustrates an event video frame showing various lanes bounded by polygons, including a no-parking lane, and road edge points used to detect the no-parking lane.

The event detection engine 300 can then determine a layout of one or more lanes of a roadway 700, including the no-parking lane 140, using the fitted line 703 to represent the road edge 701 (see FIGS. 7A and 7C). The layout of the lanes 707 can be determined by the event detection engine 300 using a known or predetermined width of each of the lanes 707 encoded or embedded in the map layer 303.

For example, the event detection engine 300 can determine the location of a no-parking lane 140 based on the fitted line 703 representing the road edge 701, the known or predetermined width of the lanes 707 (obtained from the map layer 303), and the location or position of the no-parking lane 140 relative to the other lanes 707 of the roadway 700.

Once the location of the no-parking lane 140 is determined, the lane segmentation deep learning model 312 can then bound the no-parking lane 140 using a lane-of-interest (LOI) polygon 708 (see FIGS. 7A and 7C). The lane segmentation deep learning model 312 can also output image coordinates associated with the LOI polygon 708.

In some embodiments, the lane segmentation deep learning model 312 running on the edge device 102 can be a neural network or convolutional neural network trained for lane detection and segmentation. For example, the lane segmentation deep learning model 312 can be a multi-headed convolutional neural network comprising a residual neural network (e.g., a ResNet such as a ResNet34) backbone with a standard mask prediction.

In certain embodiments, the lane segmentation deep learning model 312 can be trained using a dataset designed specifically for lane detection and segmentation. In other embodiments, the lane segmentation deep learning model 312 can also be trained using event video frames 124 obtained from other deployed edge devices 102.

As will be discussed in more detail in the following sections, the object detection deep learning model 308 can bound a potentially offending vehicle 122 detected within an event video frame 124 with a vehicle bounding polygon 500 (see FIGS. 5A, 5D, and 7A). In some embodiments, the vehicle bounding polygon 500 can be a vehicle bounding box. The object detection deep learning model 308 can also output image coordinates associated with the vehicle bounding polygon 500.

The image coordinates associated with the vehicle bounding polygon 500 can be compared with the image coordinates associated with the lane bounding polygons 516 outputted by the lane segmentation deep learning model 312. The image coordinates associated with the vehicle bounding polygon 500 can be compared with the image coordinates associated with the LOI polygon 708 (see FIG. 7A). The event detection engine 300 can detect a potential double parking violation based in part on an amount of overlap of at least part of the vehicle bounding polygon 500 and the LOI polygon 708.

If the edge device 102 detects that a potential double parking violation has occurred, the edge device 102 can transmit data, videos, and other files to the server 104 in the form of an evidence package 136. As previously discussed, the evidence package 136 can comprise the event video frames 124, the license plate video frames 126, and one or more classification results 127 related to a context surrounding the double parking violation. The one or more classification results 127 can be confidence scores or probabilities outputted by the one or more deep learning models running on the edge device 102. The evidence package 136 can also comprise a confidence score outputted by the LPR deep learning model 310 concerning a license plate automatically recognized by the LPR deep learning model 310. The evidence package 136 can also comprise confidence scores outputted by the object detection deep learning model 308 concerning vehicles detected by the object detection deep learning model 308.

The evidence package 136 can also comprise at least one license plate number 128 recognized by the edge device 102 using the license plate video frames 126 as inputs, a location 130 of the potentially offending vehicle 122 estimated or otherwise calculated by the edge device 102, the speed of the carrier vehicle 110 when the double parking violation was detected, any timestamps 132 recorded by the control unit 112, and vehicle attributes 134 of the potentially offending vehicle 122 captured by the event video frames 124.

As shown in FIG. 3, the edge device 102 can also comprise a vehicle movement classifier 313. The vehicle movement classifier 313 can be configured to determine whether the potentially offending vehicle 122 is static or moving when captured by the event camera 114. It is important to differentiate between a vehicle that is moving and a vehicle that is static because a moving vehicle detected within a no-parking lane 140 cannot be assessed a double parking violation.

In some embodiments, the edge device 102 can determine that a double parking violation has occurred only if the potentially offending vehicle 122 is determined to be static.

As will be discussed in more detail in relation to FIGS. 9-14, the vehicle movement classifier 313 can receive as inputs a number of event video frames 124 where the potentially offending vehicle 122 appearing in such event video frames 124 has been bounded by a vehicle bounding polygon 500.

The vehicle movement classifier 313 (or vehicle movement classification module) can track the vehicle bounding polygons 500 across multiple event video frames 124. The vehicle bounding polygons 500 can be connected across multiple frames using a tracking algorithm such as a mixed integer linear programming (MILP) algorithm.

The vehicle movement classifier 313 can first associate GPS coordinates (obtained from the positioning unit 118 of the edge device 102) with timestamps of each of the event video frames 124. The vehicle movement classifier 313 can then determine the GPS coordinates of the vehicle bounding polygons 500 using a homography localization algorithm. The GPS coordinates of the vehicle bounding polygons 500 across multiple event video frames 124 can then be transformed or converted into a local Cartesian coordinate system.

The longitudinal axis of the local Cartesian coordinate system can be in a direction of travel of the carrier vehicle 110 carrying the edge device 102. The latitudinal axis of the local Cartesian coordinate system can be in a lateral direction perpendicular to the longitudinal axis.

As will be discuss in more detail in relation to FIGS. 9-14, the vehicle movement classifier 313 can determine that the potentially offending vehicle 122 is static or moving based on a standard deviation of the transformed GPS coordinates in both the longitudinal direction and the latitudinal direction and a cross-correlation of the transformed GPS coordinates along the longitudinal direction and the latitudinal direction.

As will be discussed in more detail in relation to FIG. 15, the object detection deep learning model 308 and the lane segmentation deep learning model 312 running on the edge device 102 can also be used to output confidence scores or classification results concerning a context surrounding the potential double parking violation that can assist in determining whether the potentially offending vehicle 122 is actually parked in the no-parking lane 140 or is only temporarily stopped. As previously discussed, the vehicle movement classifier 313 can determine whether the potentially offending vehicle 122 is static or moving. However, the potentially offending vehicle 122 can be static without being actually parked. For example, these include instances where the potentially offending vehicle 122 is stuck in traffic due to other vehicles in the no-parking lane 140 or is stopped temporarily in the no-parking lane 140 at an intersection (e.g., is about to make a turn at the intersection).

The object detection deep learning model 308, the lane segmentation deep learning model 312, or a combination thereof can be configured to output predictions or classification results concerning features 1500 associated with the context surrounding the potential double parking violation. Such features 1500 can comprise a brake light status 1502 of the potentially offending vehicle 122, a traffic condition 1504 surrounding the potentially offending vehicle 122, and a roadway intersection status 1506 (see FIG. 15).

The object detection deep learning model 308 can be trained to classify or make predictions concerning the brake light status 1502 of the potentially offending vehicle 122 and the traffic condition 1504 surrounding the potentially offending vehicle 122. In these and other embodiments, the lane segmentation deep learning model 312 can be trained to classify or make predictions concerning the roadway intersection status 1506.

In certain embodiments, the objection detection deep learning model 308 can comprise a plurality of prediction heads 1508 or detectors. The prediction heads 1508 or detectors can be multi-class detectors that can be configured to undertake a multi-class prediction. One of the prediction heads 1508 of the object detection deep learning model 308 can be trained to distinguish between brake lights that are on, brake lights that are off, and brake lights that are flashing. For example, if the brake lights of a potentially offending vehicle 122 are off, it is more likely that the potentially offending vehicle 122 stopped in the no-parking lane 140 is parked rather than temporarily stopped. On other hand, if the brake lights of the potentially offending vehicle 122 are on or are flashing, it is more likely that the potentially offending vehicle 122 stopped in the no-parking lane 140 is only temporarily stopped. The prediction head can also generate a set of brake light confidence scores 1512 associated with the predictions or classifications. The brake light confidence scores 1512 can be included as part of a set of classification results 127 included in the evidence package 136 transmitted to the server 104 or to a third-party evidence processor.

Figure 15:
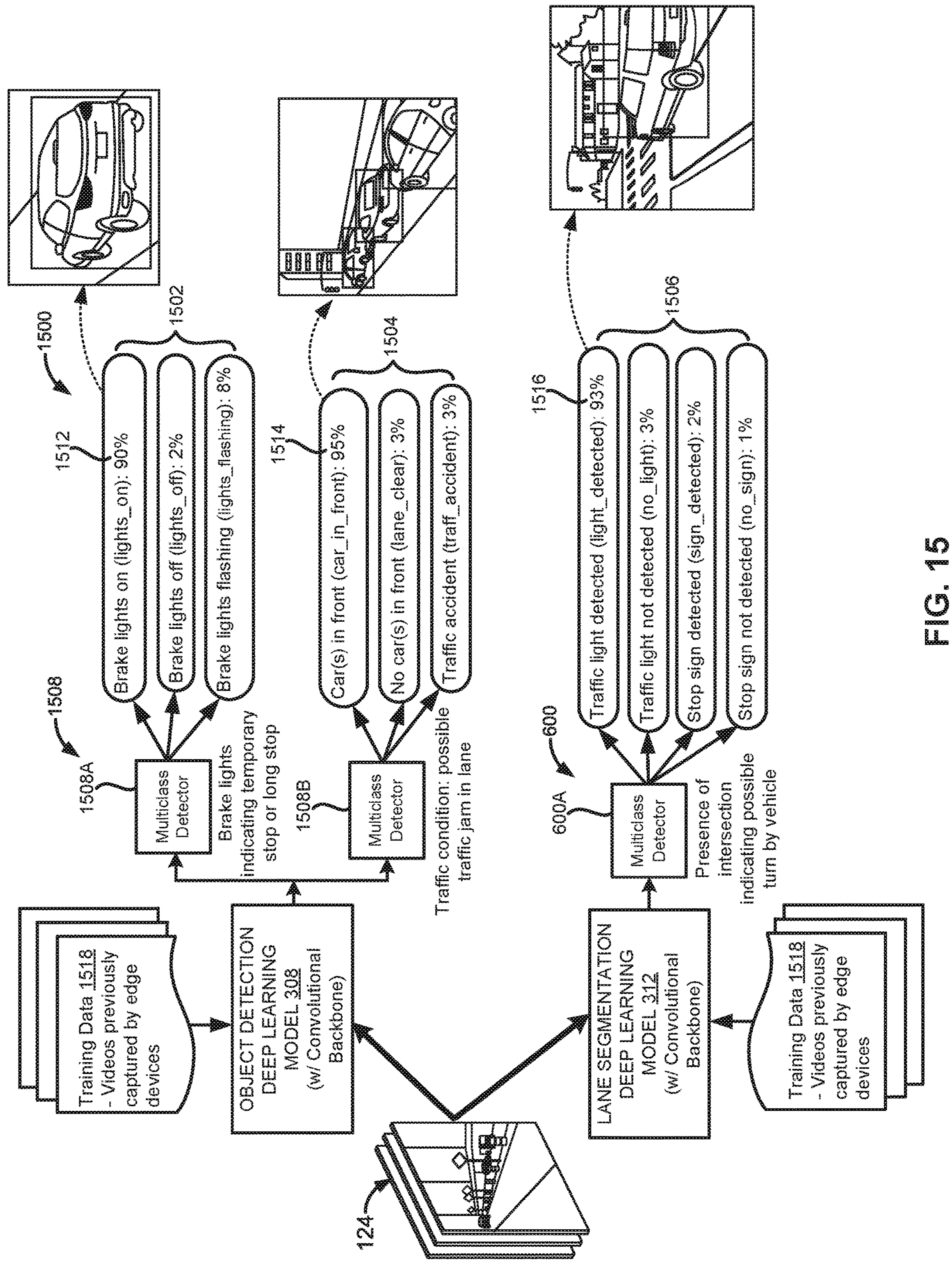
FIG. 15 is a schematic diagram illustrating an object detection deep learning model and a lane segmentation deep learning model used to output predictions or classification results concerning a context surrounding a potential double parking violation that can assist in determining whether a potentially offending vehicle is actually parked in a no-parking lane or is only temporarily stopped.

Also, as shown in FIG. 15, another one of the prediction heads 1508 of the object detection deep learning model 308 can be trained to detect a traffic condition surrounding the potentially offending vehicle 122 by determining whether one or more other vehicles are immediately in front of the potentially offending vehicle 122 in the no-parking lane 140 or whether the no-parking lane 140 is otherwise clear with no other vehicles impeding the movement of the potentially offending vehicle 122.

For example, if one or more other vehicles are immediately in front of the potentially offending vehicle 122, the presence of such vehicles can indicate that the movement of the potentially offending vehicle 122 is impeded or blocked (possibly due to a traffic jam, an incident, or a traffic light being red, etc.). On other hand, if no vehicles are detected immediately in front of the potentially offending vehicle 122 and the no-parking lane 140 is otherwise clear, this can indicate that the potentially offending vehicle 122 is double-parked.

The prediction head can also generate a set of traffic condition confidence scores 1514 associated with the predictions or classifications. The traffic condition confidence scores 1514 can be included as part of a set of classification results 127 included in the evidence package 136 transmitted to the server 104 or to a third-party evidence processor.

One of the prediction heads of the lane segmentation deep learning model 312 (see, e.g., FIG. 6 and FIG. 15) can be trained to detect whether an intersection is present in at least one of the event video frames 124 capturing the potential double-parking violation. For example, if an intersection is detected, it is more likely that the potentially offending vehicle 122 stopped in the no-parking lane 140 in order to make a turn at the intersection. On other hand, if no intersection is detected, it is more likely that the potentially offending vehicle 122 stopped in the no-parking lane 140 is double parked.

The prediction head can also generate a set of intersection detection confidence scores 1516 associated with the predictions or classifications. The intersection detection confidence scores 1516 can be included as part of a set of classification results 127 included in the evidence package 136 transmitted to the server 104 or to a third-party evidence processor.

In some embodiments, the brake light confidence scores 1512, the traffic condition confidence scores 1514, the intersection detection confidence scores 1516, or a combination thereof can be used directly to determine whether the potentially offending vehicle 122 stopped in the no-parking lane 140 (i.e., the static vehicle) is only temporarily stopped or is actually double-parked. For example, one or more thresholds can be set and if at least one of the brake light confidence scores 1512, the traffic condition confidence scores 1514, or the intersection detection confidence scores 1516 do not meet one of the threshold or exceeds one of the thresholds, the evidence package 136 can be rejected.

In other embodiments, the brake light confidence scores 1512, the traffic condition confidence scores 1514, the intersection detection confidence scores 1516, or a combination thereof can also be provided as inputs to a decision tree algorithm running on the server 104 as part of an evidence evaluation procedure. The server 104 can automatically approve or reject the evidence package 136 based on a final score calculated by the decision tree algorithm. The brake light confidence scores 1512, the traffic condition confidence scores 1514, and the intersection detection confidence scores 1516 can be factored into the calculation of the final score.

As shown in FIG. 3, the server 104 can comprise at least a knowledge engine 314 comprising an instance of the map layer 303, an events database 316, and an evidence validation module 318 comprising instances of the object detection deep learning model 308, the lane segmentation deep learning model 312, and the vehicle movement classifier 313.

The server 104 can double-check the detection made by the edge device 102 by feeding or passing at least some of the same event video frames 124 to instances of the objective detection deep learning model 308 and the lane segmentation deep learning model 312 running on the server 104.

Although FIG. 3 illustrates the evidence validation module 318 as being on the same server 104 as the knowledge engine 314 and the events database 316, it is contemplated by this disclosure and it should be understood by one of ordinary skill in the art that at least one of the knowledge engine 314 and the events database 316 can be run on another server or another computing device communicatively coupled to the server 104 or otherwise accessible to the server 104.

Software instructions run on the server 104, including any of the engines and modules disclosed herein and depicted in FIG. 3, can be written in the Ruby® programming language (e.g., using the Ruby on Rails® web application framework), Python® programming language, or a combination thereof.

The knowledge engine 314 can be configured to construct a virtual 3D environment representing the real-world environment captured by the cameras of the edge devices 102. The knowledge engine 314 can be configured to construct three-dimensional (3D) semantic annotated maps from videos and data received from the edge devices 102. The knowledge engine 314 can continuously update such maps based on new videos or data received from the edge devices 102. For example, the knowledge engine 314 can use inverse perspective mapping to construct the 3D semantic annotated maps from two-dimensional (2D) video image data obtained from the edge devices 102.

The semantic annotated maps can be built on top of existing standard definition maps and can be built on top of geometric maps constructed from sensor data and salient points obtained from the edge devices 102. For example, the sensor data can comprise positioning data from the communication and positioning units 118 and IMUs of the edge devices 102 and wheel odometry data from the carrier vehicles 110.

The geometric maps can be stored in the knowledge engine 314 along with the semantic annotated maps. The knowledge engine 314 can also obtain data or information from one or more government mapping databases or government GIS maps to construct or further fine-tune the semantic annotated maps. In this manner, the semantic annotated maps can be a fusion of mapping data and semantic labels obtained from multiple sources including, but not limited to, the plurality of edge devices 102, municipal mapping databases, or other government mapping databases, and third-party private mapping databases. The semantic annotated maps can be set apart from traditional standard definition maps or government GIS maps in that the semantic annotated maps are: (i) three-dimensional, (ii) accurate to within a few centimeters rather than a few meters, and (iii) annotated with semantic and geolocation information concerning objects within the maps. For example, objects such as lane lines, lane dividers, crosswalks, traffic lights, no parking signs or other types of street signs, fire hydrants, parking meters, curbs, trees or other types of plants, or a combination thereof are identified in the semantic annotated maps and their geolocations and any rules or regulations concerning such objects are also stored as part of the semantic annotated maps. As a more specific example, all no-parking lanes within a municipality and their enforcement periods can be stored as part of a semantic annotated map of the municipality.

The semantic annotated maps can be updated periodically or continuously as the server 104 receives new mapping data, positioning data, and/or semantic labels from the various edge devices 102. For example, a bus serving as a carrier vehicle 110 having an edge device 102 installed within the bus can drive along the same bus route multiple times a day. Each time the bus travels down a specific roadway or passes by a specific landmark (e.g., building or street sign), the edge device 102 on the bus can take video(s) of the environment surrounding the roadway or landmark. The videos can first be processed locally on the edge device 102 (using the computer vision tools and deep learning models previously discussed) and the outputs from such detection can be transmitted to the knowledge engine 314 and compared against data already included as part of the semantic annotated maps. If such labels and data match or substantially match what is already included as part of the semantic annotated maps, the detection of this roadway or landmark can be corroborated and remain unchanged. If, however, the labels and data do not match what is already included as part of the semantic annotated maps, the roadway or landmark can be updated or replaced in the semantic annotated maps. An update or replacement can be undertaken if a confidence level or confidence score of the new objects detected is higher than the confidence level or confidence score of objects previously detected by the same edge device 102 or another edge device 102. This map updating procedure or maintenance procedure can be repeated as the server 104 receives more data or information from additional edge devices 102.

As shown in FIG. 3, the server 104 can store the semantic annotated maps as part of a map layer 303. The server 104 can transmit or deploy revised or updated instances of the semantic annotated maps 315 to the edge devices 102 (to be stored as part of the map layer 303 of each of the edge devices 102). For example, the server 104 can transmit or deploy revised or updated semantic annotated maps 315 periodically or when an update has been made to the existing semantic annotated maps. The updated semantic annotated maps 315 can be used by the edge device 102 to determine the locations of no-parking lanes 140 to ensure accurate detection. Ensuring that the edge devices 102 have access to updated semantic annotated maps 315 reduces the likelihood of false positive detections.

In some embodiments, the server 104 can store event data or files included as part of the evidence packages 136 in the events database 316. For example, the events database 316 can store event video frames 124 and license plate video frames 126 received as part of the evidence packages 136 received from the edge devices 102.

The evidence validation module 318 can analyze the contents of an evidence package 136 and can make a decision concerning whether the evidence packages 136 is automatically approved, is automatically rejected, or requires further review.

The server 104 can store the contents of the evidence package 136 in the events database 316 even when the evidence package 136 has been automatically rejected or has been subject to further review. In certain embodiments, the events database 316 can store the contents of all evidence packages 136 that have been evaluated by the evidence validation module 318.

In some embodiments, the evidence validation module 318 can undertake an initial review of the evidence package 136 automatically without relying on human reviewers. In these embodiments, the evidence validation module 318 can undertake the initial review of the evidence package 136 by taking into account certain automatically detected context-related features surrounding a potential double parking violation to determine whether the double parking violation has indeed occurred.

The evidence package 136 can comprise, among other things, one or more event video frames 124 and license plate video frames 126 captured by the camera(s) of the edge device 102 showing a potentially offending vehicle 122 involved in a double parking violation. The evidence package 136 can also comprise one or more classification results 127 associated with the context-related features.

In some embodiments, the server 104 can also double-check or validate the detection made by the edge device 102 concerning whether the potentially offending vehicle 122 was static or moving. The evidence validation module 318 can feed the event video frames 124 from the evidence package 136 into the vehicle movement classifier 313 running on the server 104.

The server 104 can also render one or more graphical user interfaces (GUIs) 332 that can be accessed or displayed through a web portal or mobile application 330 run on a client device 138. The client device 138 can refer to a portable or non-portable computing device. For example, the client device 138 can refer to a desktop computer or a laptop computer. In other embodiments, the client device 138 can refer to a tablet computer or smartphone.

In some embodiments, one of the GUIs can provide information concerning the context-related features used by the server 104 to validate the evidence packages 136 received by the server 104. The GUIs 332 can also provide data or information concerning times/dates of double parking violations and locations of the double parking violations.

At least one of the GUIs 332 can provide a video player configured to play back video evidence of the double parking violation. For example, at least one of the GUIs 332 can play back videos comprising the event video frames 124, the license plate video frames 126, or a combination thereof.

In another embodiment, at least one of the GUIs 332 can comprise a live map showing real-time locations of all edge devices 102, double parking violations, and violation hotspots. In yet another embodiment, at least one of the GUIs 332 can provide a live event feed of all flagged events or double parking violations and the validation status of such double parking violations.

In some embodiments, the client device 138 can be used by a human reviewer to review the evidence packages 136 marked or otherwise tagged for further review.

Figure 4:
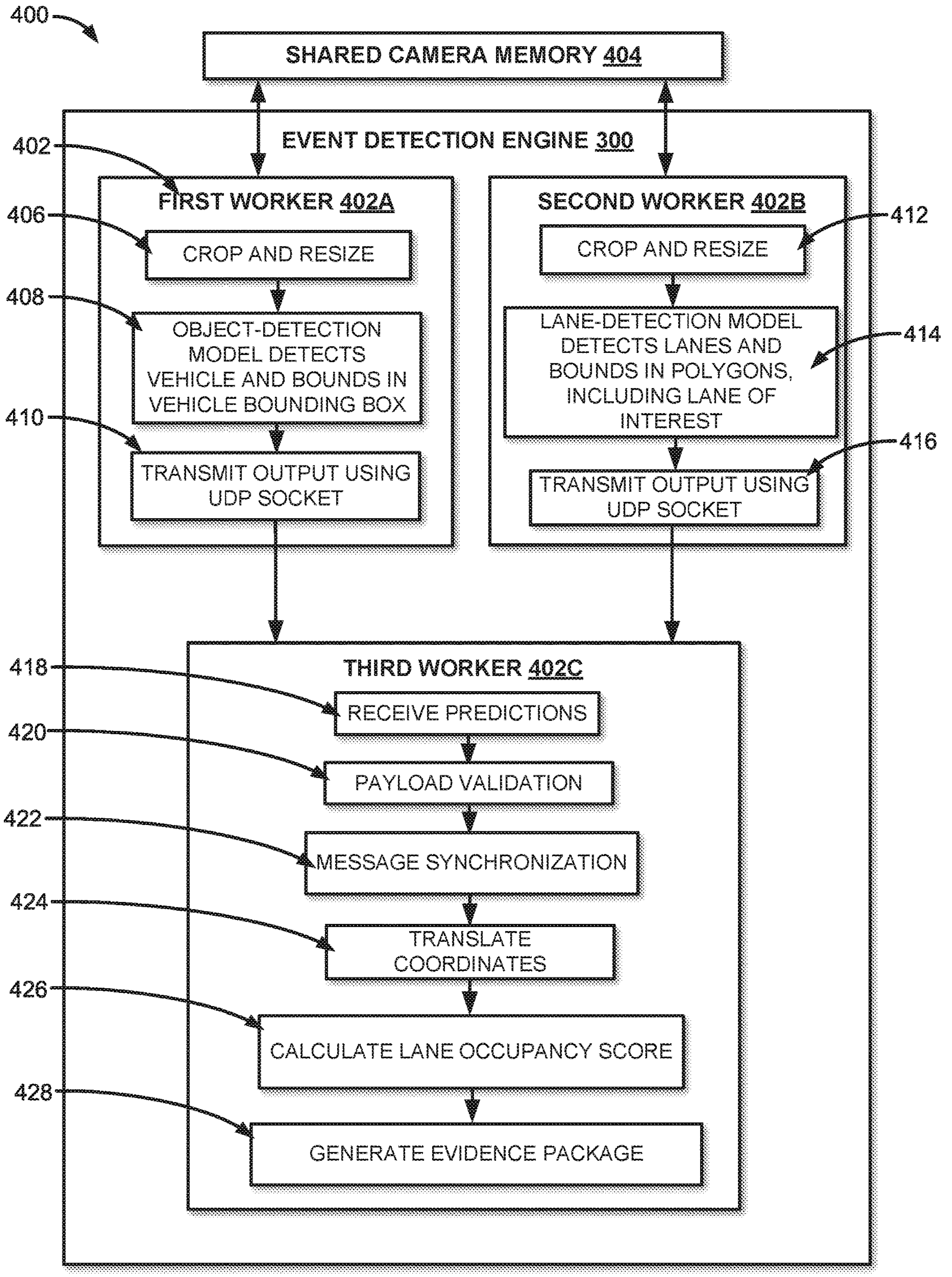
FIG. 4 illustrates a plurality of workers performing tasks as part of a method for automatically detecting a double parking violation. The workers can be software programs or modules dedicated to executing the tasks within a docker container.

FIG. 4 illustrates that part of a method 400 for detecting a double parking violation can be undertaken by a plurality of workers 402 of the event detection engine 300 of an edge device 102.

The workers 402 can be software programs or modules dedicated to performing a specific set of tasks or operations. Each worker 402 can be a software program or module dedicated to executing the tasks or operations within a docker container.

As shown in FIG. 4, the output from one worker 402 (e.g., the first worker 402A) can be transmitted to another worker (e.g., the third worker 402C) running on the same edge device 102. For example, the output or results (e.g., the inferences or predictions) provided by one worker can be transmitted to another worker using an inter-process communication protocol such as the user datagram protocol (UDP).

In some embodiments, the event detection engine 300 of each of the edge devices 102 can comprise at least a first worker 402A, a second worker 402B, and a third worker 402C. Although FIG. 4 illustrates the event detection engine 300 comprising three workers 402, it is contemplated by this disclosure that the event detection engine 300 can comprise four or more workers 402 or two workers 402.

As shown in FIG. 4, both the first worker 402A and the second worker 402B can retrieve or grab video frames (e.g., event video frames 124) from a shared camera memory 404. The shared camera memory 404 can be an onboard memory (e.g., non-volatile memory) of the edge device 102 for storing videos captured by the event camera 114. Since the event camera 114 can capture approximately 15 to 60 video frames per second, the video frames can be stored in the shared camera memory 404 prior to being analyzed by the first worker 402A or the second worker 402B. In some embodiments, the video frames can be grabbed using a video frame grab function such as the GStreamer tool.

As will be discussed in more detail in the following sections, the objective of the first worker 402A can be to detect objects of certain object classes (e.g., cars, trucks, buses, etc.) within a video frame and bound each of the objects with a vehicle bounding polygon 500 (see, e.g., FIGS. 5A and 5D). The objective of the second worker 402B can be to detect one or more lanes 707 within the same video frame and bound the lanes 707 in lane bounding polygons 516 (see, e.g., FIG. 5D) including bounding a no-parking lane 140 in an LOI polygon 708 (see FIG. 7A).

The objective of the third worker 402C can be to detect whether a double parking violation has occurred by calculating a lane occupancy score 800 (see, e.g., FIGS. 8A and 8B) using outputs (e.g., the vehicle bounding polygon 500 and the LOI polygon 708) produced and received from the first worker 402A and the second worker 402B.

FIG. 4 illustrates that the first worker 402A can crop and resize an event video frame 124 retrieved from the shared camera memory 404 in operation 406. The first worker 402A can crop and resize the event video frame 124 to optimize the video frame for analysis by one or more deep learning models or convolutional neural networks running on the edge device 102. For example, the first worker 402A can crop and resize the video frame to optimize the video frame for the object detection deep learning model 308 running on the edge device 102.

In one embodiment, the first worker 402A can crop and resize the video frame to meet certain size parameters associated with the object detection deep learning model 308. For example, the first worker 402A can crop and resize the video frame such that the aspect ratio of the video frame meets certain parameters associated with the object detection deep learning model 308.

As a more specific example, the video frames captured by the event camera 114 can have an aspect ratio of 1920×1080. When the event detection engine 300 is configured to determine double parking violations, the first worker 402A can be programmed to crop the video frames such that vehicles and roadways 700 with lanes 707 are retained but other objects or landmarks (e.g., sidewalks, pedestrians, building façades) are cropped out.

When the object detection deep learning model 308 is a variation of the Single Shot Detection (SSD) model with a MobileNet backbone as the feature extractor, the first worker 402A can crop and resize the video frames such that the aspect ratio of the video frames meets certain parameters associated with the object detection deep learning model 308.

The method 400 can also comprise detecting a potentially offending vehicle 122 from the video frame and bounding the potentially offending vehicle 122 shown in the video frame with a vehicle bounding polygon 500 in operation 408. The first worker 402A can be programmed to pass the video frame to the object detection deep learning model 308 to obtain an object class 502, an object detection confidence score 504, and a set of image coordinates 506 for the vehicle bounding polygon 500 (see, e.g., FIG. 5A).

In some embodiments, the object detection deep learning model 308 can be configured such that only certain vehicle-related objects are supported by the object detection deep learning model 308. For example, the object detection deep learning model 308 can be configured such that the object classes 502 supported only consist of cars, trucks, and buses. In other embodiments, the object detection deep learning model 308 can be configured such that the object classes 502 supported also include bicycles, scooters, and other types of wheeled mobility vehicles. In other embodiments, the object detection deep learning model 308 can be configured such that the object classes 502 supported also comprise non-vehicles classes such as pedestrians, landmarks, street signs, fire hydrants, bus stops, and building façades.

In certain embodiments, the object detection deep learning model 308 can be designed to detect up to 60 objects per video frame. Although the object detection deep learning model 308 can be designed to accommodate numerous object classes 502, one advantage of limiting the number of object classes 502 is to reduce the computational load on the processors of the edge device 102 and make the neural network more efficient.

In some embodiments, the object detection deep learning model 308 can be a convolutional neural network comprising a plurality of convolutional layers and connected layers trained for object detection (and, in particular, vehicle detection). In one embodiment, the object detection deep learning model 308 can be a variation of the Single Shot Detection (SSD) model with a MobileNet backbone as the feature extractor.

In other embodiments, the object detection deep learning model 308 can be the You Only Look Once Lite (YOLO Lite) object detection model. In some embodiments, the first object detection deep learning model 308 can also identify certain attributes of the detected objects. For example, the object detection deep learning model 308 can identify a set of vehicle attributes 134 of an object identified as a car such as the color of the car, the make and model of the car, and the car type (e.g., whether the vehicle is a personal vehicle or a public service vehicle).

The object detection deep learning model 308 can be trained, at least in part, from video frames of videos captured by the edge device 102 or other edge devices 102 deployed in the same municipality or coupled to other carrier vehicles 110 in the same carrier fleet. The object detection deep learning model 308 can be trained, at least in part, from video frames of videos captured by the edge device 102 or other edge devices at an earlier point in time. Moreover, the object detection deep learning model 308 can be trained, at least in part, from video frames from one or more open-sourced training sets or datasets.

As previously discussed, the first worker 402A can obtain an object detection confidence score 504 from the object detection deep learning model 308. The object detection confidence score 504 can be between 0 and 1.0. The first worker 402A can be programmed to not apply a vehicle bounding polygon 500 to a vehicle if the object detection confidence score 504 of the detection is below a preset confidence threshold. For example, the confidence threshold can be set at between 0.65 and 0.90 (e.g., at 0.70). The confidence threshold can be adjusted based on an environmental condition (e.g., a lighting condition), a location, a time-of-day, a day-of-the-week, or a combination thereof.

As previously discussed, the first worker 402A can also obtain a set of image coordinates 506 for the vehicle bounding polygon 500. The image coordinates 506 can be coordinates of corners of the vehicle bounding polygon 500. For example, the image coordinates 506 for the vehicle bounding polygon 500 can be x- and y-coordinates for an upper left corner and a lower right corner of the vehicle bounding polygon 500. In other embodiments, the image coordinates 506 for the vehicle bounding polygon 500 can be x- and y-coordinates of all four corners or the upper right corner and the lower left corner of the vehicle bounding polygon 500.

In some embodiments, the vehicle bounding polygon 500 can bound the entire two-dimensional (2D) image of the vehicle captured in the video frame. In other embodiments, the vehicle bounding polygon 500 can bound at least part of the 2D image of the vehicle captured in the video frame such as a majority of the pixels making up the 2D image of the vehicle.

The method 400 can further comprise transmitting the outputs produced by the first worker 402A and/or the object detection deep learning model 308 to a third worker 402C in operation 410. In some embodiments, the outputs produced by the first worker 402A and/or the object detection deep learning model 308 can comprise the image coordinates 506 of the vehicle bounding polygon 500 and the object class 502 of the object detected (see, e.g., FIG. 5A). The outputs produced by the first worker 402A and/or the object detection deep learning model 308 can be packaged into UDP packets and transmitted using UDP sockets to the third worker 402C.

In other embodiments, the outputs produced by the first worker 402A and/or the object detection deep learning model 308 can be transmitted to the third worker 402C using another network communication protocol such as a remote procedure call (RPC) communication protocol.

FIG. 4 illustrates that the second worker 402B can crop and resize an event video frame 124 retrieved from the shared camera memory 404 in operation 412. In some embodiments, the event video frame 124 retrieved by the second worker 402B can be the same as the event video frame 124 retrieved by the first worker 402A.

In other embodiments, the event video frame 124 retrieved by the second worker 402B can be a different video frame from the video frame retrieved by the first worker 402A. For example, the event video frame 124 can be captured at a different point in time than the video frame retrieved by the first worker 402A (e.g., several seconds or milliseconds before or after). In all such embodiments, one or more vehicles and lanes should be visible in the video frame.

The second worker 402B can crop and resize the event video frame 124 to optimize the video frame for analysis by one or more deep learning models or convolutional neural networks running on the edge device 102. For example, the second worker 402B can crop and resize the event video frame 124 to optimize the video frame for the lane segmentation deep learning model 312.

In one embodiment, the second worker 402B can crop and resize the video frame to meet certain parameters associated with the lane segmentation deep learning model 312. For example, the second worker 402B can crop and resize the event video frame 124 such that the aspect ratio of the video frame meets certain parameters associated with the lane segmentation deep learning model 312.

As a more specific example, the event video frames 124 captured by the event camera 114 can have an aspect ratio of 1920×1080. The second worker 402B can be programmed to crop the event video frames 124 such that vehicles and lanes are retained but other objects or landmarks (e.g., sidewalks, pedestrians, building façades) are cropped out.

The second worker 402B can crop and resize the video frames such that the aspect ratio of the video frames is about 448×256.

When cropping the video frame, the method 400 can further comprise an additional step of determining whether a vanishing point 505 (see, e.g., FIG. 5A) is present within the video frame. The vanishing point 505 can be one point or region in the video frame where distal or terminal ends of the lanes 707 shown in the video frame converge into the point or region. Alternatively, the event camera 114 on the edge device 102 can be physically adjusted (for example, as part of an initial calibration routine) until the vanishing point 505 is shown in the video frames captured by the event camera 114. Adjusting the cropping parameters or the event camera 114 until a vanishing point 505 is detected in the video frame can be part of a calibration procedure that is run before deploying the edge devices 102 in the field.

The vanishing point 505 can be used to approximate the sizes of lanes 707 detected by the second worker 402B. For example, the vanishing point 505 can be used to detect when one or more of the lanes 707 within a video frame are obstructed by an object (e.g., a bus, car, truck, or another type of vehicle).

The method 400 can also comprise passing the processed video frame (i.e., the cropped, resized, and smoothed video frame) to the lane segmentation deep learning model 312 to detect and bound lanes 707 captured in the video frame in operation 414. The lane segmentation deep learning model 312 can bound the lanes 707 in a plurality of lane bounding polygons 516 (see, e.g., FIGS. 5C, 7A, and 7C). The lane segmentation deep learning model 312 can be a convolutional neural network trained specifically for lane detection and segmentation.

Figure 6:
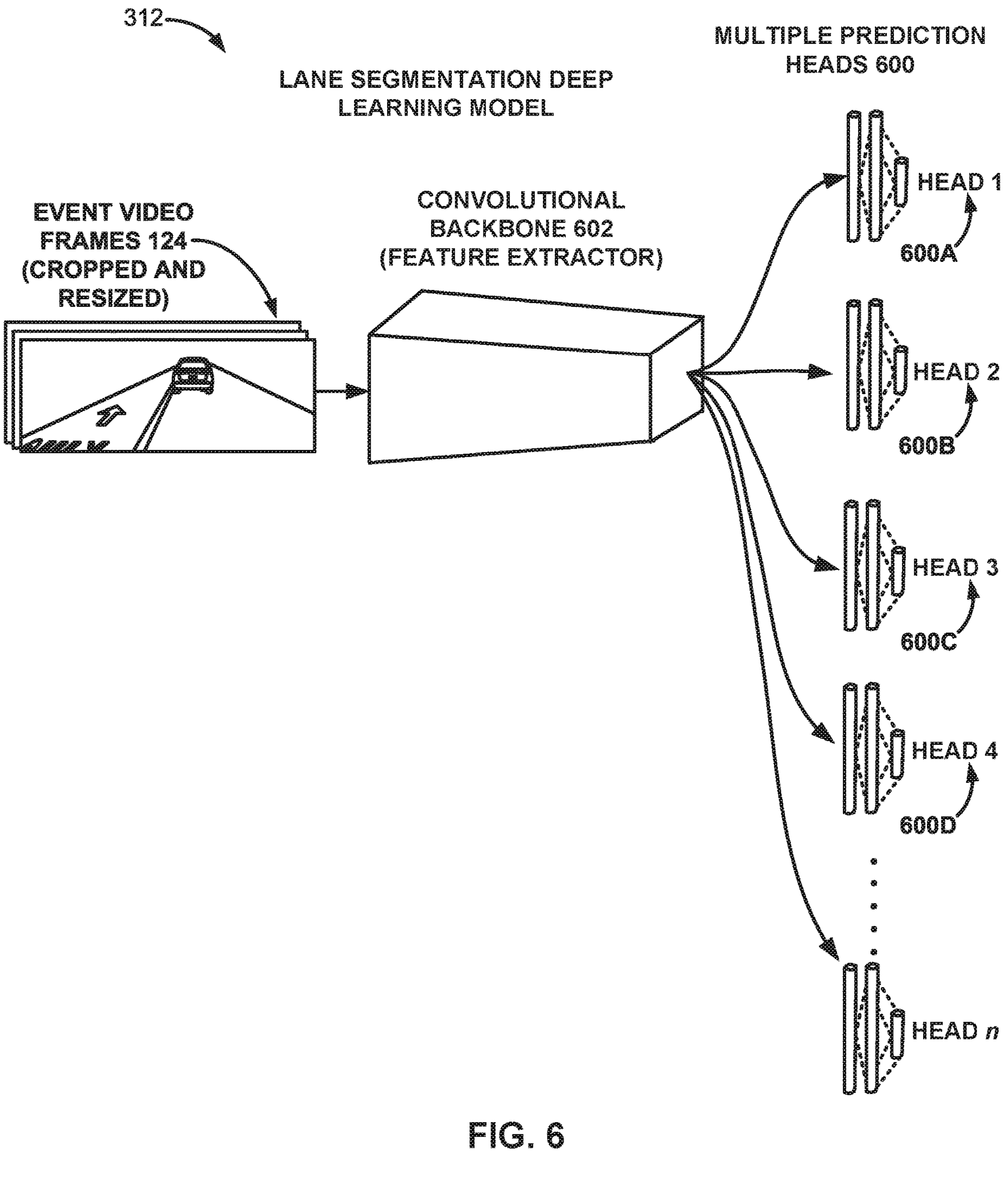
FIG. 6 illustrates a schematic representation of one embodiment of a lane segmentation deep learning model.

In some embodiments, the lane segmentation deep learning model 312 can be a multi-headed convolutional neural network comprising a plurality of prediction heads 600 (see, e.g., FIG. 6). For example, the lane segmentation deep learning model 312 can be a multi-headed convolutional neural network comprising a residual neural network (e.g., a ResNet) backbone with a standard mask prediction.

In some embodiments, each of the heads 600 of the lane segmentation deep learning model 312 can be configured to detect a specific type of lane and/or lane marking(s). At least one of the lanes 707 detected by the lane segmentation deep learning model 312 can be a no-parking lane 140. The no-parking lane 140 can be identified by the lane segmentation deep learning model 312 and a lane bounding polygon 516 can be used to bound the no-parking lane 140. Lane bounding polygons 516 will be discussed in more detail in later sections.

The method 400 can further comprise transmitting the outputs produced by the second worker 402B and/or the lane segmentation deep learning model 312 to a third worker 402C in operation 416. In some embodiments, the outputs produced by the second worker 402B and/or the lane segmentation deep learning model 312 can be coordinates of the lane bounding polygons 516 including coordinates of a LOI polygon 708 (see, e.g., FIG. 7A). As shown in FIG. 4, the outputs produced by the second worker 402B and/or the lane segmentation deep learning model 312 can be packaged into UDP packets and transmitted using UDP sockets to the third worker 402C.

In other embodiments, the outputs produced by the second worker 402B and/or the lane segmentation deep learning model 312 can be transmitted to the third worker 402C using another network communication protocol such as an RPC communication protocol.

As shown in FIG. 4, the third worker 402C can receive the outputs/results produced by the first worker 402A and the second worker 402B in operation 418. The third worker 402C can receive the outputs/results as UDP packets received over UDP sockets.

The outputs or results received from the first worker 402A can be in the form of predictions or detections made by the object detection deep learning model 312 of the objects captured in the video frame that fit a supported object class 502 (e.g., car, truck, or bus) and the image coordinates 506 of the vehicle bounding polygons 500 bounding such objects. The outputs or results received from the second worker 402B can be in the form of predictions made by the lane segmentation deep learning model 312 of the lanes 707 captured in the video frame and the coordinates of the lane bounding polygons 516 bounding such lanes 707 including the coordinates of at least one LOI polygon 708.

The method 400 can further comprise validating the payloads of UDP packets received from the first worker 402A and the second worker 402B in operation 420. The payloads can be validated or checked using a payload verification procedure such as a payload checksum verification algorithm. This is to ensure the packets received containing the predictions were not corrupted during transmission.

The method 400 can also comprise the third worker 402C synchronizing the payloads or messages received from the first worker 402A and the second worker 402B in operation 422. Synchronizing the payloads or messages can comprise checks or verifications on the predictions or data contained in such payloads or messages such that any comparison or further processing of such predictions or data is only performed if the predictions or data concern objects or lanes in the same video frame (i.e., the predictions or coordinates calculated are not generated from different video frames captured at significantly different points in time).

The method 400 can further comprise translating the coordinates of the vehicle bounding polygon 500 and the coordinates of the lane bounding polygons 516 (including the coordinates of the LOI polygon 708) into a uniform coordinate domain in operation 424. Since the same video frame was cropped and resized differently by the first worker 402A (e.g., cropped and resized to an aspect ratio of 500×500 from an original aspect ratio of 1920×1080) and the second worker 402B (e.g., cropped and resized to an aspect ratio of 752×160 from an original aspect ratio of 1920×1080) to suit the needs of their respective convolutional neural networks, the pixel coordinates of pixels used to represent the vehicle bounding polygon 500 and the lane bounding polygons 516 must be translated into a shared coordinate domain or back to the coordinate domain of the original video frame (before the video frame was cropped or resized). This is to ensure that any subsequent comparison of the relative positions of boxes and polygons are done in one uniform coordinate domain.

The method 400 can also comprise calculating a lane occupancy score 800 (see, e.g., FIGS. 8A and 8B) based in part on the translated coordinates of the vehicle bounding polygon 500 and the LOI polygon 708 in operation 426. In some embodiments, the lane occupancy score 800 can be a number between 0 and 1. The lane occupancy score 800 can be calculated using one or more heuristics.

For example, the third worker 402C can calculate the lane occupancy score 800 using a lane occupancy heuristic. The lane occupancy heuristic can comprise the steps of masking or filling in an area within the LOI polygon 708 with certain pixels. The third worker 402C can then determine a pixel intensity value associated with each pixel within at least part of the vehicle bounding polygon 500. The pixel intensity value can range between 0 and 1 with 1 being a high degree of likelihood that the pixel is located within the LOI polygon 708 and with 0 being a high degree of likelihood that the pixel is not located within the LOI polygon 708. The lane occupancy score 800 can be calculated by taking an average of the pixel intensity values of all pixels within at least part of the vehicle bounding polygon 500. Calculating the lane occupancy score 800 will be discussed in more detail in later sections.

The method 400 can further comprise detecting that a double parking violation has occurred when the lane occupancy score 800 exceeds a predetermined threshold value. The third worker 402C can then generate an evidence package 136 when the lane occupancy score 800 exceeds a predetermined threshold value in operation 428.

In some embodiments, the evidence package 136 can comprise the event video frame 124 or other video frames captured by the event camera 114, the positioning data obtained by the communication and positioning unit 118 of the edge device 102, the speed of the carrier vehicle 110 when the double parking violation was detected, certain timestamps 132 documenting when the event video frame 124 was captured, a set of vehicle attributes 134 concerning the potentially offending vehicle 122, and an alphanumeric string representing the recognized license plate number 128 of the potentially offending vehicle 122. The evidence package 136 can be prepared by the third worker 402C or another worker on the edge device 102 to be sent to the server 104 or a third-party computing device/resource or client device 138.

Figure 5A:
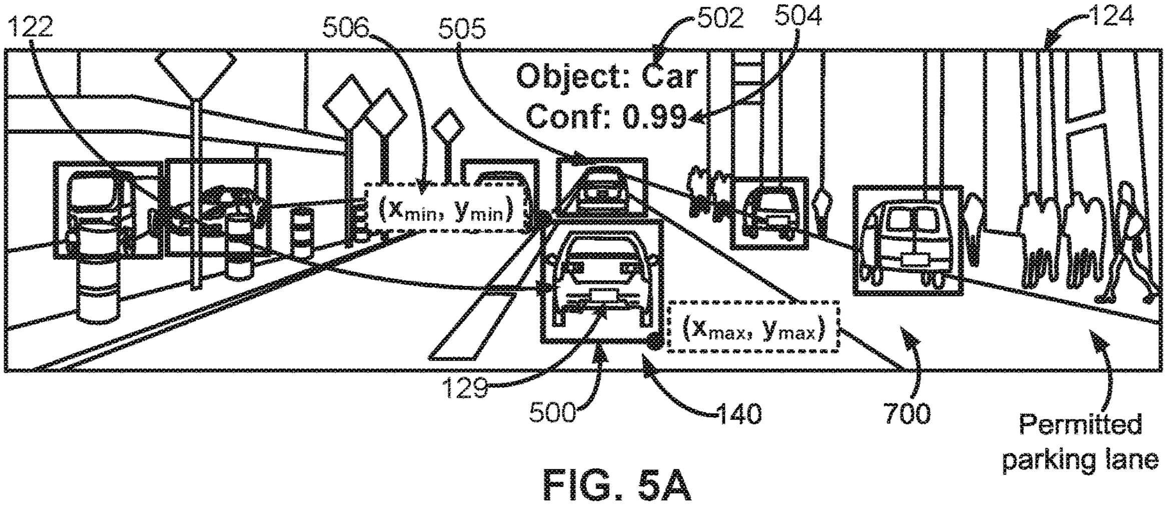
FIG. 5A illustrates an example of an event video frame captured by an event camera of an edge device. The edge device can be carried by a carrier vehicle approaching a potentially offending vehicle directly from behind.

FIG. 5A illustrates an example of an event video frame 124 showing a potentially offending vehicle 122 bounded by a vehicle bounding polygon 500. The event video frame 124 can be one of the video frames grabbed or otherwise retrieved by the event detection engine 300 from the videos captured by the event camera 114 of the edge device 102. As previously discussed, the event detection engine 300 can periodically or continuously pass event video frames 124 from the videos captured by the event camera 114 to an object detection deep learning model 308 running on the edge device 102 (see FIG. 3).

As shown in FIG. 5A, the object detection deep learning model 308 can bound the potentially offending vehicle 122 in the vehicle bounding polygon 500. The event detection engine 300 can obtain as outputs from the object detection deep learning model 308, predictions concerning the objects detected within the video frame including at least an object class 502, an object detection confidence score 504 related to the object detected, and a set of image coordinates 506 for the vehicle bounding polygon 500.

The object detection confidence score 504 can be between 0 and 1.0. In some embodiments, the control unit 112 of the edge device 102 can abide by the results of the detection only if the object detection confidence score 504 is above a preset confidence threshold. For example, the confidence threshold can be set at between 0.65 and 0.90 (e.g., at 0.70).

The event detection engine 300 can also obtain a set of image coordinates 506 for the vehicle bounding polygon 500. The image coordinates 506 can be coordinates of corners of the vehicle bounding polygon 500. For example, the image coordinates 506 can be x- and y-coordinates for an upper left corner and a lower right corner of the vehicle bounding polygon 500. In other embodiments, the image coordinates 506 can be x- and y-coordinates of all four corners or the upper right corner and the lower left corner of the vehicle bounding polygon 500.

In some embodiments, the vehicle bounding polygon 500 can bound the entire two-dimensional (2D) image of the potentially offending vehicle 122 captured in the event video frame 124. In other embodiments, the vehicle bounding polygon 500 can bound at least part of the 2D image of the potentially offending vehicle 122 captured in the event video frame 124 such as a majority of the pixels making up the 2D image of the potentially offending vehicle 122.

The event detection engine 300 can also obtain as an output from the object detection deep learning model 308 predictions concerning a set of vehicle attributes 134 such as a color, make and model, and vehicle type of the potentially offending vehicle 122 shown in the video frames. The vehicle attributes 134 can be used by the event detection engine 300 to make an initial determination as to whether the vehicle shown in the video frames is subject to the double parking violation policy (e.g., whether the vehicle is allowed to park or otherwise stop in a no-parking lane 140).

FIG. 5A illustrates an example scenario where the system 100 of FIG. 1A can be utilized to detect a double parking violation of a potentially offending vehicle 122 parked in the same lane occupied by the carrier vehicle 110. As shown in FIG. 5A, a potentially offending vehicle 122 can be double parked or otherwise stopped in a no-parking lane 140 that is also the lane-of-travel (or "ego lane") of a carrier vehicle 110 carrying the edge device 102. As shown in FIG. 5A, the no-parking lane 140 can be a lane next to or adjacent to a permitted parking lane. In this instance, the LPR camera 116 of the edge device 102 cannot be used to capture the license plate 129 of the potentially offending vehicle 122 due to the positioning of the LPR camera 116 (which, in this case, may be pointed to the right side of the carrier vehicle 110).

When a potentially offending vehicle 122 is detected in the event video frame 124 but a license plate 129 is not captured by the LPR camera 116, the edge device 102 (e.g., the license plate recognition engine 304) can trigger the event camera 114 to operate as an LPR camera. When the event camera 114 is triggered to act as the LPR camera (at least temporarily), the event video frames 124 captured by the event camera 114 can be passed to the LPR deep learning models 310 running on the edge device 102.

For example, when a carrier vehicle 110 (e.g., a municipal bus) is stopped and the license plate 129 of the potentially offending vehicle 122 is not detected in the license plate video frames 126, the event camera 114 can be triggered to operate (at least temporarily) as the LPR camera where the event video frames 124 are passed to the LPR deep learning models 310 for automatic license plate recognition.

Figure 5B:
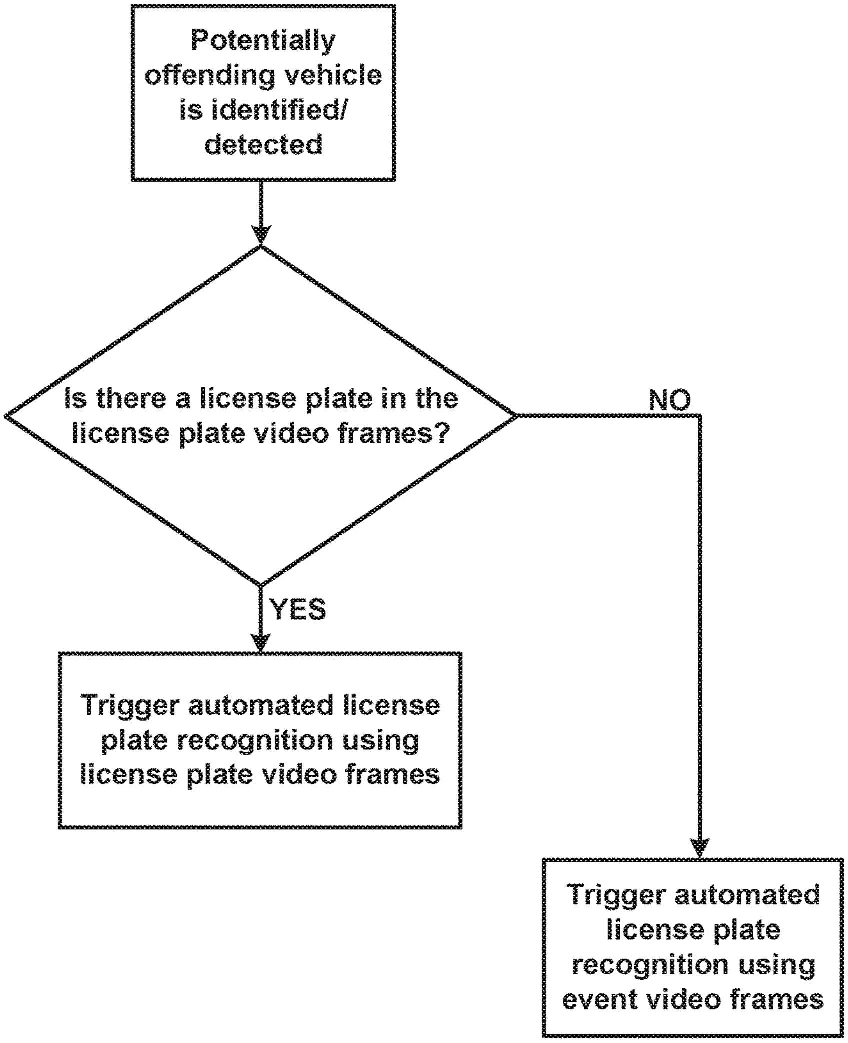
FIG. 5B is a flowchart illustrating the logic of switching from a license plate recognition (LPR) camera to the event camera of the edge device for automated license plate recognition.

FIG. 5B illustrates a flowchart showing the logic of switching from the LPR camera 116 to the event camera 114 for automated license plate recognition when a carrier vehicle 110 carrying the edge device 102 is approaching a potentially offending vehicle 122 directly from behind or at an insufficient angle such that the LPR camera 116 is not in a position to capture the license plate of the potentially offending vehicle 122.

For example, FIG. 5B illustrates that once the potentially offending vehicle 122 is detected or identified, a query can be made as to whether a license plate 129 appears in any of the license plate video frames 124 captured by the LPR camera 116. If the answer to this query is yes, such license plate video frames 124 containing the license plate 129 of the potentially offending vehicle 122 can be passed to an LPR deep learning model 310 running on the edge device 102 to automatically recognize the license plate number 128 of the license plate 129. Alternatively, if the answer to this query is no and no license plate 129 is detected in the license plate video frames 124, the event video frames 124 captured by the event camera 114 can be used for automated license plate recognition by being passed to the LPR deep learning model 310 running on the edge device 102.

Figure 5C:
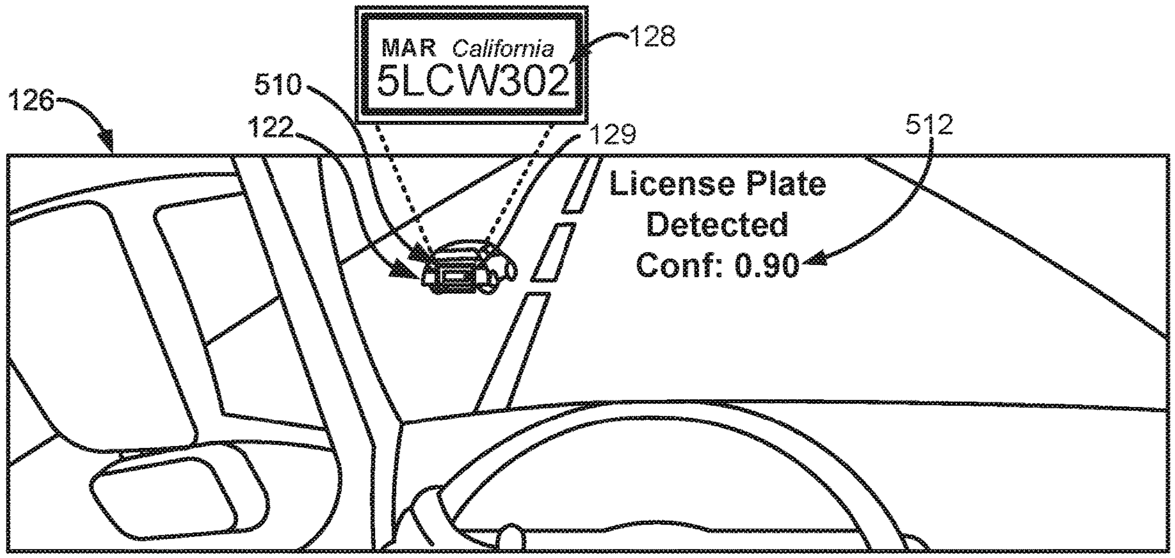
FIG. 5C illustrates an example of a license plate video frame showing a potentially offending vehicle bounded by a vehicle bounding polygon and a license plate of the potentially offending vehicle bounded by a license plate bounding polygon.

FIG. 5C illustrates an example of a license plate video frame 126 showing a license plate 129 of the potentially offending vehicle 122 bounded by a license plate bounding polygon 510. The license plate video frame 126 can be one of the video frames grabbed or otherwise retrieved by the license plate recognition engine 304 from the videos captured by the LPR camera 116 of the edge device 102. As previously discussed, the license plate recognition engine 304 can periodically or continuously pass license plate video frames 126 from the videos captured by the LPR camera 116 to an LPR deep learning model 310 (see FIG. 3) running on the edge device 102.

The LPR deep learning model 310 can be specifically trained to recognize license plate numbers from video frames or images. By feeding the license plate video frame 126 to the LPR deep learning model 310, the control unit 112 of the edge device 102 can obtain as an output from the LPR deep learning model 310, a prediction concerning the license plate number 128 of the potentially offending vehicle 122. The prediction can be in the form of an alphanumeric string representing the license plate number 128. The control unit 112 can also obtain as an output from the LPR deep learning model 310 an LPR confidence score 512 concerning the recognition.

The LPR confidence score 512 can be between 0 and 1.0. In some embodiments, the control unit 112 of the edge device 102 can abide by the results of the recognition only if the LPR confidence score 512 is above a preset confidence threshold. For example, the confidence threshold can be set at between 0.65 and 0.90 (e.g., at 0.70).

Figure 5D:
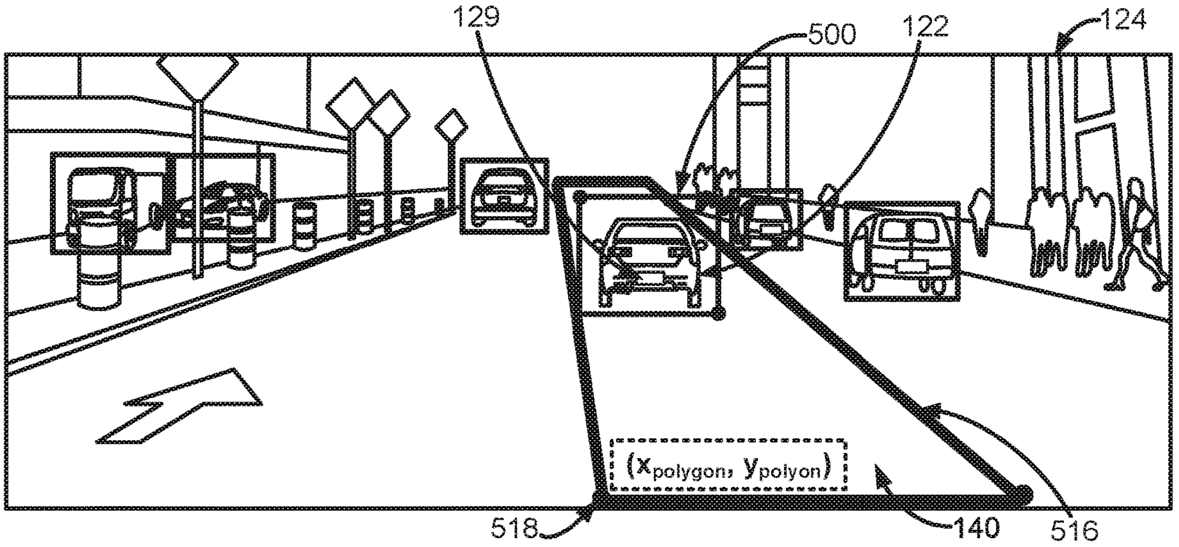
FIG. 5D illustrates another example of an event video frame showing a potentially offending vehicle bounded by a vehicle bounding polygon and a no-parking lane bounded by a land bounding polygon.

FIG. 5D illustrates another example of an event video frame 124 showing a potentially offending vehicle 122 bounded by a vehicle bounding polygon 500 and a lane bounded by a lane bounding polygon 516. The event video frame 124 can be one of the video frames grabbed or otherwise retrieved from the videos captured by the event camera 114 of the edge device 102. The event detection engine 300 of the edge device 102 can periodically or continuously pass event video frames 124 to the object detection deep learning model 308 and the lane segmentation deep learning model 312 running on the edge device 102 (see FIG. 3). As discussed above in relation to FIG. 5A, the object detection deep learning model 308 can bound the potentially offending vehicle 122 in the vehicle bounding polygon 500 and the control unit 112 of the edge device 102 can obtain as outputs from the object detection deep learning model 308, predictions concerning the object class 502, the object detection confidence score 504, and a set of image coordinates 506 for the vehicle bounding polygon 500.

The event detection engine 300 can also pass or feed event video frames 124 to the lane segmentation deep learning model 312 to detect one or more lanes 707 shown in the event video frames 124. Moreover, the event detection engine 300 can also recognize that one of the lanes 707 detected is a no-parking lane 140. In some embodiments, the no-parking lane 140 can be a lane next to or adjacent to a permitted parking lane.

As shown in FIG. 5D, the lane segmentation deep learning model 312 can bound the no-parking lane 140 in a lane bounding polygon 516. The lane segmentation deep learning model 312 can also output image coordinates 518 associated with the lane bounding polygon 516.

In some embodiments, the lane bounding polygon 516 can be a quadrilateral. More specifically, the lane bounding polygon 516 can be shaped substantially as a trapezoid.

The event detection engine 300 can determine that the potentially offending vehicle 122 is parked in the no-parking lane 140 based on the amount of overlap between the vehicle bounding polygon 500 bounding the potentially offending vehicle 122 and the lane bounding polygon 516 bounding the no-parking lane 140. For example, the image coordinates 506 associated with the vehicle bounding polygon 500 can be compared with the image coordinates 518 associated with the lane bounding polygon 516 to determine an amount of overlap between the vehicle bounding polygon 500 and the polygon 516. As a more specific example, the event detection engine 300 can calculate a lane occupancy score to determine whether the potentially offending vehicle 122 is parked in the no-parking lane 140. A higher lane occupancy score can be equated with a higher degree of overlap between the vehicle bounding polygon 500 and the lane bounding polygon 516.

Although FIG. 5D illustrates only one instance of a lane bounding polygon 516, it is contemplated by this disclosure that multiple lanes can be bound by lane bounding polygons 516 in the same video frame (see, e.g., FIG. 7C). Moreover, although FIGS. 5A and 5D illustrate a visual representation of the vehicle bounding polygon 500, the license plate bounding polygon 510, and the lane bounding polygon 516, it should be understood by one of ordinary skill in the art that the image coordinates of such bounding boxes and polygons and can be used as inputs only by the edge device 102 or the server 104 or stored in the database 107 without the actual vehicle bounding polygon 500, license plate bounding polygon 510, or lane bounding polygon 516 being visualized.

FIG. 6 illustrates a schematic representation of one embodiment of the lane segmentation deep learning model 312. As shown in FIG. 6, the lane segmentation deep learning model 312 can be a multi-headed neural network trained for lane detection and segmentation. For example, the lane segmentation deep learning model 312 can be a multi-headed convolutional neural network.

As shown in FIG. 6, the lane segmentation deep learning model 312 can comprise a plurality of prediction heads 600 operating on top of several shared layers. For example, the prediction heads 600 can comprise a first head 600A, a second head 600B, a third head 600C, and a fourth head 600D. The first head 600A, the second head 600B, the third head 600C, and the fourth head 600D can share a common stack of network layers including at least a convolutional backbone 602 (e.g., a feature extractor).

The convolutional backbone 602 can be configured to receive as inputs event video frames 124 that have been cropped and re-sized by pre-processing operations undertaken by the second worker 402B. The convolutional backbone 602 can then pool certain raw pixel data and sub-sample certain raw pixel regions of the video frames to reduce the size of the data to be handled by the subsequent layers of the network.

The convolutional backbone 602 can extract certain essential or relevant image features from the pooled image data and feed the essential image features extracted to the plurality of prediction heads 600.

The prediction heads 600, including the first head 600A, the second head 600B, the third head 600C, and the fourth head 600D, can then make their own predictions or detections concerning different types of lanes captured by the video frames.

By designing the lane segmentation deep learning model 312 in this manner (i.e., multiple prediction heads 600 sharing the same underlying layers), the second worker 402B can ensure that the predictions made by the various prediction heads 600 are not affected by any differences in the way the image data is processed by the underlying layers.

Although reference is made in this disclosure to four prediction heads 600, it is contemplated by this disclosure that the lane segmentation deep learning model 312 can comprise five or more prediction heads 600 with at least some of the heads 600 detecting different types of lanes. Moreover, it is contemplated by this disclosure that the event detection engine 300 can be configured such that the object detection workflow of the object detection deep learning model 308 is integrated with the lane segmentation deep learning model 312 such that the object detection steps are conducted by an additional head 600 of a singular neural network.

In some embodiments, the first head 600A of the lane segmentation deep learning model 312 can be trained to detect a lane-of-travel. The lane-of-travel can also be referred to as an "ego lane" and is the lane currently occupied by the carrier vehicle 110.

The lane-of-travel can be detected using a position of the lane relative to adjacent lanes and the rest of the video frame. The first head 600A can be trained using a dataset designed specifically for lane detection and segmentation. In other embodiments, the first head 600A can also be trained using video frames obtained from deployed edge devices 102.

In these and other embodiments, the second head 600B of the lane segmentation deep learning model 312 can be trained to detect lane markings 704 (see, e.g., FIG. 7A). For example, the lane markings 704 can comprise lane lines, text markings, markings indicating a crosswalk, markings indicating turn lanes, dividing line markings, or a combination thereof.

In some embodiments, the third head 600C of the lane segmentation deep learning model 312 can be trained to detect the no-parking lane 140 (see, e.g., FIG. 7A). In some embodiments, the no-parking lane 140 can be a lane next or adjacent to a permitted parking lane. In other embodiments, the no-parking lane 140 can be a bus lane when the bus lane is outside of a bus lane enforcement period, a bike lane, a fire lane, or a no-stopping zone. The third head 600C can detect the no-parking lane 140 based on an automated lane detection algorithm. The lane detection algorithm can be disclosed in relation to FIGS. 7A-7C.

The third head 600C can be trained using video frames obtained from deployed edge devices 102. In other embodiments, the third head 600C can also be trained using training data (e.g., video frames) obtained from a dataset.

The fourth head 600D of the lane segmentation deep learning model 312 can be trained to detect one or more adjacent or peripheral lanes 702 (see, e.g., FIG. 7C) after the no-parking lane 140 is detected. In some embodiments, the adjacent or peripheral lanes 702 can be lanes immediately adjacent to the no-parking lane 140 or the lane-of-travel, or lanes further adjoining the immediately adjacent lanes. In certain embodiments, the fourth head 600D can detect the adjacent or peripheral lanes 702 based on a determined position of the no-parking lane 140 and/or the lane-of-travel. The fourth head 600D can be trained using video frames obtained from deployed edge devices 102. In other embodiments, the fourth head 600D can also be trained using training data (e.g., video frames) obtained from a dataset.

In some embodiments, the training data (e.g., video frames) used to train the prediction heads 600 (any of the first head 600A, the second head 600B, the third head 600C, or the fourth head 600D) can be annotated using semantic segmentation. For example, the same video frame can be labeled with multiple labels (e.g., annotations indicating a no-parking lane, a lane-of-travel, adjacent/peripheral lanes, crosswalks, etc.) such that the video frame can be used to train multiple or all of the prediction heads 600.

FIG. 7A illustrates an event video frame 124 showing a no-parking lane 140 bounded by a lane bounding polygon 516 and vehicles, including a potentially offending vehicle 122, bounded by vehicle bounding polygons 500. FIG. 7A also includes a visualization of a plurality of road edge points 705 that can be used to fit a line 703 representing a road edge 701 of a roadway 700. For purposes of this disclosure, the road edge 701 can be an edge or line formed by a roadway 700 where the roadway 700 meets a curb or sidewalk directly adjacent to or abutting the roadway 700. For example, the road edge 701 can follow a gutter line or a line that serves as the interface between the gutter of the roadway 700 and the curb/sidewalk. Although the road edge points 705 and the line 703 are shown in FIG. 7A, it should be understood by one of ordinary skill in the art that the method(s) disclosed herein can be made operable without displaying or visualizing the road edge points 705 or the line 703.

One technical problem faced by the applicant when it comes to detection of double parking violations is how to determine the location of a no-parking lane 140. This can be made more difficult by the fact that, oftentimes, the no-parking lane 140 is offset from a curb or sidewalk by one or more parking lanes or loading zones where parking or stopping is permitted. One technical solution discovered and developed by the applicant is to first determine the location of a road edge 701 of the roadway 700 from video frames (e.g., event video frames 124) capturing a potential double parking violation and then to determine the location of the other lanes, including the location of a no-stopping or no-parking parking lane, in relation to the road edge 701 using data or information concerning the widths of municipal roadway lanes (which are often standardized or can be easily measured/surveyed).

One method for determining the location of the road edge 701 can comprise the step of feeding one or more event video frames 124 captured by the edge device 102 to a lane segmentation deep learning model 312 running on the edge device 102 (see, e.g., FIG. 6). One prediction head 600 of the lane segmentation deep learning model 312 (e.g., a semantic segmentation head) can generate or output a mask 706 or heatmap (see, e.g., FIG. 7B) representing an edge or boundary of a roadway 700 shown in the event video frame(s) 124. The mask or heatmap can be obtained by performing pixel-level segmentation of the one or more event video frames 124.

FIG. 7B illustrates an example mask 706 or heatmap that can be generated or outputted by a prediction head 600 of the lane segmentation deep learning model 312. As shown in FIG. 7B, the mask 706 or heatmap can represent a right edge or boundary of the roadway 700 shown in the event video frame 124.

In some embodiments, the lane segmentation deep learning model 312 can be programmed to select the mask 706 or heatmap on the right or right-hand side when the system 100 or methods disclosed herein are deployed in a country (e.g., the United States) or region where the flow of traffic is on the right-hand side. In other embodiments, the lane segmentation deep learning model 312 can be programmed to select a mask 706 or heatmap on the left or left-hand side when the system 100 or methods disclosed herein are deployed in a country (e.g., the United Kingdom) or region where the flow of traffic is on the left-hand side.

The mask 706 or heatmap can be considered an initial rough approximation of the road edge 701. The next step in the method can comprise discarding or ignoring all pixels of the mask 706 or heatmap that do not exceed a preset mask value threshold (e.g., mask value>0.25). At this point, each of the remaining pixels can be represented by a tuple comprising the pixel's x-coordinate, y-coordinate, and mask value.

Since the number of pixels remaining, even after the thresholding step above, can still be quite high and contain numerous redundant pixels (especially along the horizontal direction), the number of pixels remaining can be further culled through a slicing technique. The slicing technique can comprise slicing the mask 706 or heatmap horizontally and vertically with a step of N and M pixels, respectively. The mask 706 or heatmap can then be analyzed along each slice by finding a center of weight of each slice. This is done by using mask values of the pixels as weighting factors of each coordinate (the x-coordinate or the y-coordinate, depending on the horizontal or vertical slice). For example, each of the horizontal slices can produce a single pair comprising a "weighted" x-coordinate and a y-coordinate, which is defined by the step of the slicing. In certain embodiments, a mean value of the mask scores along a given slice can be calculated and assigned to such a coordinate pair as a confidence score of the point. This way, the mask 706 or heatmap which began as a rough approximation of the road edge 701 can be reduced to a K number of points where the max value for K is determined by the following: K=(video_frame_width//M)+ (video_frame_height//N), where the double slash (//) is a division operator that produces a result that is rounded down to the nearest whole number.

In some embodiments, the resulting K number of points can be considered the road edge points 705. The road edge points 705 can be further culled using an iterative non-deterministic outlier detection algorithm to yield a line 703 representing the road edge 701.

In some embodiments, the iterative non-deterministic outlier detection algorithm can be a random sample consensus (RANSAC) algorithm that randomly selects a subset of points to be inliers, attempts to fit a line (e.g., a linear regression model) to the subset of points, discards outlier points, and repeats the process until additional outlier points are identified and discarded.

In other embodiments, the road edge points 705 can also be further culled using another outlier detection algorithm such as an M-estimator sample consensus (MSAC) algorithm, a maximum likelihood estimator sample consensus (MLESAC) algorithm, or a least-median of squares algorithm.

In certain embodiments, the line 703 fitted to the plurality of road edge points 705 can be parameterized by a slope and an intercept. Each of the slope and the intercept of the line 703 can be calculated using a sliding window or moving average algorithm such that the slope is an average slope value and the intercept is an average intercept value calculated from several event video frames 124 prior in time. This additional step can ensure that the line 703 fitted to the road edge points 705 is robust and accurately represents the road edge 701.

At this point, the method can further comprise determining a layout of one or more lanes of the roadway 700, including the no-parking lane 140, using the fitted line 703 to represent the road edge 701.

FIG. 7C illustrates a line 703 fitted to a plurality of road edge points 705 using an iterative non-deterministic outlier detection algorithm (e.g., RANSAC) and four lanes positioned to the left of the line 703 representing the road edge 701. The layout of the four lanes, including the location of the no-parking lane 140, can be determined based on the line 703 fitted to the plurality of road edge points 705.

In some embodiments, the layout of the lanes 707 (e.g., the no-parking lane 140, the peripheral lanes 702, the lane-of-travel, etc.) can be determined by the edge device 102 using a known or predetermined width of each of the lanes 707 encoded or embedded in a map layer 303 stored on each of the edge devices 102. The known or predetermined width of each of the lanes 707 can be obtained by performing surveys or measurements of such lanes in the field or obtained from one or more publicly-available map databases or municipal/governmental databases. Such lane width data can then be associated with the relevant streets/roadways, areas/regions, or coordinates in the map layer 303.

The map layer 303 can also comprise data or information concerning the position of the no-parking lane 140 relative to the other lanes 707 of the roadway 700. The map layer 303 can further comprise data or information concerning a total number of lanes 707 of the roadway 700 and the direction-of-travel of such lanes 707. Such data or information can also be obtained by performing surveys or measurements of such lanes 707 in the field or obtained from one or more publicly-available map databases or municipal/governmental databases. Such data or information can be encoded or embedded in the map layer 303 and then associated with the relevant streets/roadways, areas/regions, or coordinates in the map layer 303.

The map layer 303 can be stored as part of the localization and mapping engine 302 or accessible by the localization and mapping engine 302 running on each of the edge devices 102. For example, the map layer 303 can comprise one or more semantic maps or semantic annotated maps. The edge device 102 can receive updates to the map layer 303 from the server 104 or receive new semantic maps or semantic annotated maps from the server 104.

The edge device 102 can use its own current location 130 (e.g., obtained from the communication and positioning unit 118) to query the map layer 303 for the known or predetermined width of the lanes 707, the total number of lanes 707, the location or position of the one or more no-parking lanes 140 relative to the other lanes 707 or the road edge 701, and the direction-of-travel for such lanes 707 for that particular location. In some embodiments, the edge device 102 can pull map data (including the known or predetermined width of the lanes 707, the total number of lanes 707, the location or position of the one or more no-parking lanes 140 relative to the other lanes 707, and the direction-of-travel of such lanes 707) from the map layer 303 as the carrier vehicle 110 carrying the edge device 102 drives along different roadways 700 or drives along its daily route.

The edge device 102 can determine the layout of the lanes 707 of the roadway 700 using the line 703 to represent the road edge 701 (e.g., the right road edge) and using certain data or information retrieved or pulled from the map layer 303. For example, the edge device 102 can determine the location of one or more no-parking lanes 140 based on the line 703 representing the road edge 701, the known or predetermined width of the lanes 707, and the location or position of the one or more no-parking lanes 140 relative to the road edge 701 or relative to the other lanes 707.

Since the event video frame 124 captures the lanes 707 of the roadway 700 (and the road edge 701) from a perspective of the event camera 114, the edge device 102 can also transform the layout of the lanes 707 (and the road edge 701) using a perspective transformation algorithm (i.e., homography) to provide more insights concerning the location of the potentially offending vehicle 122 relative to the no-parking lane 140.

FIG. 7C also illustrates that the no-parking lane 140 can be a lane that serves as a bus lane during a bus lane enforcement period (e.g., between the hours of 6 am and 10 pm on weekdays). When outside of this bus lane enforcement period (e.g., between the hours of 10 μm and 6 am on the weekdays and on weekends), this lane can serve as a no-parking lane 140. For example, vehicles that stop or park in this no-parking lane 140 can be assessed a bus lane violation during the bus lane enforcement period and vehicles that stop or park in this no-parking lane 140 outside of the bus lane enforcement period (i.e., during all other times) can be assessed a double-parking violation.

In some embodiments, the various enforcement time periods can be stored as part of the map layer 303 of the localization and mapping engine 302 such that the event detection engine 300 of the edge device 102 can determine the applicable traffic rule based on the current location 130 of the edge device 102 and the timestamps 132 recorded.

The event detection engine 300 can dynamically switch detection algorithms (e.g., double parking violation detection algorithms, bus lane violation detection algorithms, etc.) based on the applicable enforcement rules at the time.

Figure 8A:
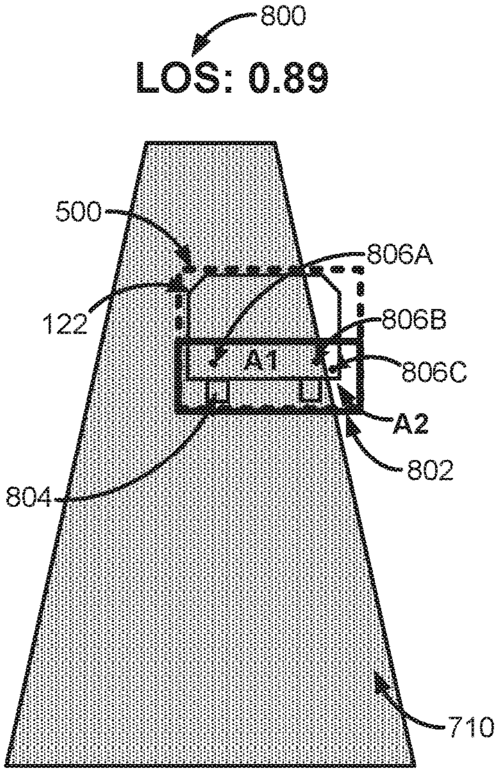
FIGS. 8A and 8B illustrate example scenarios where a lane occupancy score can be calculated.
Figure 8B:
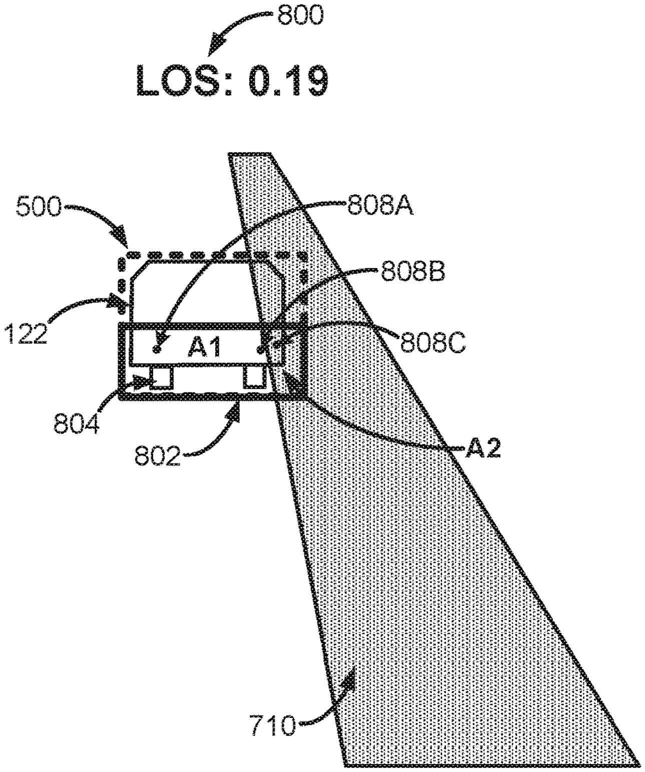

FIGS. 8A and 8B illustrate one embodiment of a method of calculating a lane occupancy score 800. In this embodiment, the lane occupancy score 800 can be calculated based in part on the translated image coordinates 506 of the vehicle bounding polygon 500 and the translated image coordinates 518 of the LOI polygon 708 (see FIGS. 7A and 7C). As previously discussed, the translated image coordinates 506 of the vehicle bounding polygon 500 and the LOI polygon 708 can be based on the same uniform coordinate domain (for example, a coordinate domain of the video frame originally captured).

As shown in FIGS. 8A and 8B, an upper portion of the vehicle bounding polygon 500 can be discarded or left unused such that only a lower portion of the vehicle bounding polygon 500 (also referred to as a lower bounding polygon 802) remains. In some embodiments, the lower bounding polygon 802 can be a truncated version of the vehicle bounding polygon 500 including only the bottom 5% to 30% (e.g., 15%) of the vehicle bounding polygon 500. For example, the lower bounding polygon 802 can be the bottom 15% of the vehicle bounding polygon 500.

As a more specific example, the lower bounding polygon 802 can be substantially rectangular with a height dimension equal to between 5% to 30% of the height dimension of the vehicle bounding polygon 500 but with the same width dimension as the vehicle bounding polygon 500. As another example, the lower bounding polygon 802 can be substantially rectangular with an area equivalent to between 5% to 30% of the total area of the vehicle bounding polygon 500. In all such examples, the lower bounding polygon 802 can encompass the tires 804 of the potentially offending vehicle 122 captured in the event video frame 124. Moreover, it should be understood by one of ordinary skill in the art that although the word "box" is sometimes used to refer to the vehicle bounding polygon 500 and the lower bounding polygon 802, the height and width dimensions of such bounding "boxes" do not need to be equal.

The method of calculating the lane occupancy score 800 can also comprise masking the LOI polygon 708 such that the entire area within the LOI polygon 708 is filled with pixels. For example, the pixels used to fill the area encompassed by the LOI polygon 708 can be pixels of a certain color or intensity. In some embodiments, the color or intensity of the pixels can represent or correspond to a confidence level or confidence score of a detection undertaken by the first worker 402A (from the object detection deep learning model 308), the second worker 402B (from the lane segmentation deep learning model 312), or a combination thereof.

The method can further comprise determining a pixel intensity value associated with each pixel within the lower bounding polygon 802. The pixel intensity value can be a decimal number between 0 and 1. In some embodiments, the pixel intensity value corresponds to a confidence score or confidence level provided by the lane segmentation deep learning model 312 that the pixel is part of the LOI polygon 708. Pixels within the lower bounding polygon 802 that are located within a region that overlaps with the LOI polygon 708 can have a pixel intensity value closer to 1. Pixels within the lower bounding polygon 802 that are located within a region that does not overlap with the LOI polygon 708 can have a pixel intensity value closer to 0. All other pixels including pixels in a border region between overlapping and non-overlapping regions can have a pixel intensity value in between 0 and 1.

For example, as shown in FIG. 8A, a potentially offending vehicle 122 can be parked in a no-parking lane 140 that has been bounded by an LOI polygon 708. The LOI polygon 708 has been masked by filling in the area encompassed by the LOI polygon 708 with pixels. A lower bounding polygon 802 representing a lower portion of the vehicle bounding polygon 500 has been overlaid on the masked LOI polygon to represent the overlap between the two bounded regions.

FIG. 8A illustrates three pixels within the lower bounding polygon 802 including a first pixel 806A, a second pixel 806B, and a third pixel 806C. Based on the scenario shown in FIG. 8A, the first pixel 806A is within an overlap region (shown as A1 in FIG. 8A), the second pixel 806B is located on a border of the overlap region, and the third pixel 806C is located in a non-overlapping region (shown as A2 in FIG. 8A). In this case, the first pixel 806A can have a pixel intensity value of about 0.99 (for example, as provided by the second worker 402B), the second pixel 806B can have a pixel intensity value of about 0.65 (as provided by the second worker 402B), and the third pixel 806C can have a pixel intensity value of about 0.09 (also provided by the second worker 402B).

FIG. 8B illustrates an alternative scenario where a potentially offending vehicle 122 is parked in a lane adjacent to a no-parking lane 140 that has been bounded by an LOI polygon 708. In this scenario, the potentially offending vehicle 122 is not actually in the no-parking lane 140. Three pixels are also shown in FIG. 8B including a first pixel 808A, a second pixel 808B, and a third pixel 808C. The first pixel 808A is within a non-overlapping region (shown as A1 in FIG. 8B), the second pixel 808B is located on a border of the non-overlapping region, and the third pixel 808C is located in an overlap region (shown as A2 in FIG. 8B). In this case, the first pixel 808A can have a pixel intensity value of about 0.09 (for example, as provided by the second worker 402B), the second pixel 808B can have a pixel intensity value of about 0.25 (as provided by the second worker 402B), and the third pixel 808C can have a pixel intensity value of about 0.79 (also provided by the second worker 402B).

With these pixel intensity values determined, a lane occupancy score 800 can be calculated. The lane occupancy score 800 can be calculated by taking an average of the pixel intensity values of all pixels within each of the lower bounding polygons 802. The lane occupancy score 800 can also be considered the mean mask intensity value of the portion of the LOI polygon 708 within the lower bounding polygon 802.

For example, the lane occupancy score 800 can be calculated using Formula I below:

$$\text{Lane Occupancy Score} = \frac{\sum_{i=1}^{n} \text{Pixel Intensity Value}_i}{n} \qquad \text{Formula I}$$

where n is the number of pixels within the lower portion of the vehicle bounding polygon (or lower bounding polygon 802) and where the Pixel Intensity Value; is a confidence level or confidence score associated with each of the pixels within the LOI polygon 708 relating to a likelihood that the pixel is depicting part of a no-parking lane such as a no-parking lane 140. The pixel intensity values can be provided by the second worker 402B using the lane segmentation deep learning model 312.

The method can further comprise detecting a double parking violation when the lane occupancy score 800 exceeds a predetermined threshold value.

Going back to the scenarios shown in FIGS. 8A and 8B, the lane occupancy score 800 of the potentially offending vehicle 122 shown in FIG. 8A can be calculated as approximately 0.89 while the lane occupancy score 800 of the potentially offending vehicle 122 shown in FIG. 8B can be calculated as approximately 0.19. In both cases, the predetermined threshold value for the lane occupancy score 800 can be set at 0.75. With respect to the scenario shown in FIG. 8A, the third worker 402C of the event detection engine 300 can calculate the lane occupancy score 800 and determine that a double parking violation has occurred and can begin to generate an evidence package 136 to be sent to the server 104 or a third-party computing device/client device 138. With respect to the scenario shown in FIG. 8B, the third worker 402C can determine that a double parking violation has not occurred.

Figure 9:
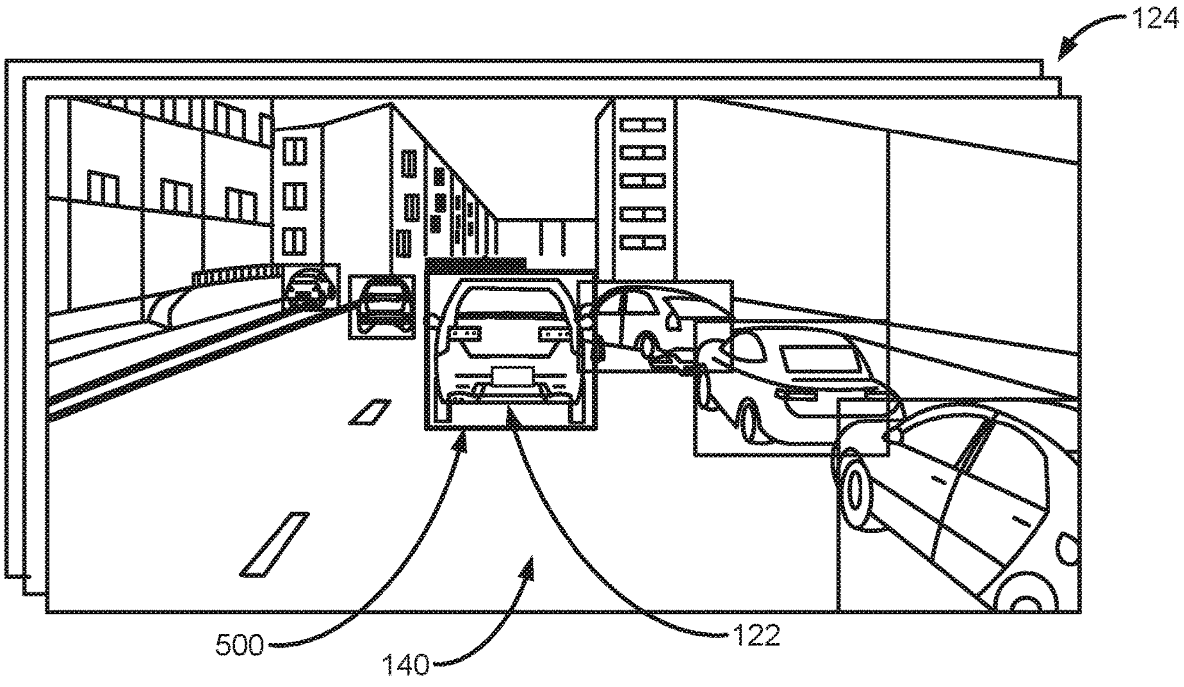
FIG. 9 illustrates example event video frames where a potentially offending vehicle is bounded by a vehicle bounding polygon in each of the event video frames.

In some embodiments, a vehicle movement classifier 313 running on the edge device 102 or another instance of the vehicle movement classifier 313 running on the server 104 can track vehicle bounding polygons 500 across multiple video frames to determine whether the potentially offending vehicle 122 is moving or static (see, e.g., FIG. 9).

FIG. 9 illustrates example event video frames 124 where a potentially offending vehicle 122 appearing in such event video frames 124 is bounded by a vehicle bounding polygon 500 in each of the event video frames 124. The vehicle movement classifier 313 or vehicle movement classification module of the edge device 102 can track the vehicle bounding polygons 500 across multiple event video frames 124 captured by the event camera 114 of the edge device 102. The vehicle bounding polygons 500 can be connected across multiple frames using a tracking algorithm such as a mixed integer linear programming (MILP) algorithm.

In other embodiments, the tracking algorithm can be the Hungarian Algorithm, an Intersection-over-Union (IOU) algorithm, a centroid distance algorithm, or a tracking-by-detection algorithm.

The vehicle bounding polygons 500 can be tracked as part of a method for determining whether the potentially offending vehicle 122 is moving or static. A "moving vehicle" is a vehicle that is determined to be moving when captured in an event video by the event camera 114. A "static vehicle" is a vehicle that is determined to be not moving (e.g., the vehicle is parked or otherwise stopped temporarily) when captured in the event video by the event camera 114.

It is important to differentiate between a vehicle that is moving and a vehicle that is static because a moving vehicle detected within a no-parking lane 140 cannot be assessed a double parking violation.

The method of determining whether the potentially offending vehicle 122 is moving or static can comprise the step of first associating GPS coordinates (obtained from the positioning unit 118 of the edge device 102, see FIG. 2A) with timestamps of each of the event video frames 124. The GPS coordinates of the potentially offending vehicle 122 bounded by the vehicle bounding polygon 500 can then be computed or determined from the event video frames 124 using a homography localization algorithm (see FIG. 10A for a visualization of the GPS coordinates overlaid on a map graphic). For example, a transformation matrix can be calculated that transforms 2D points in the event video frame 124 (or the image plane of the event camera 114) to road or GPS coordinates with respect to the carrier vehicle 110. The transformation matrix can be calculated by measuring GPS coordinates and associating such GPS coordinates with 2D points in the event video frame 124 (or the image plane of the event camera 114). An optimization process can then be used to derive the transformation matrix. The GPS coordinates of the potentially offending vehicle 122 bounded by the vehicle bounding polygon 500 can then be computed or determined from the event video frames 124 using the derived transformation matrix and using the GPS coordinates of the carrier vehicle 110 (which can be obtained using the positioning unit 118 of the edge device 102 mounted to the carrier vehicle 110). Since the event camera 114 of the edge device 102 is also the origin point of the event video frame 124, the location of the vehicle bounding polygon 500 in the image plane can be transformed into GPS coordinates based on the GPS location of the carrier vehicle 110 (or edge device 102). As a more specific example, if the vehicle bounding polygon 500 bounding the potentially offending vehicle 122 is 5 meters in front and 3 meters to the right of the carrier vehicle 110 (or edge device 102), the GPS coordinates of the carrier vehicle 110 (or edge device 102) can be adjusted by this amount to obtain the GPS coordinates of the vehicle bounding polygon 500.

The GPS coordinates of the vehicle bounding polygons 500 across multiple event video frames 124 can then be tracked and a cluster or set of GPS coordinates tracking the potentially offending vehicle 122 can be transformed or converted into a local Cartesian coordinate system {L}.

Figure 10A:
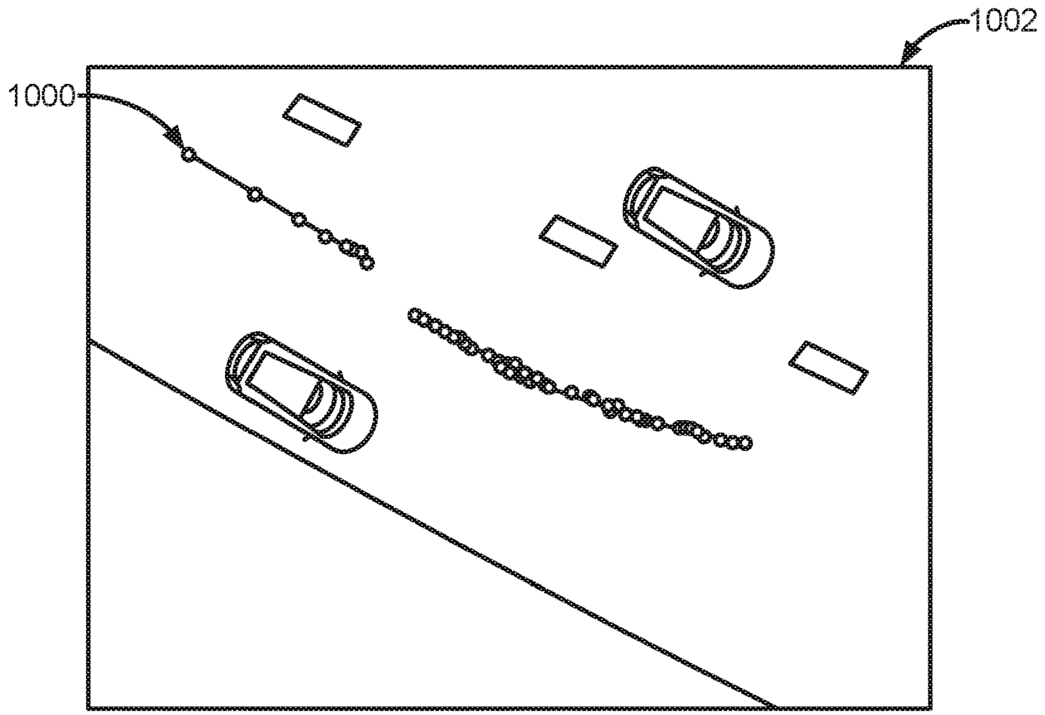
FIG. 10A illustrates GPS coordinates of a potentially offending vehicle tracked and visualized on a map graphic.

FIG. 10A illustrates the tracked GPS coordinates 1000 of the potentially offending vehicle 122 visualized on a map graphic 1002. Each dot on the map graphic represents a computed location (in the form of GPS coordinates 1000) of the potentially offending vehicle 122 per frame. As previously discussed, the GPS coordinates 1000 can then be transformed or converted into a local Cartesian coordinate system 1004 (see FIG. 10B).

Figure 10B:
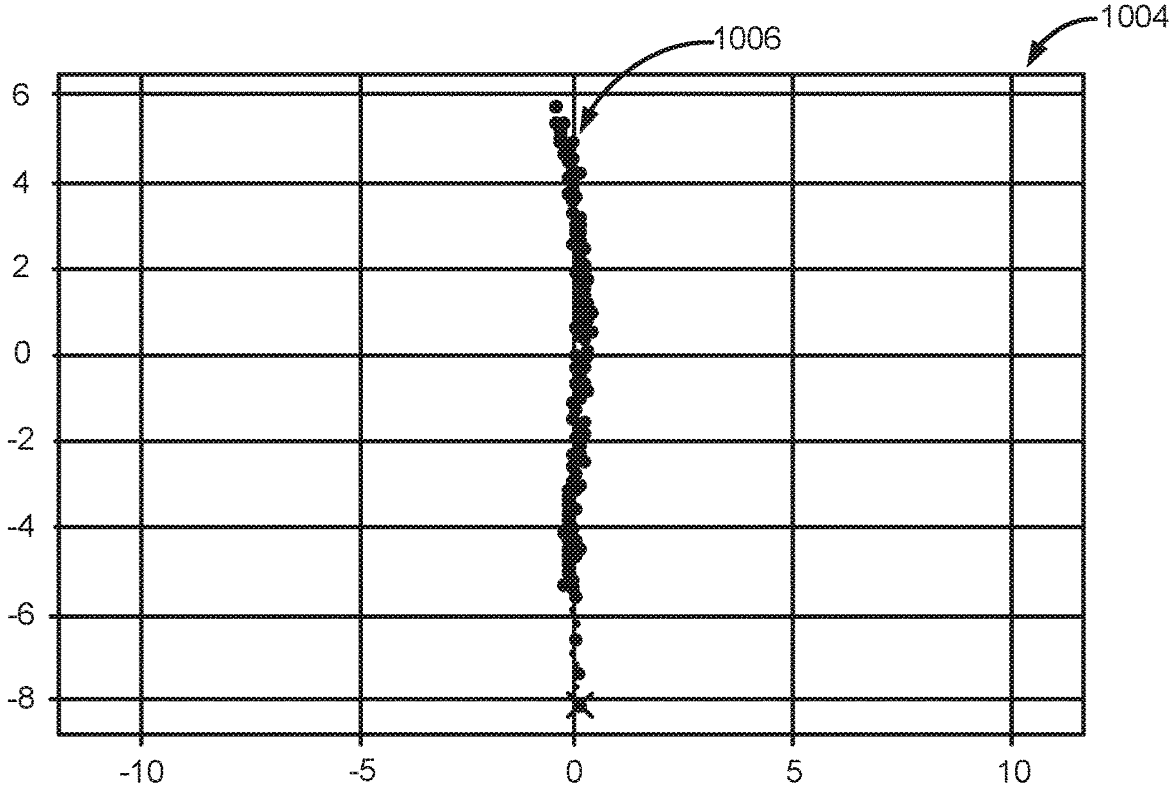
FIG. 10B illustrates an example of a local Cartesian coordinate system where GPS coordinates of a potentially offending vehicle are transformed or converted and plotted in a local Cartesian coordinate system.

FIG. 10B illustrates an example of a local Cartesian coordinate system 1004 where the GPS coordinates 1000 of FIG. 10A are transformed or converted and then plotted as transformed coordinates 1006 in the local Cartesian coordinate system 1004.

The local Cartesian coordinate system 1004 can be centered at an average GPS coordinate (which can be considered a naïve mean at such a small local scale), the Z-axis of the coordinate system 1004 can be pointed in a vertical direction, the Y-axis can be aligned with the heading or direction of travel of the carrier vehicle 110, and the X-axis can be in a lateral direction (according to the right-hand rule). The purpose of converting or normalizing the GPS coordinates 1000 using the local Cartesian coordinate system 1004 is to better align the event trajectory data across different events and to eliminate the effects that different street directions have on how the data is used.

Figure 11A:
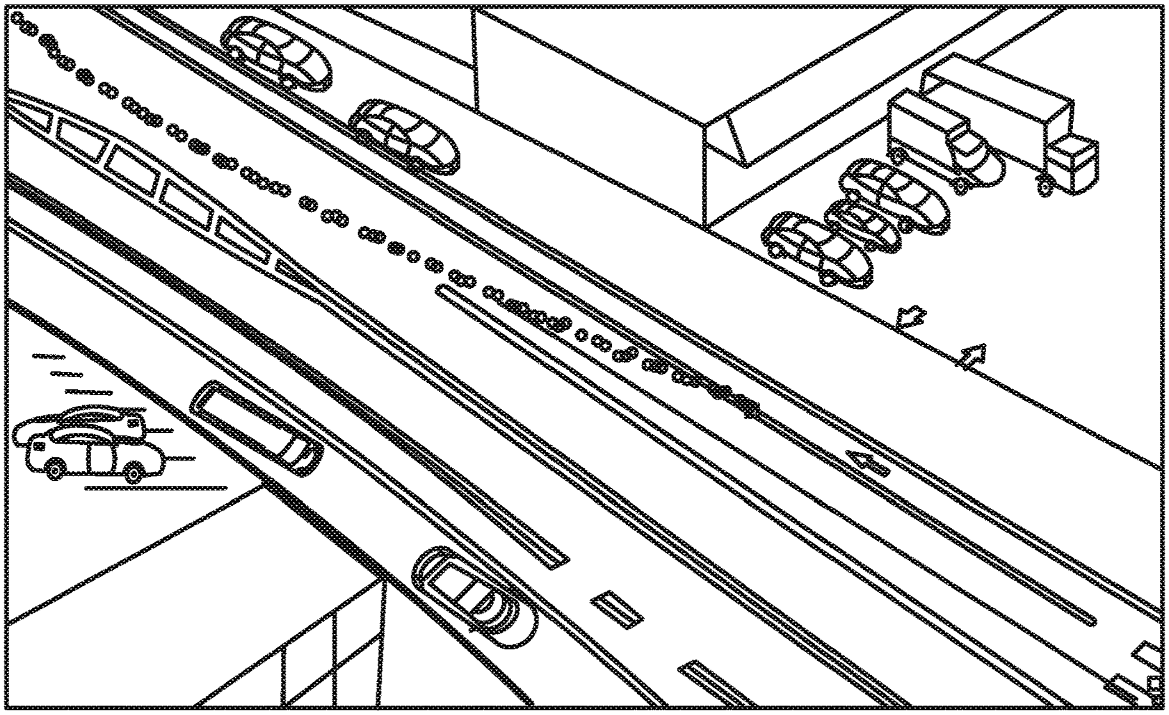
FIGS. 11A and 11B illustrate computed trajectories of a moving vehicle and a static vehicle, respectively, visualized on a map graphic.
Figure 11B:
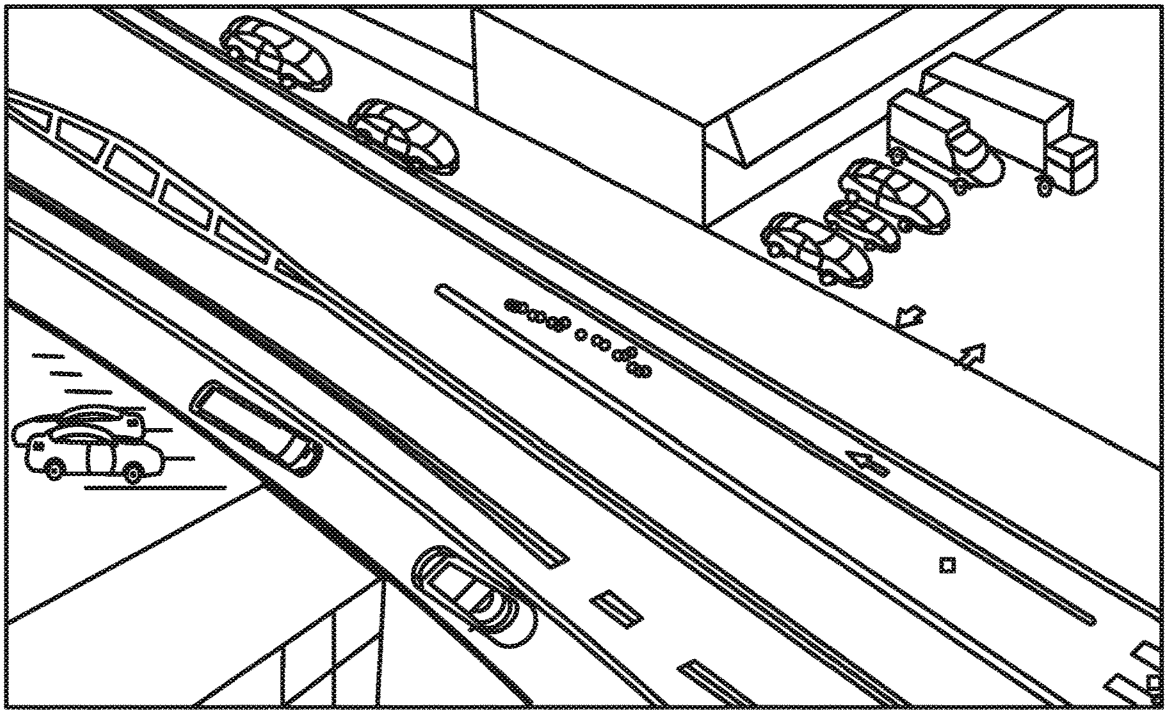

FIGS. 11A and 11B illustrate normalized trajectories of a moving vehicle and a static vehicle, respectively, visualized on separate map graphics. As shown in FIGS. 11A and 11B, the trajectory of the moving vehicle is noticeably different from the trajectory of the static vehicle. The trajectories can be visualized using a GPS visualizer such as a keyhole markup language (KML) visualizer.

Figure 12:
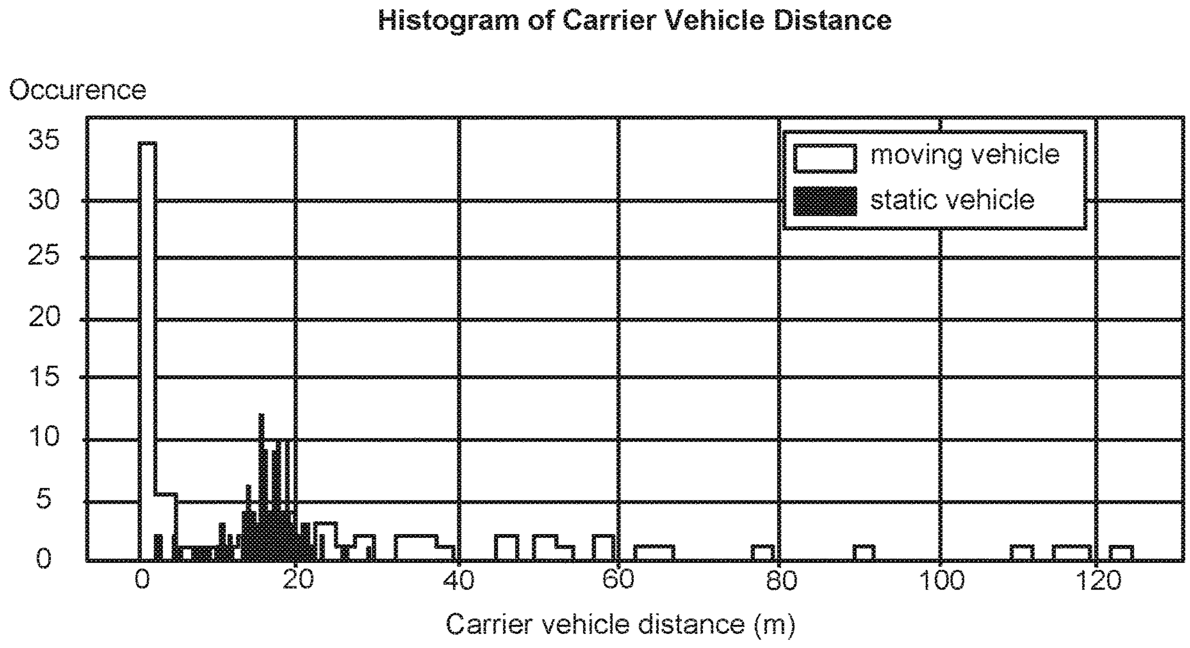
FIG. 12 is a histogram illustrating the number of times that a carrier vehicle carrying an edge device traveled a particular distance when detecting a static vehicle versus a moving vehicle.

FIG. 12 is a histogram illustrating the number of times that a carrier vehicle 110 carrying an edge device 102 traveled a particular distance when detecting a static vehicle (e.g., a potentially offending vehicle 122 that is static) versus a moving vehicle (e.g., a potentially offending vehicle 122 that is moving). As can be seen from the histogram, an initial observation can be made that carrier vehicles 110 almost never moved more than 35 meters (>35 meters) when detecting a static vehicle. As such, a threshold of about 35 meters can be used to establish a naïve classifier when it comes to classifying a static vehicle versus a moving vehicle.

Figure 13A:
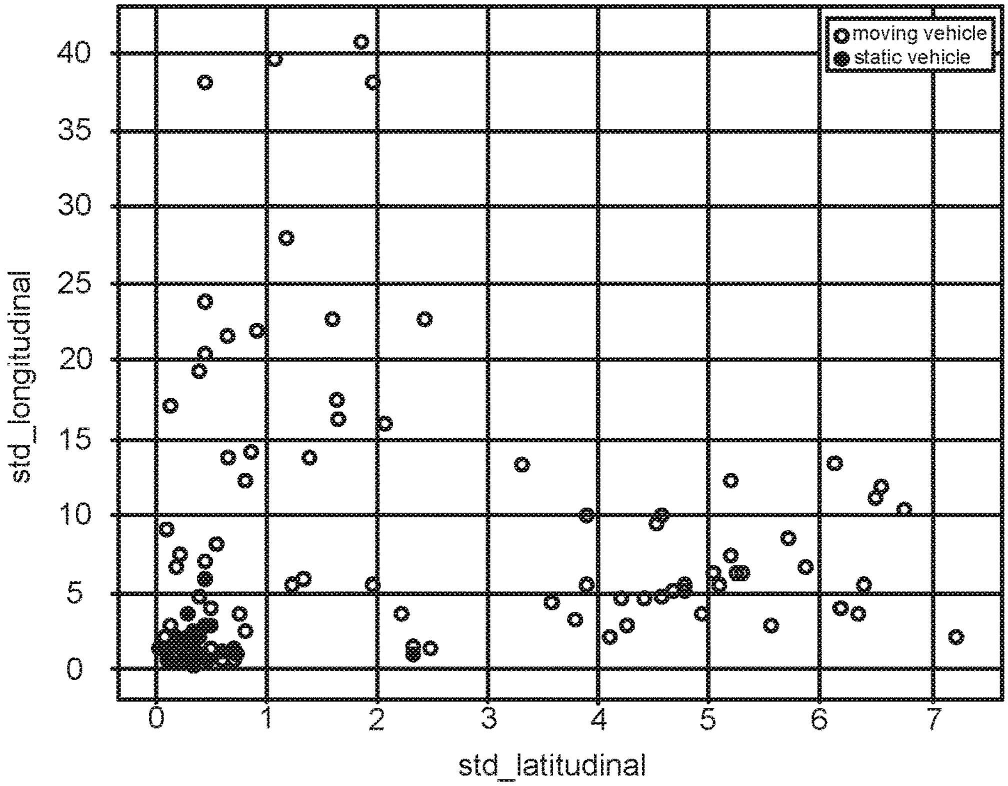
FIGS. 13A-13C are scatter plots showing three features selected to differentiate between moving vehicles and static vehicles.
Figure 13B:
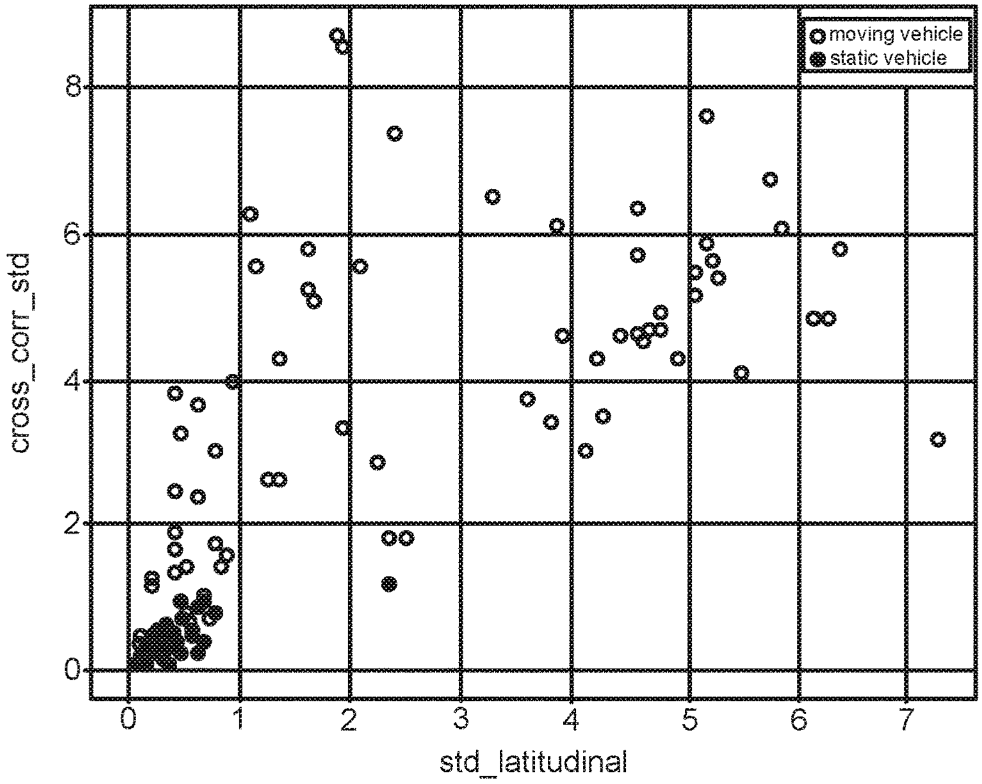
Figure 13C:
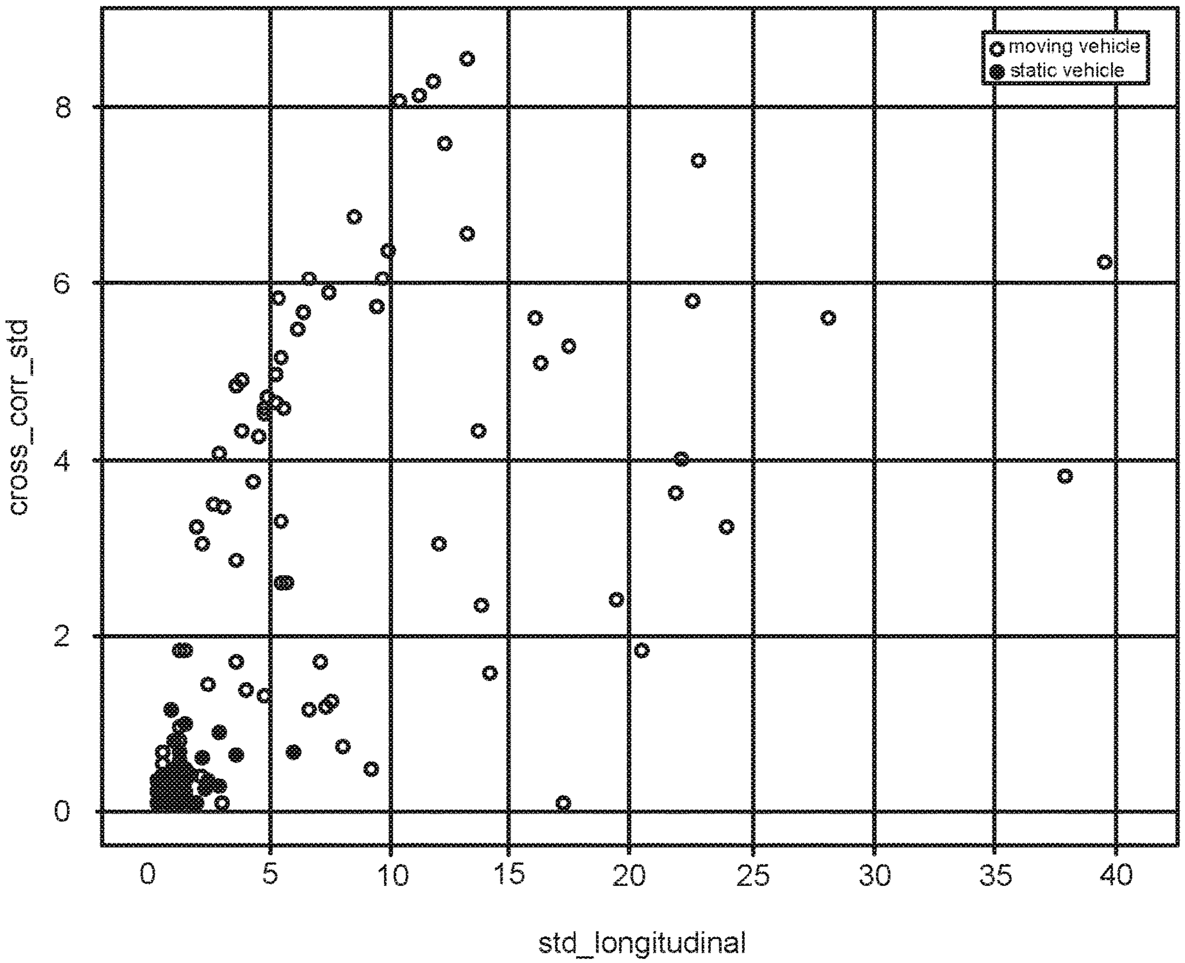

FIGS. 13A-13C are pairwise 2D scatter plots showing three features selected to differentiate between moving vehicles and static vehicles using the transformed coordinates 1006 (the GPS coordinates 1000 that were transformed/normalized into the local Cartesian coordinate system 1004). The three features include: (1) a standard deviation (SD) of the latitudinal coordinates (hereinafter "std_latitudinal") where the latitudinal coordinates are the X values of the transformed coordinates 1006; (2) SD of the longitudinal coordinates (hereinafter "std_longitudinal") where the longitudinal coordinates are the Y values of the transformed coordinates 1006; and a (3) correlation of the latitudinal and longitudinal SDs (hereinafter "cross-_corr_std") representing how correlated are the coordinates along each of the two directions (X and Y).

The scatter plots of FIGS. 13A-13C illustrate that moving vehicles and static vehicles exhibit noticeably different movement patterns. As such, the three features (std_latitudinal, std_longitudinal, and cross_corr_std) can be provided as inputs to a logistic regression model or another type of binary classification model to predict whether a potentially offending vehicle 122 is static or moving. Other models that can be used comprise support vector machines (SVMs), decision trees, convolutional neural networks (CNNs), transformers, or Hidden Markov models (HMMs).

In some embodiments, the whole GPS trajectory could be fed to the model. This makes the problem a sequence classification problem with a variable length input sequence. The entire trajectory could be fed to a Long Short-Term Memory (LSTM) network or another type of sequence classification network to predict whether a potentially offending vehicle 122 is static or moving using the computed GPS coordinates 1000 of the potentially offending vehicle 122 that have been transformed or converted into the local Cartesian coordinate system 1004.

In some embodiments, the logistic regression model can be running on the edge device 102 (for example, as part of the vehicle movement classifier 313). In other embodiments, the logistic regression model can be running on the server 104 as part of the evidence validation module 318.

The logistic regression model can receive as inputs the calculated values of the std_latitudinal feature, the std_longitudinal feature, and the cross_corr_std feature. The logistic regression model can output a probability estimate or prediction score 1400 (see FIG. 14) that can be used to make a prediction concerning whether the potentially offending vehicle is moving or static.

Figure 14:
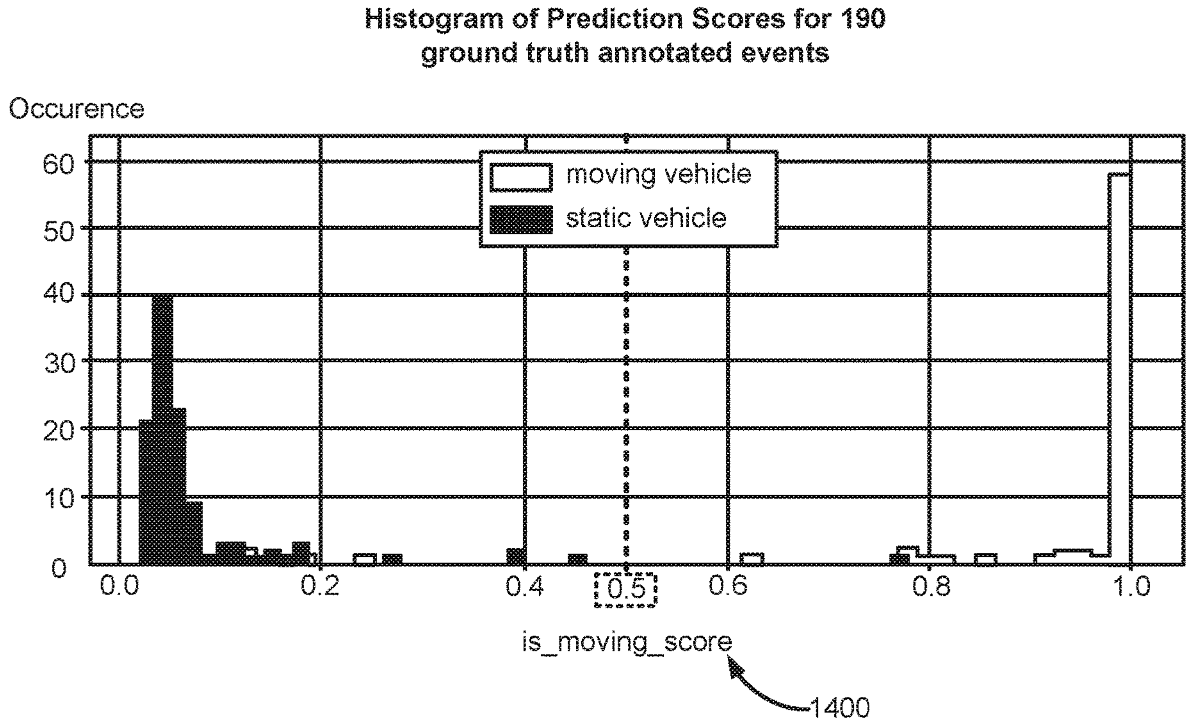
FIG. 14 is a histogram of model prediction scores for numerous events involving either a moving vehicle or a static vehicle.

FIG. 14 is a histogram of prediction scores 1400 for 190 ground truth annotated events involving detection of static and moving vehicles. As depicted in the histogram, the prediction scores 1400 (the "is_moving_score") were mostly concentrated on two ends of the 0 to 1 interval. As such, a threshold of 0.5 was selected as the threshold for prediction.

With the threshold being 0.5, the 190 events were classified with a precision of 0.986, a recall of 0.897, and an f1_score of 0.940 based on the ground truths of such events.

In summary, by providing the three features of std_latitudinal, std_longitudinal, and cross_corr_std as inputs to a logistic regression model, 70 out of the 78 cases with a moving vehicle was correctly identified and only 1 out of 112 cases with a static vehicle was misidentified. This single false positive detection involved a very long vehicle (a bus) with a detection polygon that was positioned near an edge of the event video frame 124. Such cases can be mitigated by excluding certain bus classes or using a different type of detection polygon. Moreover, 7 out of the 78 cases of moving vehicles were misidentified with 5 of them due to the small location range caused by short trajectories (very small movement distances).

As will be discussed in more detail in the following sections, even if a potentially offending vehicle 122 is determined to be static, there are certain extenuating circumstances that would prevent the potentially offending vehicle 122 from being considered double-parked. For example, these include instances where the potentially offending vehicle 122 is stuck in traffic due to other vehicles in the no-parking lane 140 or is stopped temporarily in the no-parking lane 140 at an intersection.

One technical problem when it comes to detection of double parking violations is determining whether the potentially offending vehicle 122 is static or moving since a moving vehicle cannot be assessed a double parking violation. One technical solution discovered and developed by the applicant is to determine GPS coordinates of vehicle bounding polygons across multiple event video frames, converting or transforming these GPS coordinates into a local Cartesian coordinate system (such that the GPS coordinates are transformed coordinates), and then determining whether the vehicle is static or moving by based on a standard deviation of the transformed coordinates in both a longitudinal and a latitudinal direction and a cross correlation of the transformed coordinates. For example, the standard deviation of the transformed coordinates in both the longitudinal and latitudinal direction and the cross correlation of the transformed coordinates can be fed as inputs to a logistic regression model to obtain an output in the form of a prediction score concerning whether the vehicle is moving.

FIG. 15 is a schematic diagram illustrating that the object detection deep learning model 308 and the lane segmentation deep learning model 312, running on at least one of the edge device 102 and the server 104, can be used to output predictions or classification results concerning a context surrounding the potential double parking violation that can assist in determining whether the potentially offending vehicle 122 is actually parked in the no-parking lane 140 or is only temporarily stopped. As previously discussed, the potentially offending vehicle 122 can be determined as being static as opposed to moving. However, there are instances where the potentially offending vehicle 122 can be static without being actually parked. For example, these include instances where the potentially offending vehicle 122 is stuck in traffic due to other vehicles in the no-parking lane 140 or is stopped temporarily in the no-parking lane 140 at an intersection (e.g., is about to make a turn at the intersection). Thus, being able to gain more insights into the context surrounding the potential double parking violation can cut down on the likelihood of a false positive detection.

The object detection deep learning model 308, the lane segmentation deep learning model 312, or a combination thereof can be configured to output predictions or classification results concerning features 1500 associated with the context surrounding the potential double parking violation. Such features 1500 can comprise a brake light status 1502 of the potentially offending vehicle 122, a traffic condition 1504 surrounding the potentially offending vehicle 122, and a roadway intersection status 1506.

In some embodiments, the object detection deep learning model 308 can be trained to classify or make predictions concerning the brake light status 1502 of the potentially offending vehicle 122 and the traffic condition 1504 surrounding the potentially offending vehicle 122. In these and other embodiments, the lane segmentation deep learning model 312 can be trained to classify or make predictions concerning the roadway intersection status 1506.

In certain embodiments, the objection detection deep learning model 308 can comprise a plurality of prediction heads 1508 or detectors. The prediction heads 1508 or detectors can be multi-class detectors that can be configured to undertake a multi-class prediction.

As shown in FIG. 15, one of the prediction heads 1508 of the object detection deep learning model 308 (e.g., prediction head 1508A) can be trained to distinguish between brake lights that are on, brake lights that are off, and brake lights that are flashing. For example, if the brake lights of a potentially offending vehicle 122 are off, it is more likely that the potentially offending vehicle 122 stopped in the no-parking lane 140 is parked rather than temporarily stopped. On other hand, if the brake lights of the potentially offending vehicle 122 are on or are flashing, it is more likely that the potentially offending vehicle 122 stopped in the no-parking lane 140 is only temporarily stopped.

The object detection deep learning model 308 can receive as inputs event video frames 124 captured by the edge device 102. The prediction head 1508A can classify the input video frames into one of the following classes: (1) brake lights that are on (lights_on); (2) brake lights that are off (lights_off); and (3) brake lights that are flashing (lights_flashing). The prediction head 1508A can also generate a set of brake light confidence scores 1512 associated with the predictions or classifications. The brake light confidence scores 1512 can be included as part of a set of classification results included in the evidence package 136 transmitted to the server 104 or to a third-party evidence processor.

Also, as shown in FIG. 15, another one of the prediction heads 1508 of the object detection deep learning model 308 (e.g., prediction head 1508B) can be trained to detect a traffic condition surrounding the potentially offending vehicle 122 by determining whether one or more other vehicles are immediately in front of the potentially offending vehicle 122 in the no-parking lane 140 or whether the no-parking lane 140 is otherwise clear with no other vehicles impeding the movement of the potentially offending vehicle 122.

For example, if one or more other vehicles are immediately in front of the potentially offending vehicle 122, the presence of such vehicles can indicate that the movement of the potentially offending vehicle 122 is impeded or blocked (possibly due to a traffic jam, an incident, or a traffic light being red, etc.). On other hand, if no vehicles are detected immediately in front of the potentially offending vehicle 122 and the no-parking lane 140 is otherwise clear, this can indicate that the potentially offending vehicle 122 is double-parked.

The object detection deep learning model 308 can receive as inputs event video frames 124 captured by the edge device 102. The prediction head 1508B can classify the input video frames into one of the following classes: (1) car(s) in front (car_in_front), (2) no car(s) in front (lane_clear), or (3) traffic accident ahead (traff_accident). The prediction head 1508B can also generate a set of traffic condition confidence scores 1514 associated with the predictions or classifications. The traffic condition confidence scores 1514 can be included as part of a set of classification results included in the evidence package 136 transmitted to the server 104 or to a third-party evidence processor. In other embodiments, one of the prediction heads 1508 can also detect whether the offending vehicle 122 is an emergency vehicle by classifying the vehicle type of the offending vehicle 122.

As shown in FIG. 15, one of the prediction heads 600 of the lane segmentation deep learning model 312 (e.g., prediction head 600A) can be trained to detect whether an intersection is present in at least one of the event video frames 124 capturing the potential double-parking violation. For example, if an intersection is detected, it is more likely that the potentially offending vehicle 122 stopped in the no-parking lane 140 in order to make a turn at the intersection. On other hand, if no intersection is detected, it is more likely that the potentially offending vehicle 122 stopped in the no-parking lane 140 is double parked.

The lane segmentation deep learning model 312 can receive as inputs event video frames 124 captured by the edge device 102. The prediction head 600A can classify the input video frames into one of the following classes: (1) traffic light detected (light_detected), (2) traffic light not detected (no_light), (3) stop sign detected (sign_detected), or (4) stop sign not detected (no_sign). The prediction head 600A can also generate a set of intersection detection confidence scores 1516 associated with the predictions or classifications. The intersection detection confidence scores 1516 can be included as part of a set of classification results included in the evidence package 136 transmitted to the server 104 or to a third-party evidence processor. The classification results and/or the intersection detection confidence scores 1516 can be used by the lane segmentation deep learning model 312 to determine whether an intersection was detected in at least one of the event video frames 124 capturing the potential double-parking violation. As previously discussed, if an intersection was detected, it is more likely that the potentially offending vehicle 122 was stopped in the no-parking lane 140 in order to make a turn at the intersection.

In some embodiments, the brake light confidence scores 1512, the traffic condition confidence scores 1514, the intersection detection confidence scores 1516, or a combination thereof can be used directly to determine whether the potentially offending vehicle 122 stopped in the no-parking lane 140 (i.e., the static vehicle) is only temporarily stopped or is actually double-parked. For example, one or more thresholds can be set and if at least one of the brake light confidence scores 1512, the traffic condition confidence scores 1514, or the intersection detection confidence scores 1516 do not meet one of the threshold or exceeds one of the thresholds, the evidence package 136 can be rejected.

In other embodiments, the brake light confidence scores 1512, the traffic condition confidence scores 1514, the intersection detection confidence scores 1516, or a combination thereof can also be provided as inputs to a decision tree algorithm running on the server 104 as part of an evidence evaluation procedure. The server 104 can automatically approve or reject the evidence package 136 based on a final score calculated by the decision tree algorithm. The brake light confidence scores 1512, the traffic condition confidence scores 1514, and the intersection detection confidence scores 1516 can be factored into the calculation of the final score.

The objection detection deep learning model 308 and the lane segmentation deep learning model 312 can be trained using training data 1518 comprising event video frames 124 previously captured by the edge devices 102 or event video frames 124 stored in an events database 316. The objection detection deep learning model 308 and the lane segmentation deep learning model 312 can be continuously trained in order to improve the accuracy and efficacy of such models. The event video frames 124 retrieved from the events database 316 can be event video frames 124 where the evidence packages 136 containing such video frames were previously validated by the server 104, a computing device 138 of a third-party processor, a human reviewer, or a combination thereof.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item includes the possibility that there are plural of the same items present. More specifically, as used herein and in the appended claims, the singular forms “a,” “an,” “said” and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements, or use of a “negative” limitation. Unless defined otherwise, all technical and scientific terms used herein have the same meaning as commonly understood by one of ordinary skill in the art to which this invention belongs.

Reference to the phrase “at least one of”, when such phrase modifies a plurality of items or components (or an enumerated list of items or components) means any combination of one or more of those items or components. For example, the phrase “at least one of A, B, and C” means: (i) A; (ii) B; (iii) C; (iv) A, B, and C; (v) A and B; (vi) B and C; or (vii) A and C.

In understanding the scope of the present disclosure, the term “comprising” and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” “element,” or “component” when used in the singular can have the dual meaning of a single part or a plurality of parts. As used herein, the following directional terms “forward, rearward, above, downward, vertical, horizontal, below, transverse, laterally, and vertically” as well as any other similar directional terms refer to those positions of a device or piece of equipment or those directions of the device or piece of equipment being translated or moved.

Finally, terms of degree such as “substantially”, “about” and “approximately” as used herein mean the specified value or the specified value and a reasonable amount of deviation from the specified value (e.g., a deviation of up to +0.1%, +1%, +5%, or +10%, as such variations are appropriate) such that the end result is not significantly or materially changed. For example, “about 1.0 cm” can be interpreted to mean “1.0 cm” or between “0.9 cm and 1.1 cm.” When terms of degree such as “about” or “approximately” are used to refer to numbers or values that are part of a range, the term can be used to modify both the minimum and maximum numbers or values.

The term “engine” or “module” as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an “engine” or “module” can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method of automatically detecting a double parking violation, comprising:

- determining, using one or more processors of an edge device, a location of a road edge of a roadway from one or more video frames of a video captured by one or more video image sensors of the edge device;
- determining a layout of one or more lanes of the roadway based on the road edge determined by the edge device, wherein at least one of the one or more lanes is a no-parking lane;
- bounding the no-parking lane using a lane bounding polygon;
- bounding a vehicle detected from the one or more video frames using a vehicle bounding polygon;
- detecting a potential double parking violation based in part on an overlap of at least part of the vehicle bounding polygon with at least part of the lane bounding polygon;
- determining whether the vehicle is moving or static when captured by the video; and
- detecting the potential double parking violation only in response to the vehicle being determined to be static when captured by the video,
- wherein determining whether the vehicle is moving or static further comprises:
  - determining GPS coordinates of vehicle bounding polygons across multiple event video frames;
  - transforming the GPS coordinates into a local Cartesian coordinate system such that the GPS coordinates are transformed coordinates, wherein a longitudinal axis of the local Cartesian coordinate system is in a direction of travel of a carrier vehicle carrying the edge device and a latitudinal axis of the local Cartesian coordinate system is in a lateral direction; and
  - determining whether the vehicle is static or moving based on a standard deviation of the transformed coordinates in both a longitudinal direction and a latitudinal direction and a cross correlation of the transformed coordinates along the longitudinal direction and the latitudinal direction.

2. The method of claim 1, further comprising determining the road edge by fitting a line representing the road edge to a plurality of road edge points using a random sample consensus algorithm.

3. The method of claim 2, wherein the plurality of road edge points are determined by selecting a subset of points along a mask or heatmap representing the road edge but not all points along the mask or heatmap.

4. The method of claim 3, wherein the mask or heatmap is outputted by a lane segmentation deep learning model running on the edge device.

5. The method of claim 2, wherein the line fitted to the plurality of road edge points is parameterized by a slope and an intercept, wherein each of the slope and the intercept is calculated using a sliding window or moving average algorithm such that the slope is an average slope value and the intercept is an average intercept value calculated from one or more video frames captured prior in time.

6. The method of claim 1, further comprising passing the one or more video frames to one or more deep learning models running on the edge device or a server communicatively coupled to the edge device to determine a context surrounding the double parking violation, and wherein the context surrounding the double parking violation is used by the edge device or the server to detect the double parking violation.

7. The method of claim 6, wherein the one or more deep learning models comprise at least one of an object detection deep learning model and a lane segmentation deep learning model.

8. The method of claim 6, wherein at least one of the deep learning models is configured to output a multiclass classification concerning a feature associated with the context.

9. The method of claim 8, wherein the feature is brake light status of the vehicle.

10. The method of claim 8, wherein the feature is a traffic condition surrounding the vehicle.

11. The method of claim 8, wherein the feature is a roadway intersection status.

12. The method of claim 1, wherein the one or more video frames are captured by an event camera of the edge device, wherein at least one of the video frames is passed to a license plate recognition deep learning model running on the edge device to automatically recognize a license plate of the vehicle.

13. The method of claim 1, wherein the one or more video frames are captured by an event camera of the edge device coupled to a carrier vehicle while the carrier vehicle is in motion.

14. A device for automatically detecting a double parking violation, comprising:

- one or more video image sensors configured to capture a video of a vehicle and a roadway including a road edge of the roadway; and
- one or more processors programmed to:
  - determine a location of the road edge of the roadway from one or more video frames of the video captured by the one or more video image sensors;
  - determine a layout of one or more lanes of the roadway based on the road edge determined by the device, wherein at least one of the one or more lanes is a no-parking lane;
  - bound the no-parking lane using a lane bounding polygon;
  - bound a vehicle detected from the one or more video frames using a vehicle bounding polygon;
  - detect a potential double parking violation based in part on an overlap of at least part of the vehicle bounding polygon with at least part of the lane bounding polygon;
  - determine whether the vehicle is moving or static when captured by the video; and
  - detect the potential double parking violation only in response to the vehicle being determined to be static when captured by the video, wherein to determine whether the vehicle is moving or static the one or more processors are further programmed to:

determine GPS coordinates of vehicle bounding polygons across multiple event video frames;

transform the GPS coordinates into a local Cartesian coordinate system such that the GPS coordinates are transformed coordinates, wherein a longitudinal axis of the local Cartesian coordinate system is in a direction of travel of a carrier vehicle carrying the device and a latitudinal axis of the local Cartesian coordinate system is in a lateral direction; and determine whether the vehicle is static or moving based on a standard deviation of the transformed coordinates in both a longitudinal direction and a latitudinal direction and a cross correlation of the transformed coordinates along the longitudinal direction and the latitudinal direction.

15. The device of claim 14, wherein the one or more processors are further programmed to determine the road edge by fitting a line representing the road edge to a plurality of road edge points using a random sample consensus algorithm.

16. The device of claim 15, wherein the plurality of road edge points are determined by selecting a subset of points along a mask or heatmap representing the road edge but not all points along the mask or heatmap.

17. The device of claim 16, wherein the mask or heatmap is outputted by a lane segmentation deep learning model running on the device.

18. The device of claim 15, wherein the line fitted to the plurality of road edge points is parameterized by a slope and an intercept, wherein each of the slope and the intercept is calculated using a sliding window or moving average algorithm such that the slope is an average slope value and the intercept is an average intercept value calculated from one or more video frames captured prior in time.

19. The device of claim 14, wherein the one or more processors are further programmed to pass the one or more video frames to one or more deep learning models running on the device or a server communicatively coupled to the device to determine a context surrounding the double parking violation, and wherein the context surrounding the double parking violation is used by the device or the server to detect the double parking violation.

20. One or more non-transitory computer-readable media comprising instructions stored thereon, that when executed by one or more processors, cause the one or more processors to perform operations comprising:

determining a location of a road edge of a roadway from one or more video frames of a video captured by one or more video image sensors of an edge device;

determining a layout of one or more lanes of the roadway based on the road edge, wherein at least one of the one or more lanes is a no-parking lane;

bounding the no-parking lane using a lane bounding polygon;

bounding a vehicle detected from the one or more video frames using a vehicle bounding polygon;

detecting a potential double parking violation based in part on an overlap of at least part of the vehicle bounding polygon with at least part of the lane bounding polygon;

determining whether the vehicle is moving or static when captured by the video; and detecting the potential double parking violation only in response to the vehicle being determined to be static when captured by the video, wherein to determine whether the vehicle is moving or static comprises:

determining GPS coordinates of vehicle bounding polygons across multiple event video frames;

transforming the GPS coordinates into a local Cartesian coordinate system such that the GPS coordinates are transformed coordinates, wherein a longitudinal axis of the local Cartesian coordinate system is in a direction of travel of a carrier vehicle carrying the edge device and a latitudinal axis of the local Cartesian coordinate system is in a lateral direction; and determining whether the vehicle is static or moving based on a standard deviation of the transformed coordinates in both a longitudinal direction and a latitudinal direction and a cross correlation of the transformed coordinates along the longitudinal direction and the latitudinal direction.

21. The one or more non-transitory computer-readable media of claim 20, further comprising instructions stored thereon, that when executed by the one or more processors, cause the one or more processors to perform operations comprising determining the road edge by fitting a line representing the road edge to a plurality of road edge points using a random sample consensus algorithm.

22. The one or more non-transitory computer-readable media of claim 21, wherein the plurality of road edge points are determined by selecting a subset of points along a mask or heatmap representing the road edge but not all points along the mask or heatmap.

23. The one or more non-transitory computer-readable media of claim 20, further comprising instructions stored thereon, that when executed by the one or more processors, cause the one or more processors to performing operations comprising passing the one or more video frames to one or more deep learning models to determine a context surrounding the double parking violation, and wherein the context surrounding the double parking violation is used to detect the double parking violation.

24. The one or more non-transitory computer-readable media of claim 21, wherein the line fitted to the plurality of road edge points is parameterized by a slope and an intercept, wherein each of the slope and the intercept is calculated using a sliding window or moving average algorithm such that the slope is an average slope value and the intercept is an average intercept value calculated from one or more video frames captured prior in time.

* * * * *